United States Patent
Kim et al.

(10) Patent No.: US 11,160,134 B2
(45) Date of Patent: Oct. 26, 2021

(54) METHOD FOR PERFORMING RRC CONNECTION PROCEDURE IN WIRELESS COMMUNICATION SYSTEM AND APPARATUS THEREFOR

(71) Applicant: LG ELECTRONICS INC., Seoul (KR)

(72) Inventors: Taehun Kim, Seoul (KR); Laeyoung Kim, Seoul (KR); Jaewook Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 16/637,730

(22) PCT Filed: Aug. 9, 2018

(86) PCT No.: PCT/KR2018/009085
§ 371 (c)(1),
(2) Date: Feb. 7, 2020

(87) PCT Pub. No.: WO2019/031865
PCT Pub. Date: Feb. 14, 2019

(65) Prior Publication Data
US 2020/0178343 A1 Jun. 4, 2020

Related U.S. Application Data

(60) Provisional application No. 62/547,071, filed on Aug. 17, 2017, provisional application No. 62/542,806, filed on Aug. 9, 2017.

(51) Int. Cl.
*H04B 7/14* (2006.01)
*H04W 76/27* (2018.01)
*H04W 76/18* (2018.01)

(52) U.S. Cl.
CPC .......... *H04W 76/27* (2018.02); *H04W 76/18* (2018.02)

(58) Field of Classification Search
CPC ..... H04W 76/27; H04W 76/18; H04W 76/14; H04W 88/04; H04W 36/0011; H04B 7/15528; H04B 7/18539
See application file for complete search history.

(56) References Cited

U.S. PATENT DOCUMENTS

2010/0290430 A1* 11/2010 Lee .................... H04W 36/385
370/331
2017/0317740 A1* 11/2017 Basu Mallick ....... H04W 8/005
(Continued)

FOREIGN PATENT DOCUMENTS

| JP | 2012023577 | 2/2012 |
|---|---|---|
| WO | 2011/162651 | 12/2011 |

OTHER PUBLICATIONS

PCT International Application No. PCT/KR2018/009085, International Search Report dated Nov. 28, 2018, 3 pages.
(Continued)

*Primary Examiner* — Andrew Wendell
(74) *Attorney, Agent, or Firm* — Lee, Hong, Degerman, Kang & Waimey

(57) ABSTRACT

A method of performing a radio resource control (RRC) connection procedure of a relay user equipment (UE) in a wireless communication system is disclosed. The method includes, if a RRC connection procedure of a remote UE associated with the relay UE is triggered, receiving, from the remote UE, a first RRC establishment cause for a RRC connection of the remote UE; and if a RRC connection request of the relay UE is not allowed, transmitting, to a base station, a first RRC connection request including the first RRC establishment cause of the remote UE.

11 Claims, 18 Drawing Sheets

(56) References Cited

U.S. PATENT DOCUMENTS

2018/0054725 A1* 2/2018 Agiwal ............... H04W 24/08
2019/0335332 A1* 10/2019 Ying ................. H04W 12/0431
2019/0357140 A1* 11/2019 Richards ............. H04W 76/27

OTHER PUBLICATIONS

Raghothaman et al., "System Architecture for a Cellular Network with UE Relays for Capacity and Coverage Enhancement," In: Interdigital, Research Paper, Jan. 2012, 8 pages.

Catt, "Authentication during the attach procedure of relay," 3GPP TSG Ran WG2 #67bis, Miyazaki, Japan, R2-095491, Oct. 12-16, 2009, 6 pages.

CMCC, "The startup procedure of relay," 3GPP TSG Ran WG2 #67bis, Miyazaki, Japan, R2-096015, Oct. 12-16, 2009, 5 pages.

* cited by examiner

[Figure 1]
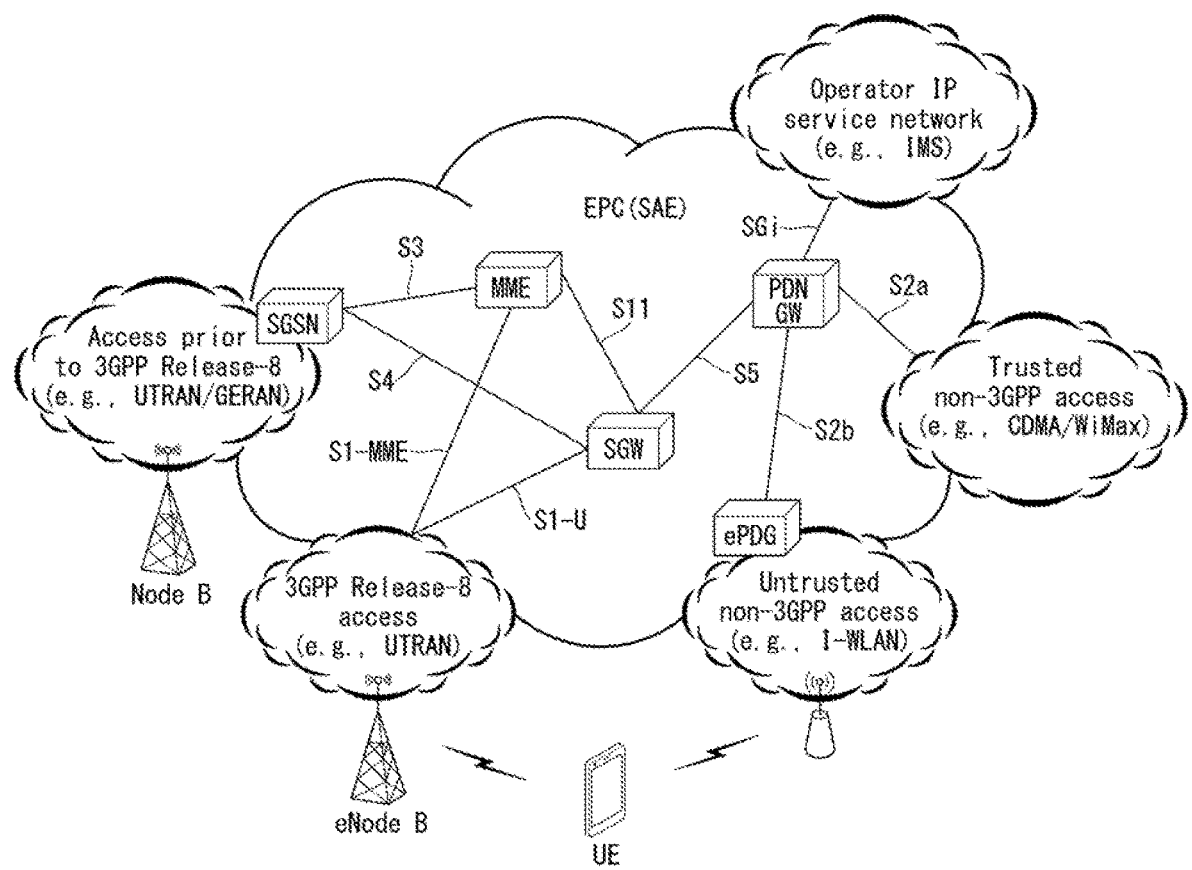

[Figure 2]
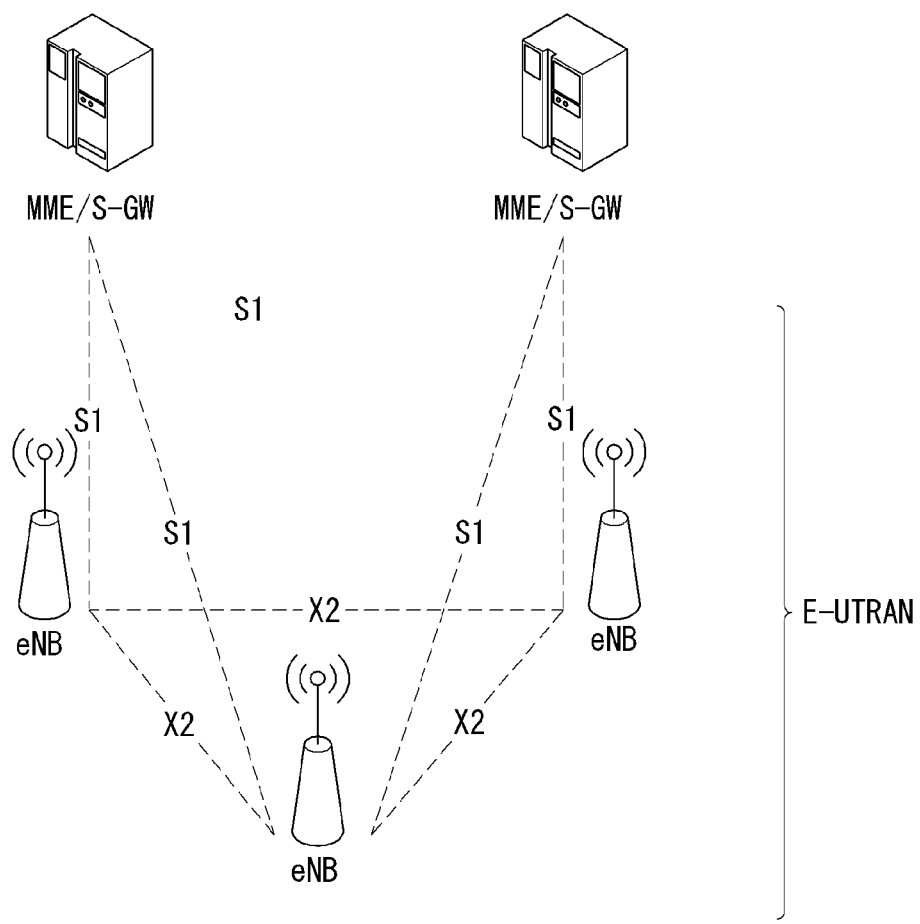

[Figure 3]
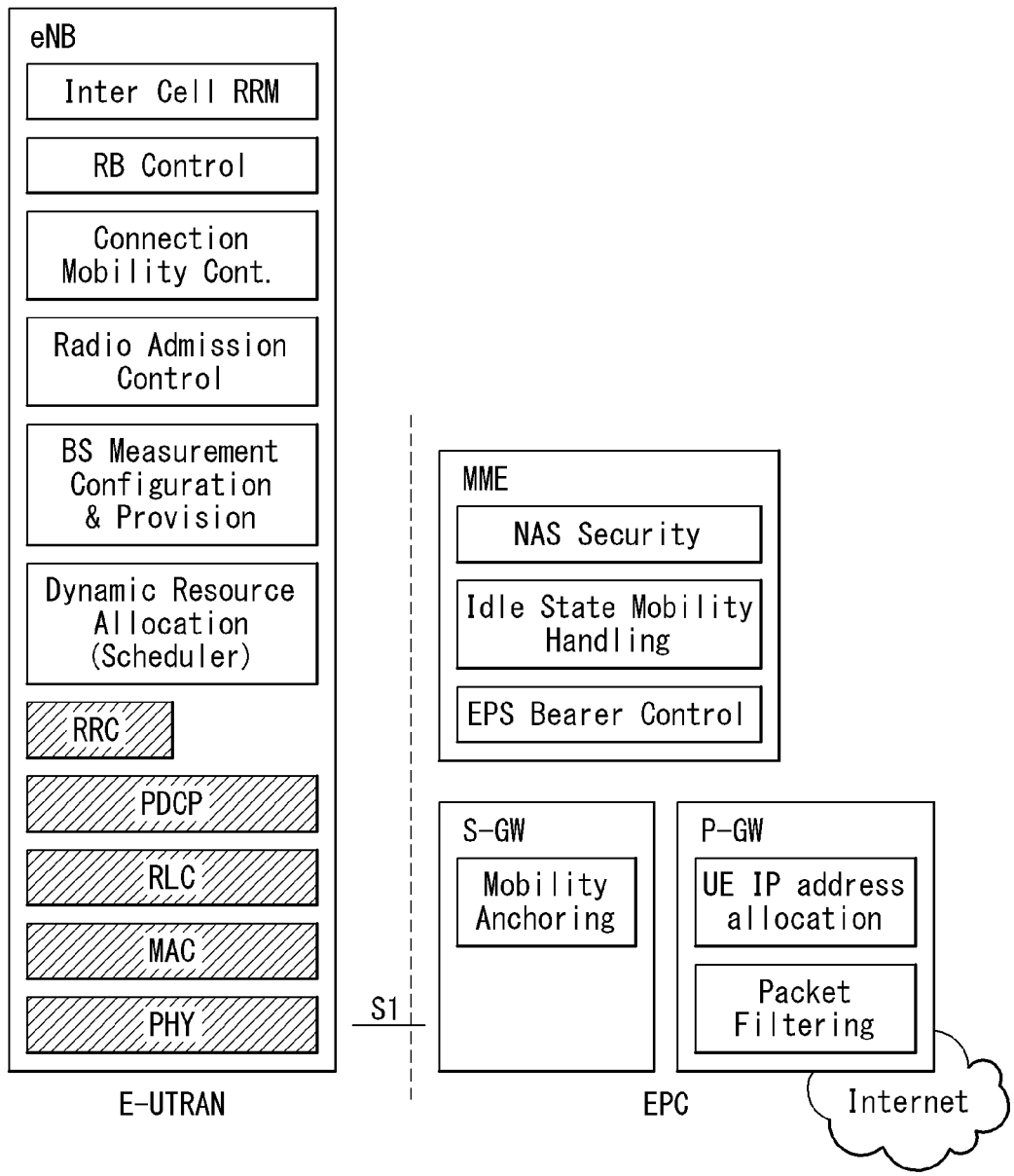

【Figure 4】
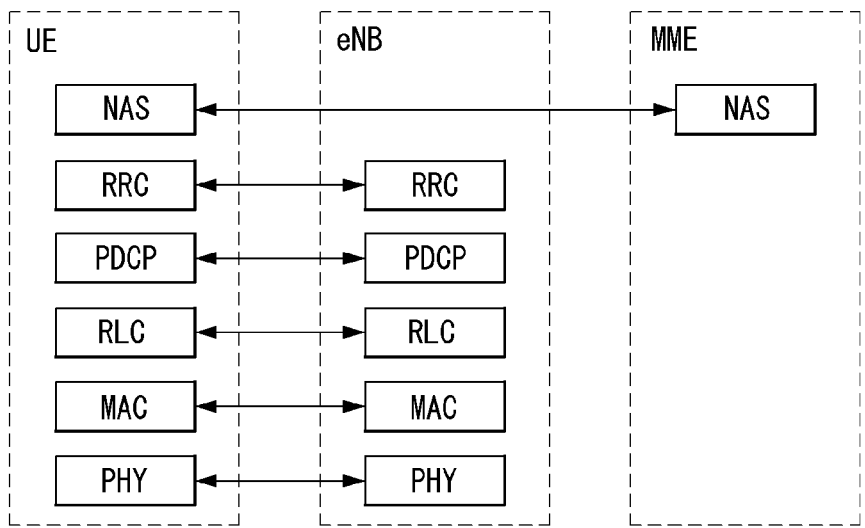
(a) Control Plane Protocol Stack
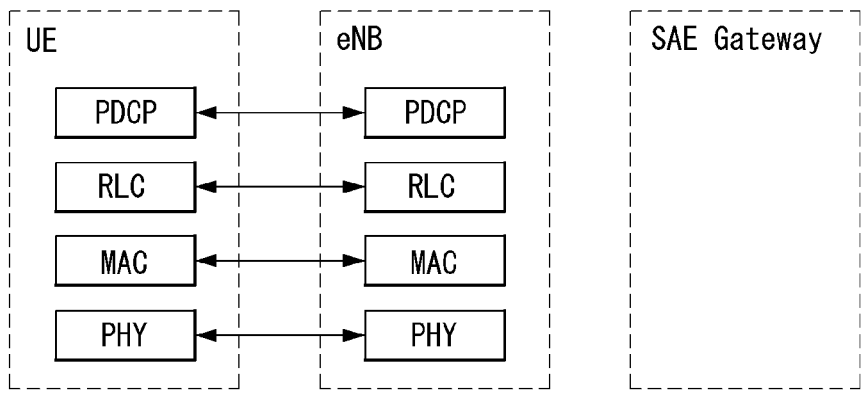
(b) User Plane Protocol Stack 【Figure 5】
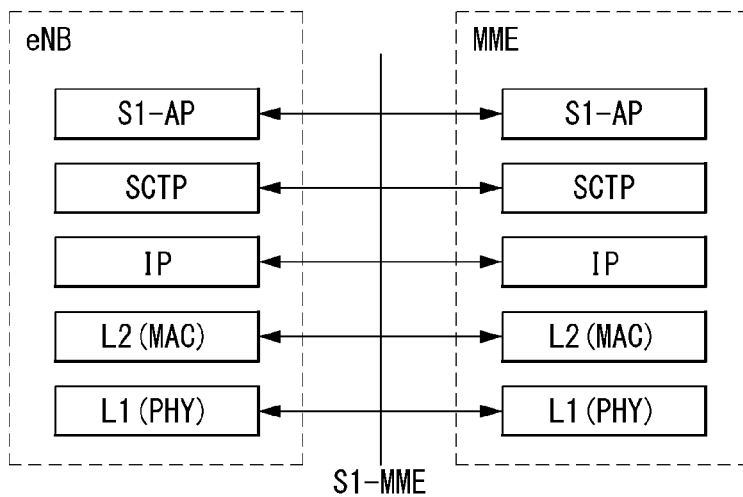
(a) Control Plane Protocol Stack
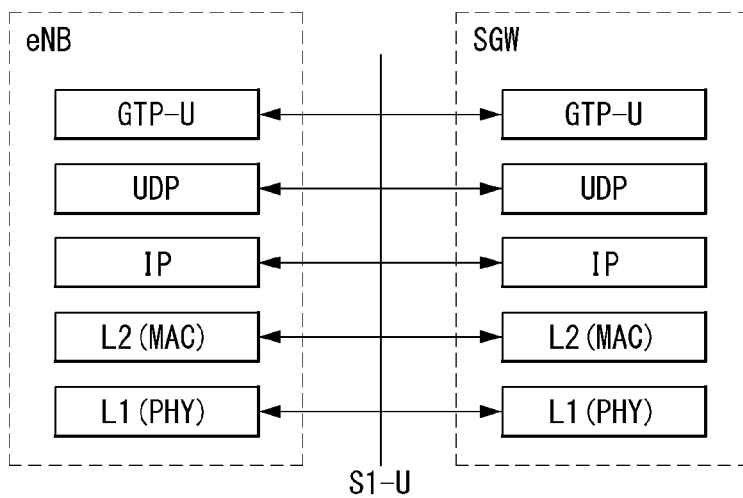
(b) User Plane Protocol Stack 【Figure 6】
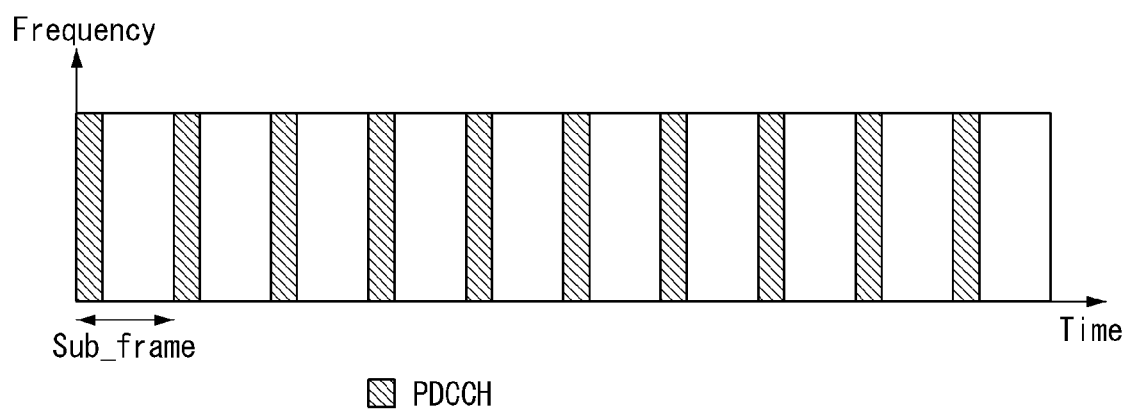
【Figure 7】
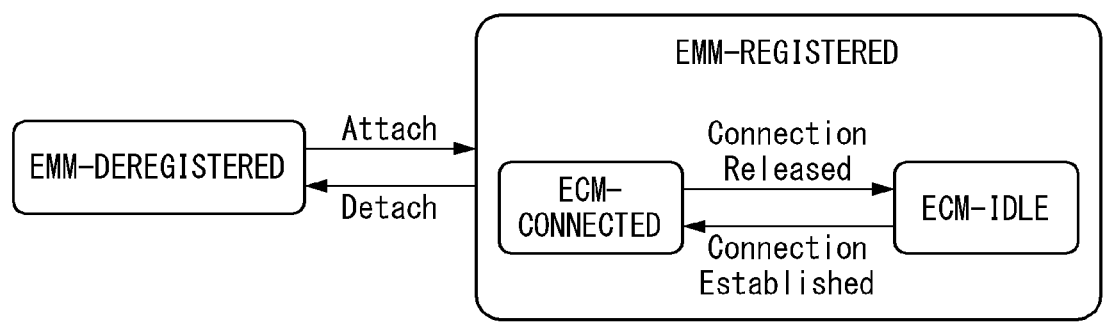

[Figure 8]
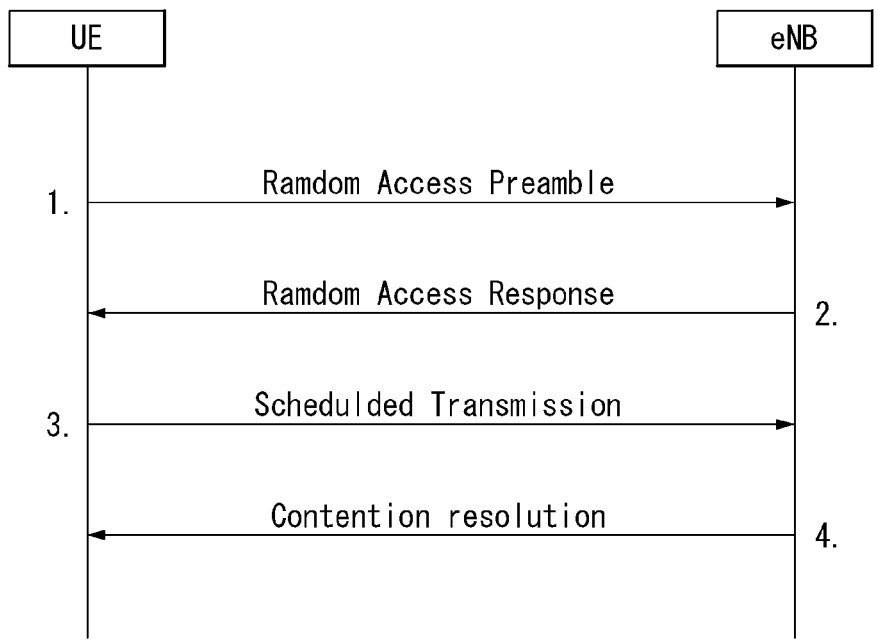
[Figure 9]
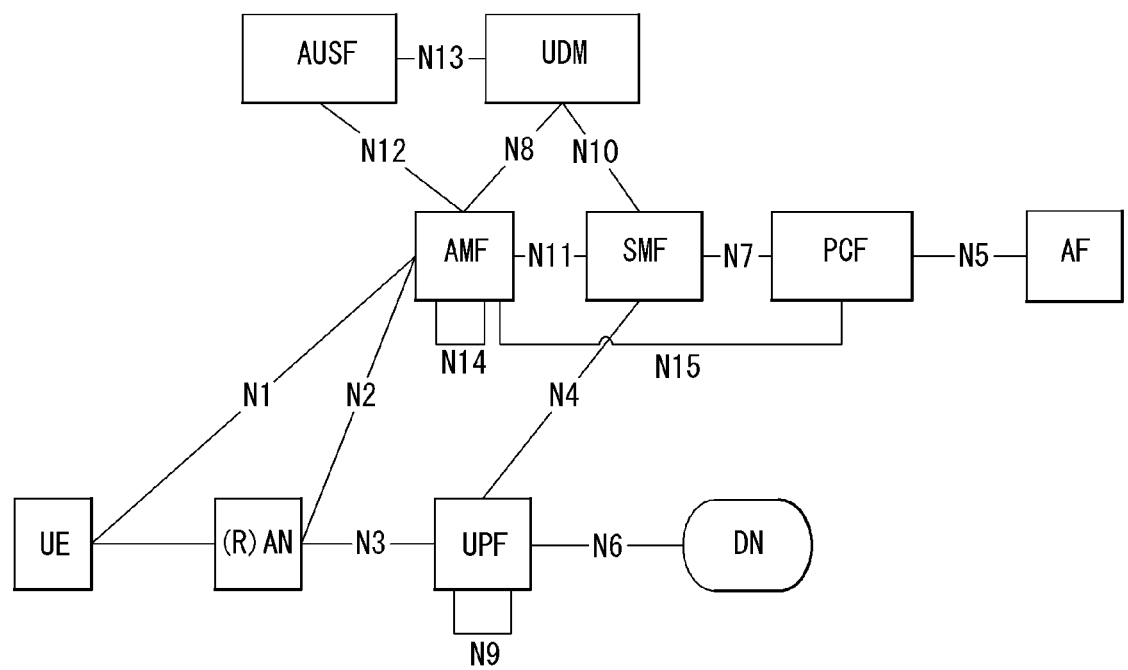

【Figure 10】
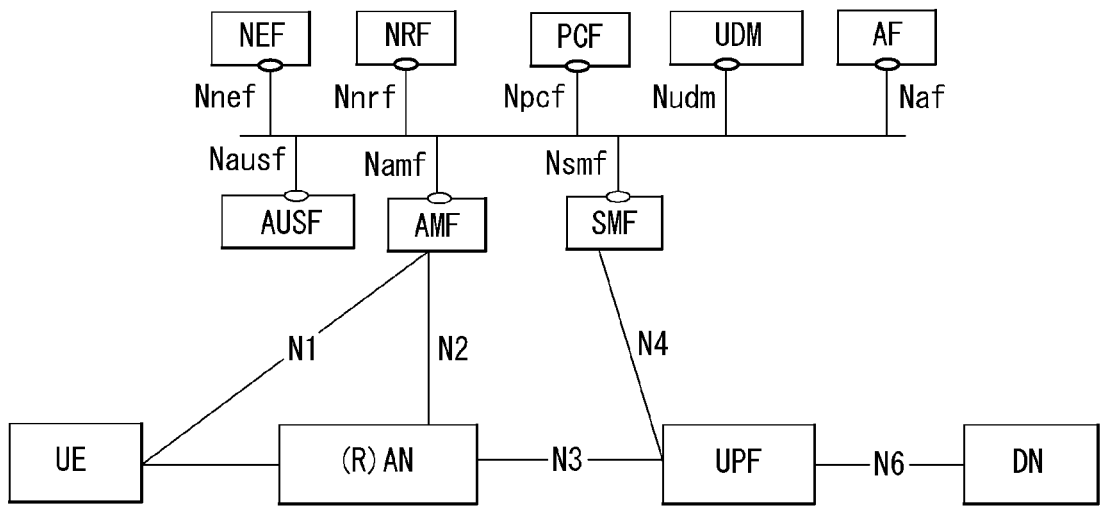
【Figure 11】
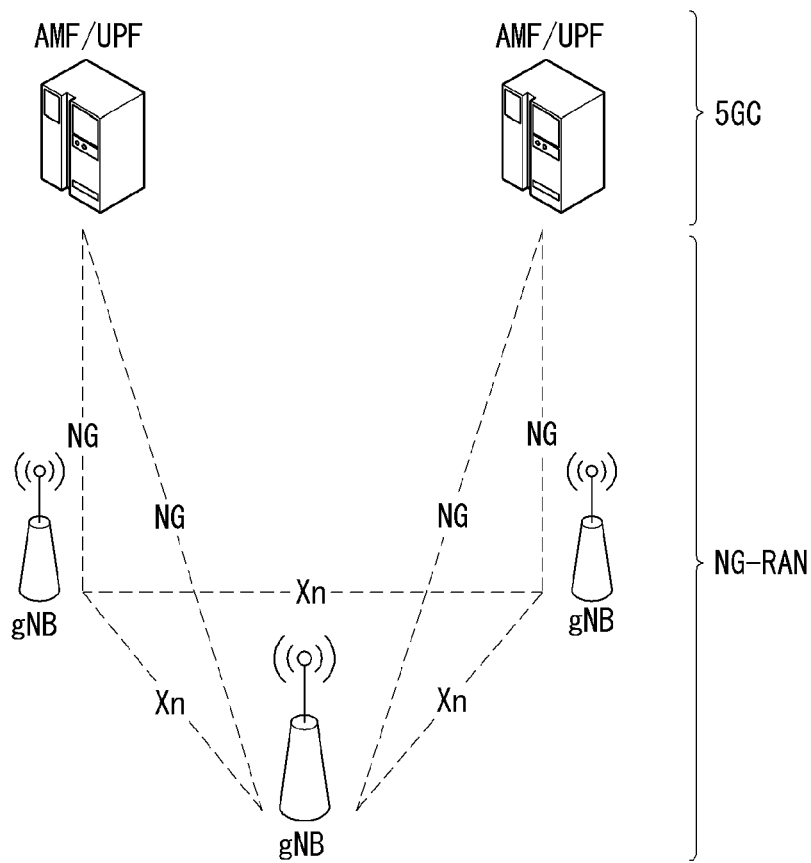

【Figure 12】
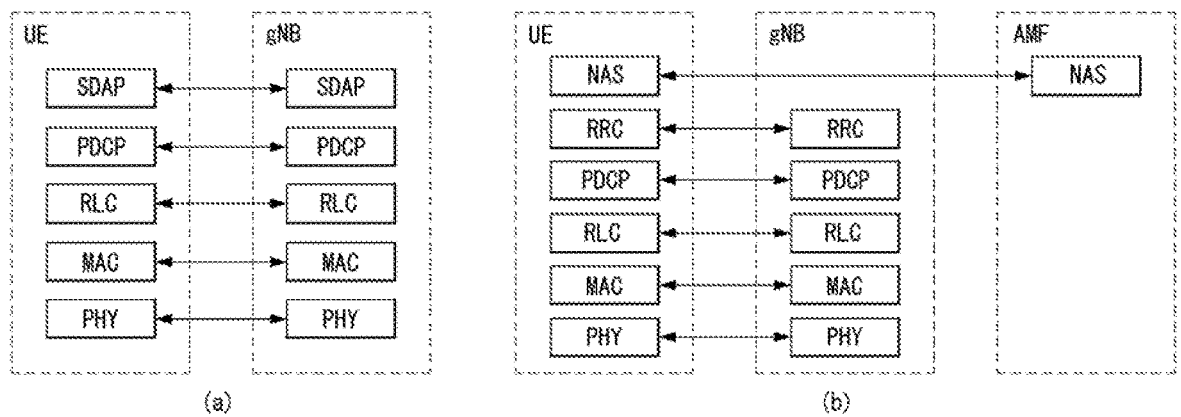
【Figure 13】
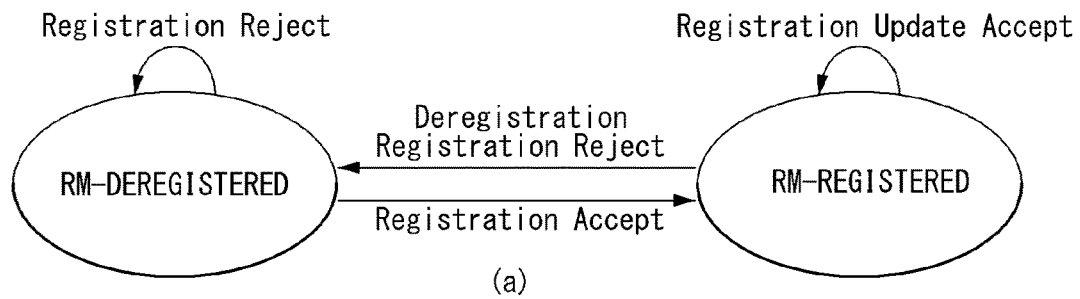
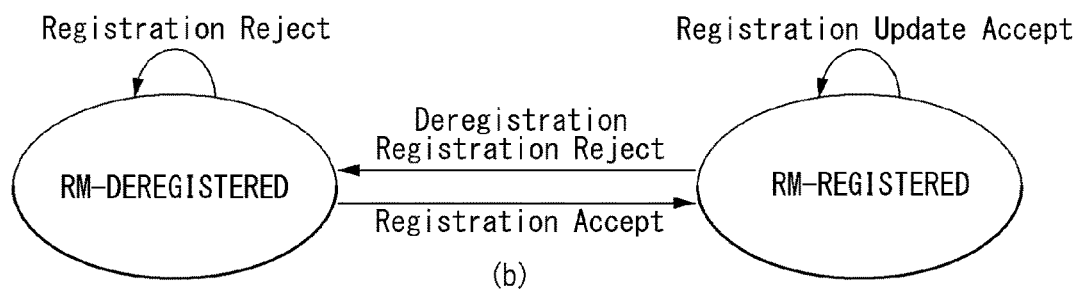

【Figure 14】
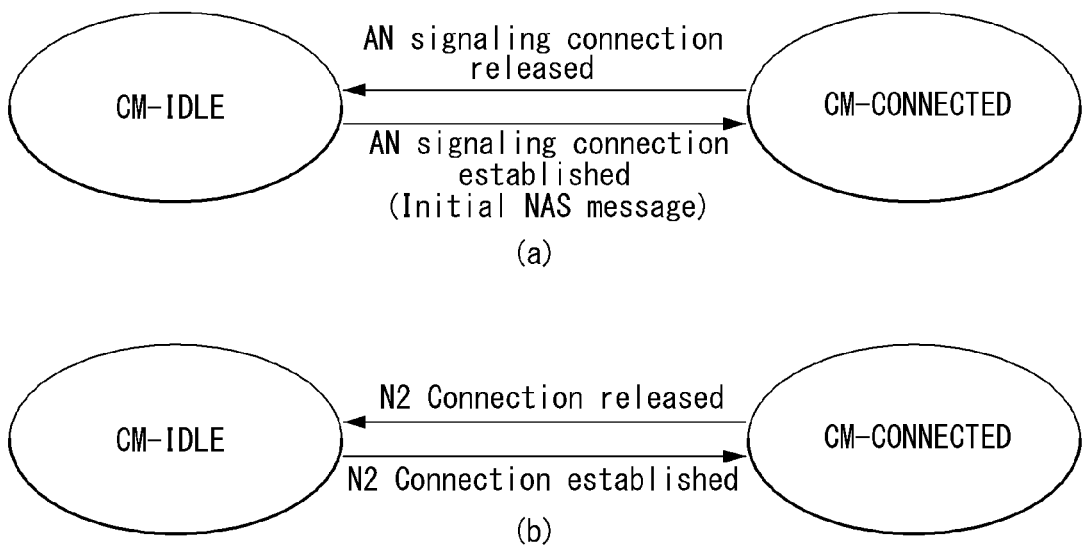

[Figure 15]
[Figure 16]
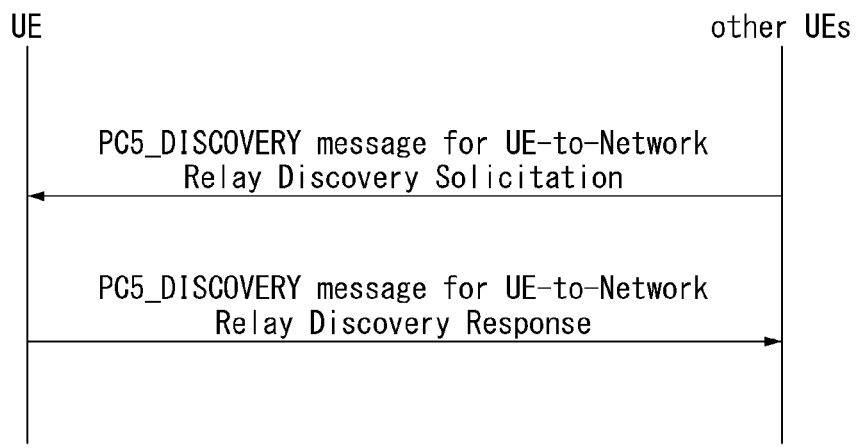

【Figure 17】

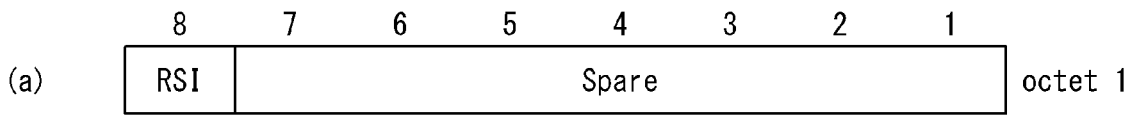

(a)

(b)

| RSI (octet 1) Bit 8 | |
|---|---|
| 0 | the UE does not have resources available to provide a connectivity service for additional ProSe-enabled public safety UEs |
| 1 | the UE has resources available to provide a connectivity service for additional ProSe-enabled public safety UEs |
| Bits 1 to 7 of octet 1 are spare and shall be coded as zero (see NOTE). | |
| NOTE: Bits 1 to 7 of octet 1 were reserved in earlier versions of the protocol. | |

【Figure 18】

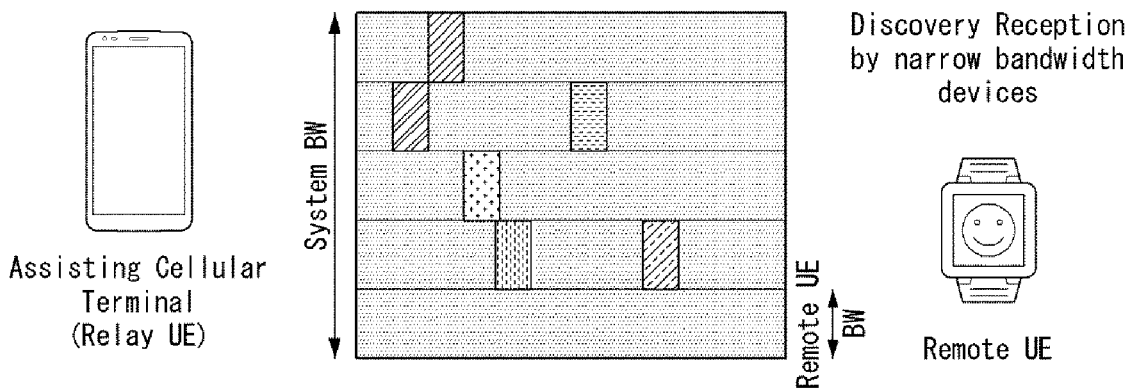

【Figure 19】
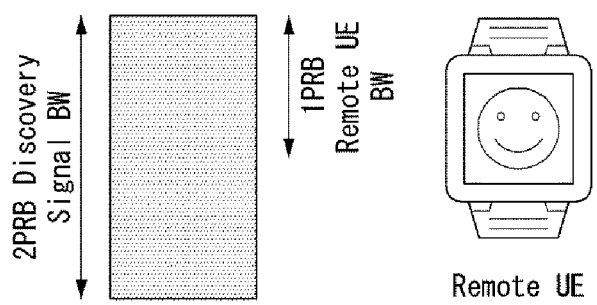
【Figure 20】
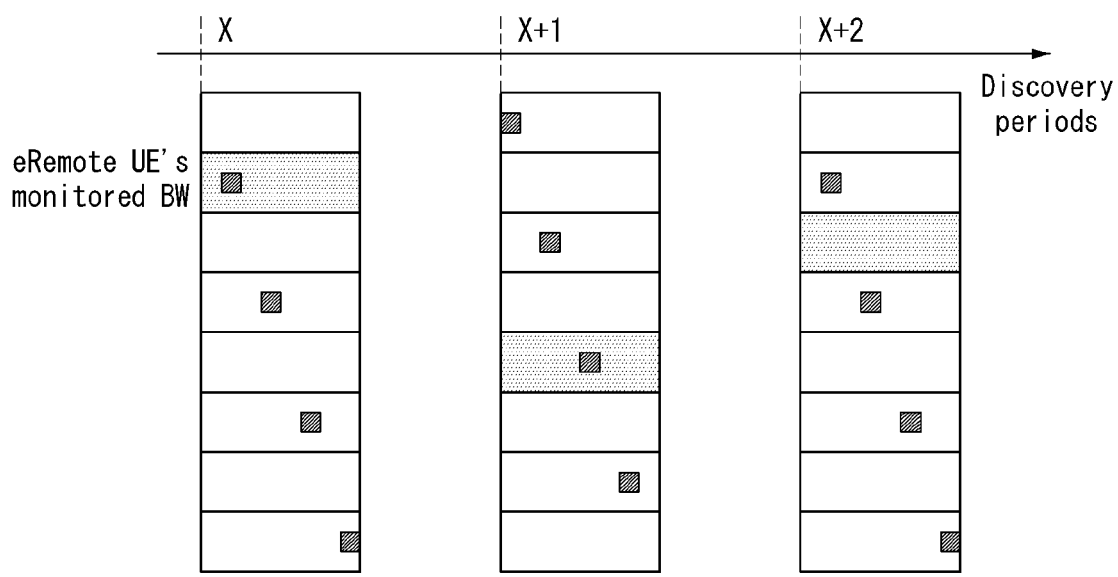

[Figure 21]
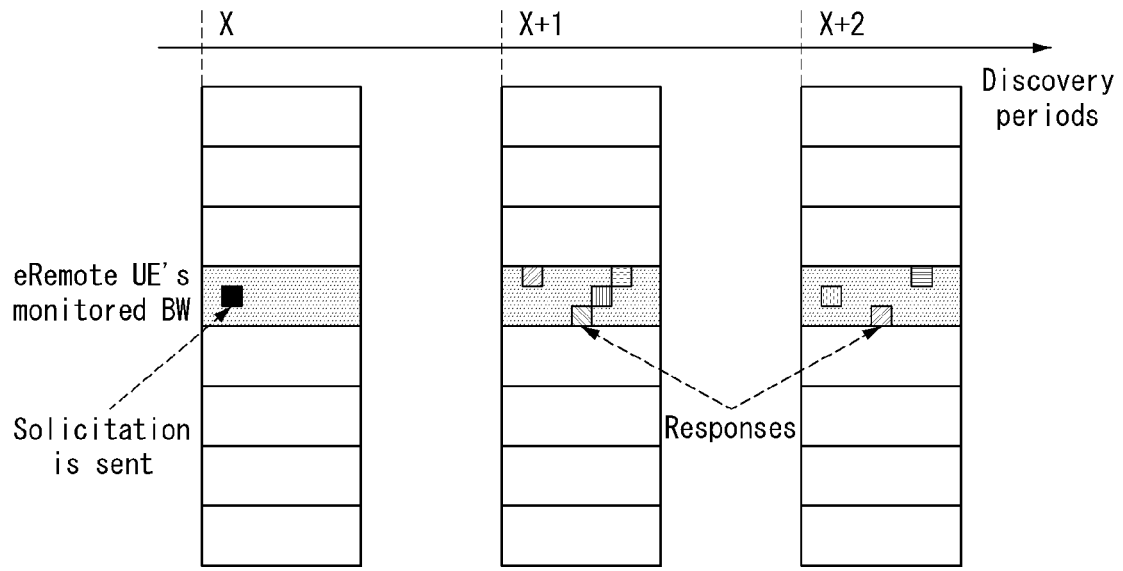
[Figure 22]
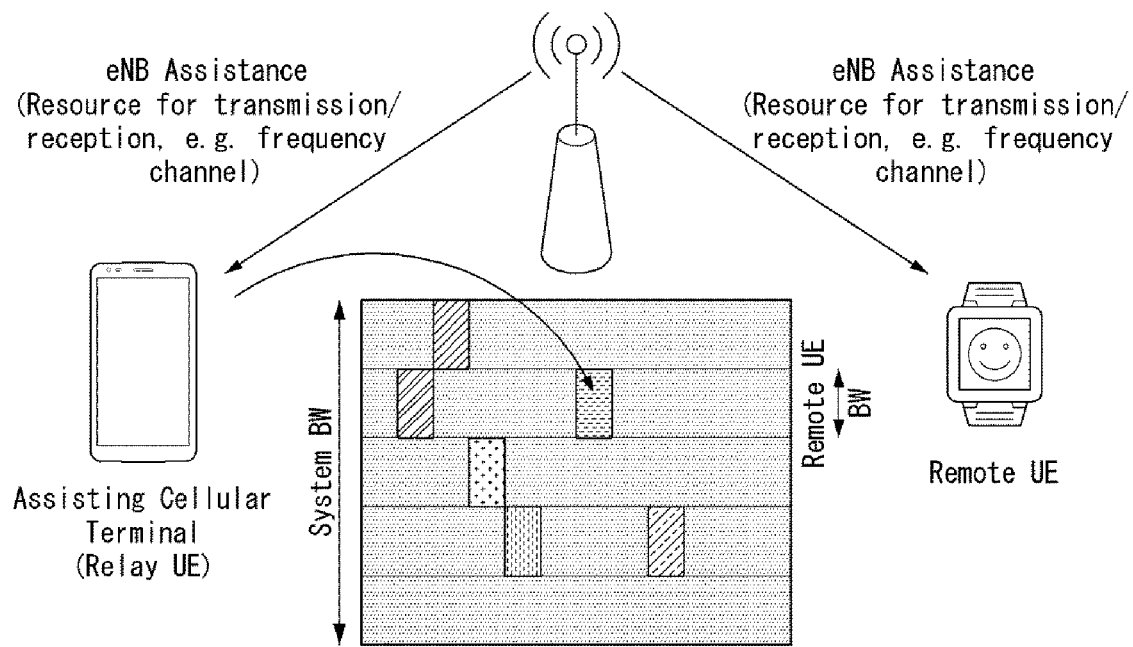

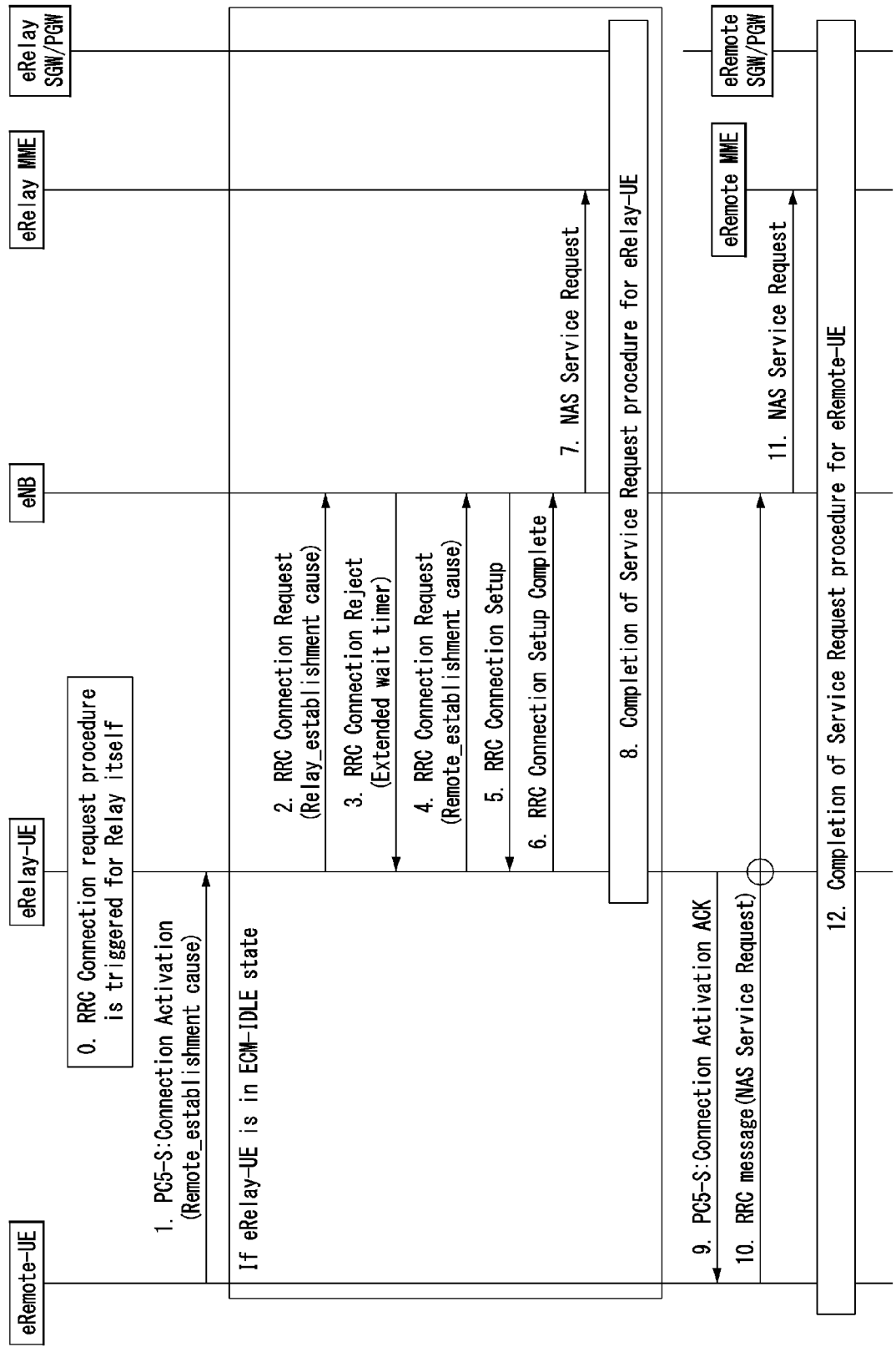

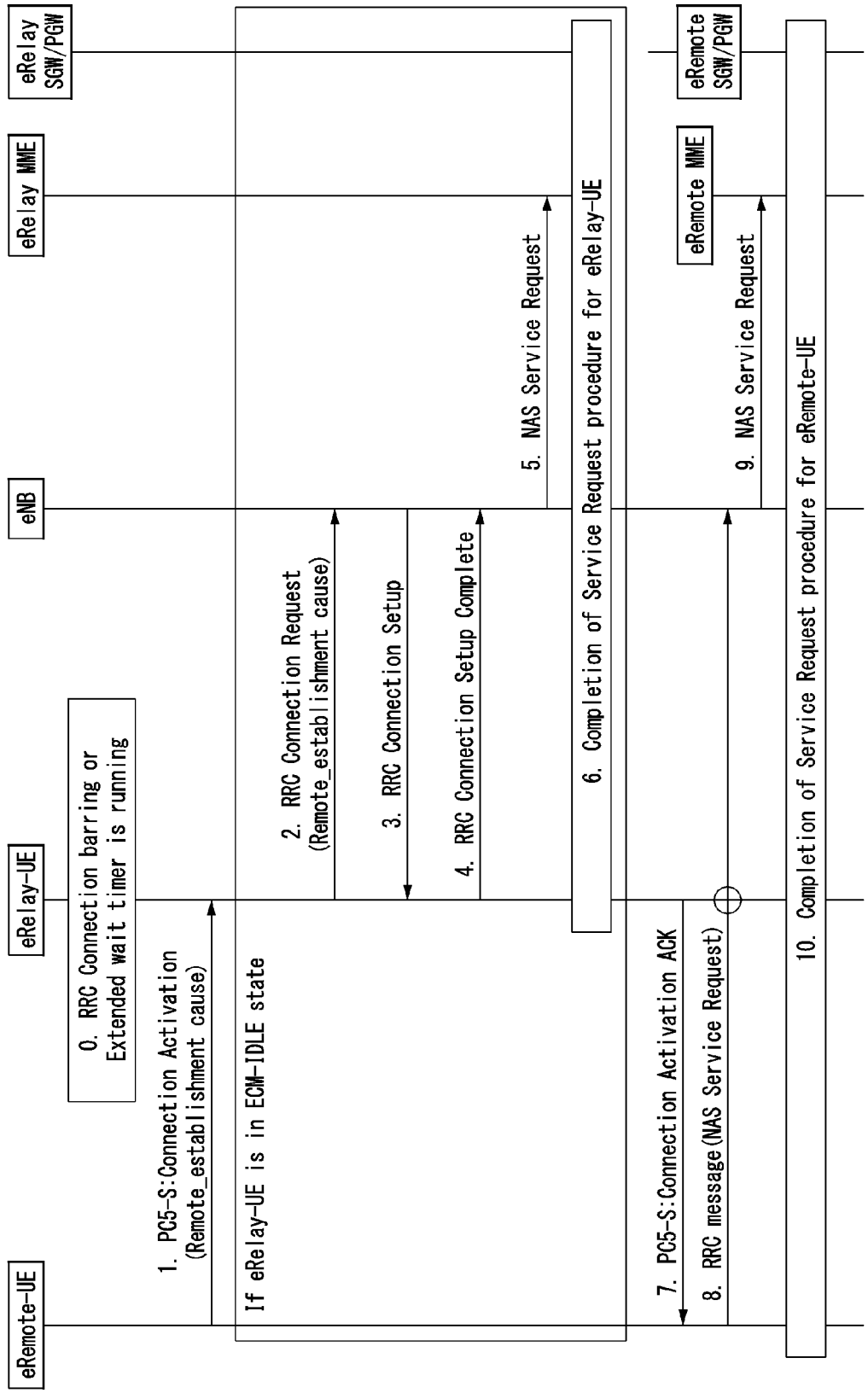
[Figure 24]

【Figure 25】
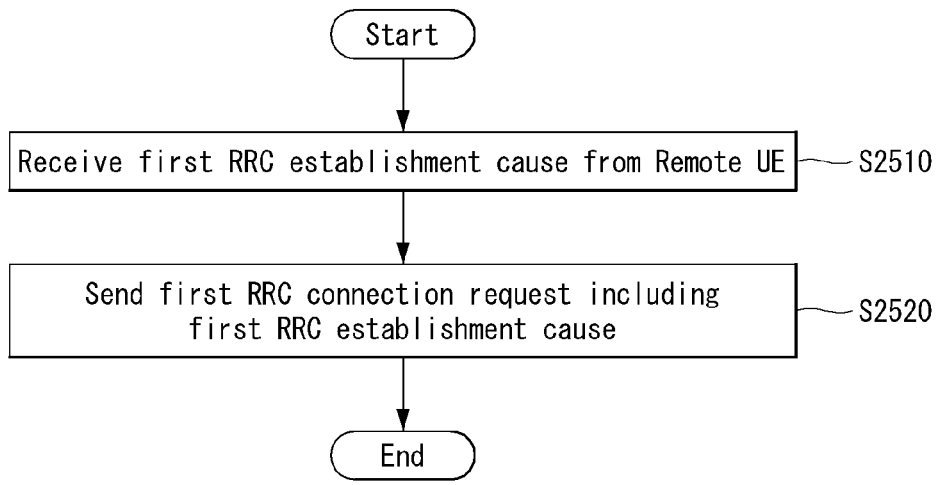
【Figure 26】
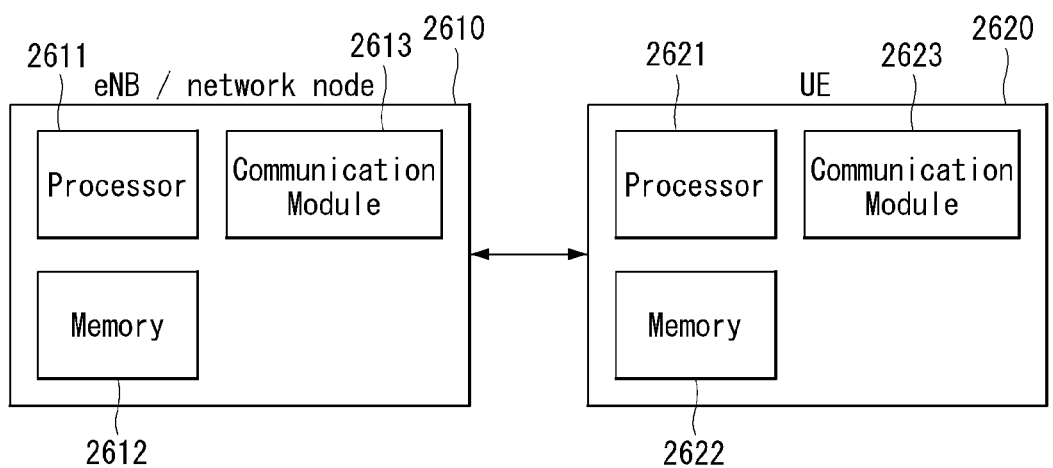

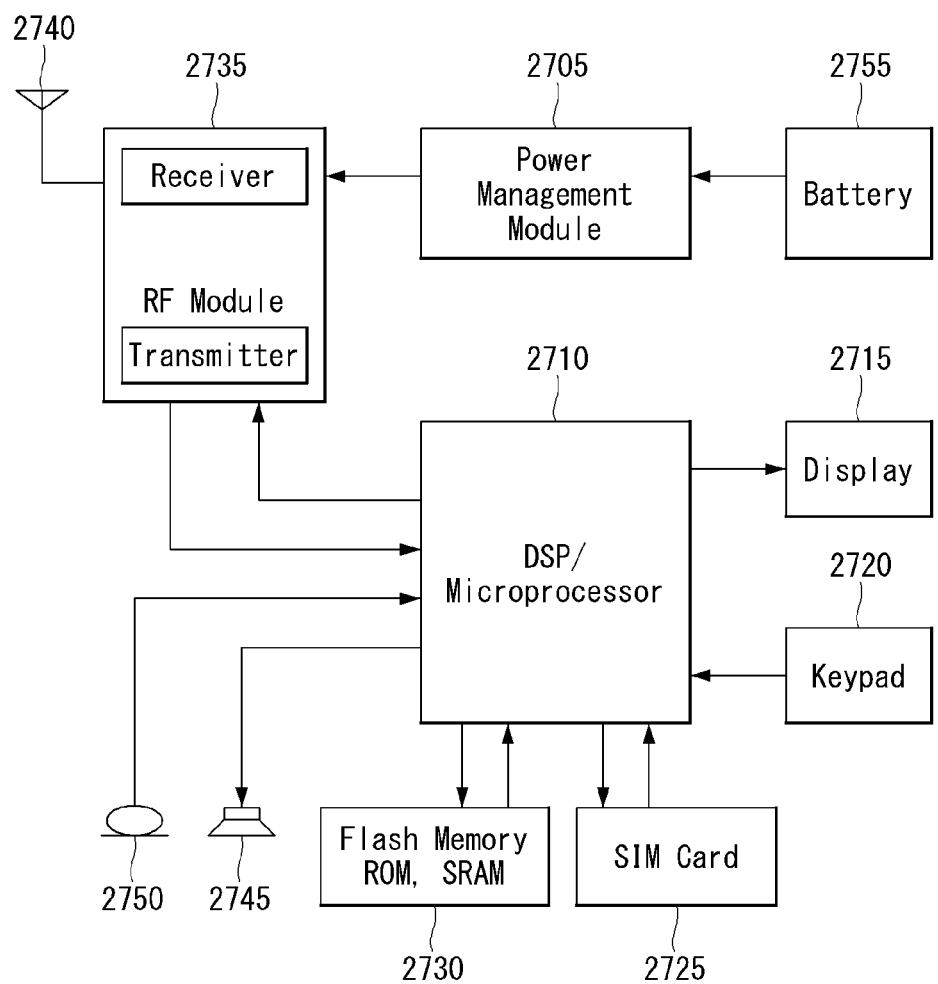
[Figure 27]

METHOD FOR PERFORMING RRC CONNECTION PROCEDURE IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2018/009085, filed on Aug. 9, 2018, which claims the benefit of U.S. Provisional Application No. 62/542,806, filed on Aug. 9, 2017, and 62/547,071, filed on Aug. 17, 2017, the contents of which are all hereby incorporated by reference herein in their entirety.

TECHNICAL FIELD

The present disclosure relates to a wireless communication system, and more particularly to a method of performing a radio resource control (RRC) connection procedure of a relay user equipment (UE) and a device therefor.

BACKGROUND ART

Mobile communication systems have been developed to provide voice services while guaranteeing user mobility. Such mobile communication systems have expanded their coverage from voice services through data services up to high-speed data services. However, as current mobile communication systems suffer resource shortages and users demand even higher-speed services, the development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as dual connectivity, massive Multiple Input Multiple Output (MIMO), in-band full duplex, non-orthogonal multiple access (NOMA), supporting super-wide band, and device networking, have been researched.

DISCLOSURE

Technical Problem

The present disclosure provides a method for efficiently supporting a relay discovery of a bandwidth limited (narrowband) remote UE.

The present disclosure also provides a RRC connection request procedure of a relay UE for efficiently supporting a RRC connection request procedure of a remote UE.

Embodiments are proposed to describe a method and a device for resolving the above-described technical problems. Technical problems to be resolved by the present disclosure are not limited by the above-mentioned technical problems, and other technical problems which are not mentioned above can be clearly understood from the following description by those skilled in the art to which the present disclosure pertains.

Technical Solution

In one aspect of the present disclosure, there is provided a method of performing a radio resource control (RRC) connection procedure of a relay user equipment (UE) in a wireless communication system, the method comprising, if a RRC connection procedure of a remote UE associated with the relay UE is triggered, receiving, from the remote UE, a first RRC establishment cause for a RRC connection of the remote UE; and if a RRC connection request of the relay UE is not allowed, transmitting, to a base station, a first RRC connection request including the first RRC establishment cause of the remote UE.

The method may further comprise, if the first RRC connection request is allowed by the base station, configuring a RRC connection between the relay UE and the base station; performing a service request procedure for the relay UE; and performing a service request procedure for the remote UE.

As performing the service request procedure is completed, EPS connection management (ECM) states of the relay UE and the remote UE may transition from an ECM-idle state to an ECM-CONNECTED state.

The first RRC establishment cause may be received to the relay UE through a connection activation message.

The case in which the RRC connection request of the relay UE is not allowed may correspond to a case in which a second RRC connection request including a second RRC establishment cause for a RRC connection of the relay UE is rejected by the base station after a RRC connection procedure of the relay UE is triggered together with the RRC connection procedure of the remote UE.

The second RRC connection request may be transmitted prior to the first RRC connection request.

A transmission order of the first and second RRC connection requests may be determined based on a priority of the first and second RRC establishment causes.

If a priority of the first RRC establishment cause is higher than a priority of the second RRC establishment cause, the first RRC connection request may be transmitted prior to the second RRC connection request. If the priority of the second RRC establishment cause is higher than the priority of the first RRC establishment cause, the second RRC connection request may be transmitted prior to the first RRC connection request.

The case in which the RRC connection request of the relay UE is not allowed may correspond to a case in which the RRC connection of the relay UE has been barred, and/or a case in which a timer that is set to a RRC connection re-request waiting time or a back-off time of the relay UE is running.

In another aspect of the present disclosure, there is provided a relay user equipment (UE) performing a radio resource control (RRC) connection procedure in a wireless communication system, the relay UE comprising a communication module configured to transmit and receive a signal; and a processor configured to control the communication module, wherein the processor is configured to, if a RRC connection procedure of a remote UE associated with the relay UE is triggered, receive, from the remote UE, a first RRC establishment cause for a RRC connection of the remote UE; and if a RRC connection request of the relay UE is not allowed, transmit, to a base station, a first RRC connection request including the first RRC establishment cause of the remote UE.

If the first RRC connection request is allowed by the base station, the processor may be configured to configure a RRC connection between the relay UE and the base station, perform a service request procedure for the relay UE, and perform a service request procedure for the remote UE.

As performing the service request procedure is completed, EPS connection management (ECM) states of the relay UE and the remote UE may transition from an ECM-idle state to an ECM-CONNECTED state.

The case in which the RRC connection request of the relay UE is not allowed may correspond to a case in which a second RRC connection request including a second RRC establishment cause for a RRC connection of the relay UE is rejected by the base station after a RRC connection procedure of the relay UE is triggered together with the RRC connection procedure of the remote UE.

The second RRC connection request may be transmitted prior to the first RRC connection request.

The case in which the RRC connection request of the relay UE is not allowed may correspond to a case in which the RRC connection of the relay UE has been barred, and/or a case in which a timer that is set to a RRC connection re-request waiting time or a back-off time of the relay UE is running.

Advantageous Effects

Embodiments of the present disclosure have an effect capable of more efficiently supporting a relay discovery operation of a remote UE.

Embodiments of the present disclosure have an effect capable of preventing a problem that a RRC connection of an eRemote-UE is always rejected/barred together according to the rejection/barring of a RRC connection of an eRelay-UE.

Effects obtainable from the present disclosure are not limited by the effects mentioned above, and other effects which are not mentioned above can be clearly understood from the following description by those skilled in the art to which the present disclosure pertains.

DESCRIPTION OF DRAWINGS

The accompanying drawings, which are included to provide a further understanding of the present disclosure and constitute a part of the detailed description, illustrate embodiments of the present disclosure and together with the description serve to explain the principle of the present disclosure.

FIG. 1 is a diagram schematically exemplifying an evolved packet system (EPS) to which the present disclosure is applicable.

FIG. 2 illustrates an example of evolved universal terrestrial radio access network structure to which the present disclosure is applicable.

FIG. 3 exemplifies a structure of E-UTRAN and EPC in a wireless communication system to which the present disclosure is applicable.

FIG. 4 illustrates the structure of a radio interface protocol between a UE and E-UTRAN in a wireless communication system to which the present disclosure is applicable.

FIG. 5 illustrates an S1 interface protocol structure in a wireless communication system to which the present disclosure is applicable.

FIG. 6 schematically illustrates a structure of a physical channel in a wireless communication system to which the present disclosure is applicable.

FIG. 7 illustrates EMM and ECM states in a wireless communication system to which the present disclosure is applicable.

FIG. 8 illustrates a contention-based random access procedure in a wireless communication system to which the present disclosure is applicable.

FIG. 9 illustrates a 5G system architecture using reference point representation.

FIG. 10 illustrates a 5G system architecture using a service-based representation.

FIG. 11 illustrates an NG-RAN architecture to which the present disclosure is applicable.

FIG. 12 illustrates a wireless protocol stack to which the present disclosure is applicable.

FIG. 13 illustrates an RM state model to which the present disclosure is applicable.

FIG. 14 illustrates a CM state model to which the present disclosure is applicable.

FIG. 15 illustrates an interaction between UEs in an announcing UE procedure for UE-to-network relay discovery.

FIG. 16 illustrates an interaction between UEs in a discoveree UE procedure for UE-to-network relay discovery.

FIG. 17 illustrates status indicator parameters.

FIG. 18 illustrates a discovery problem due to a bandwidth limited device.

FIG. 19 illustrates an incompatible PSDCH physical structure for one PRB bandwidth (BW) limited device.

FIG. 20 illustrates a multi-shoot discovery announcement by a relay UE according to an embodiment of the present disclosure.

FIG. 21 illustrates association between request transmission and response transmission discovery resources that are applicable to the present disclosure.

FIG. 22 illustrates a discovery problem due to bandwidth limited devices.

FIG. 23 is a flow chart illustrating a RRC connection request procedure according to Invention proposal 1.

FIG. 24 is a flow chart illustrating a RRC connection request procedure according to Invention proposal 2.

FIG. 25 is a flow chart illustrating a method of performing a RRC connection procedure of a relay UE according to an embodiment of the present disclosure.

FIG. 26 illustrates a block configuration diagram of a communication device according to an embodiment of the present disclosure.

FIG. 27 illustrates a block configuration diagram of a communication device according to an embodiment of the present disclosure.

MODE FOR INVENTION

In what follows, preferred embodiments according to the present disclosure will be described in detail with reference to appended drawings. The detailed descriptions provided below together with appended drawings are intended only to explain illustrative embodiments of the present disclosure, which should not be regarded as the sole embodiments of the present disclosure. The detailed descriptions below include specific information to provide complete understanding of the present disclosure. However, those skilled in the art will be able to comprehend that the present disclosure may be embodied without the specific information.

For some cases, to avoid obscuring the technical principles of the present disclosure, structures and devices well-known to the public may be omitted or may be illustrated in the form of block diagrams utilizing fundamental functions of the structures and the devices.

A base station in this document is regarded as a terminal node of a network, which performs communication directly with a UE. In this document, particular operations regarded to be performed by the base station may be performed by a upper node of the base station depending on situations. In other words, it is apparent that in a network consisting of a plurality of network nodes including a base station, various operations performed for communication with a UE may be performed by the base station or by network nodes other than the base station. The term Base Station (BS) may be replaced with a fixed station, Node B, evolved-NodeB (eNB), Base Transceiver System (BTS), or Access Point (AP). Furthermore, a terminal may be fixed or mobile; and the term may be replaced with User Equipment (UE), Mobile Station (MS), User Terminal (UT), Mobile Subscriber Station (MSS), Subscriber Station (SS), Advanced Mobile Station (AMS), Wireless Terminal (WT), Machine-Type Communication (MTC) device, Machine-to-Machine (M2M) device, or Device-to-Device (D2D) device.

In what follows, downlink (DL) refers to communication from a base station to a terminal, while uplink (UL) refers to communication from a terminal to a base station. In downlink transmission, a transmitter may be part of the base station, and a receiver may be part of the terminal. Similarly, in uplink transmission, a transmitter may be part of the terminal, and a receiver may be part of the base station.

Specific terms used in the following descriptions are introduced to help understanding the present disclosure, and the specific terms may be used in different ways as long as it does not leave the technical scope of the present disclosure.

The technology described below may be used for various types of wireless access systems based on Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), or Non-Orthogonal Multiple Access (NOMA). CDMA may be implemented by such radio technology as Universal Terrestrial Radio Access (UTRA) or CDMA2000. TDMA may be implemented by such radio technology as Global System for Mobile communications (GSM), General Packet Radio Service (GPRS), or Enhanced Data rates for GSM Evolution (EDGE). OFDMA may be implemented by such radio technology as the IEEE 802.11 (Wi-Fi), the IEEE 802.16 (WiMAX), the IEEE 802-20, or Evolved UTRA (E-UTRA). UTRA is part of the Universal Mobile Telecommunications System (UMTS). The 3rd Generation Partnership Project (3GPP) Long Term Evolution (LTE) is part of the Evolved UMTS (E-UMTS) which uses the E-UTRA, employing OFDMA for downlink and SC-FDMA for uplink transmission. The LTE-A (Advanced) is an evolved version of the 3GPP LTE system.

Embodiments of the present disclosure may be supported by standard documents disclosed in at least one of wireless access systems including the IEEE 802, 3GPP, and 3GPP2 specifications. In other words, among the embodiments of the present disclosure, those steps or parts omitted for the purpose of clearly describing technical principles of the present disclosure may be supported by the documents above. Furthermore, all of the terms disclosed in this document may be explained with reference to the standard documents.

To clarify the descriptions, this document is based on the 3GPP LTE/LTE-A, but the technical features of the present disclosure are not limited to the current descriptions.

Terms used in this document are defined as follows.

Universal Mobile Telecommunication System (UMTS): the 3rd generation mobile communication technology based on GSM, developed by the 3GPP Evolved Packet System (EPS): a network system comprising an Evolved Packet Core (EPC), a packet switched core network based on the Internet Protocol (IP) and an access network such as the LTE and UTRAN. The EPS is a network evolved from the UMTS.

NodeB: the base station of the UMTS network. NodeB is installed outside and provides coverage of a macro cell.

eNodeB: the base station of the EPS network. eNodeB is installed outside and provides coverage of a macro cell.

Home NodeB: it is installed indoors as a base station of the UMTS network and has coverage of a micro cell scale.

Home eNodeB: it is installed indoors as a base station of the EPS network and has coverage of a micro cell scale.

User Equipment (UE): A UE may be called a terminal, Mobile Equipment (ME), or Mobile Station (MS). A UE may be a portable device such as a notebook computer, mobile phone, Personal Digital Assistant (PDA), smart phone, or a multimedia device; or a fixed device such as a Personal Computer (PC) or vehicle-mounted device. The term UE may refer to an MTC terminal in the description related to MTC.

IP Multimedia Subsystem (IMS): a sub-system providing multimedia services based on the IP International Mobile Subscriber Identity (IMSI): a globally unique subscriber identifier assigned in a mobile communication network Machine Type Communication (MTC): communication performed by machines without human intervention. It may be called Machine-to-Machine (M2M) communication.

MTC terminal (MTC UE or MTC device): a terminal (for example, a vending machine, meter, and so on) equipped with a communication function operating through a mobile communication network (For example, communicating with an MTC server via a PLMN) and performing an MTC function MTC server: a server on a network managing MTC terminals. It may be installed inside or outside a mobile communication network. It can provide an interface through which an MTC user can access the server. Furthermore, an MTC server can provide MTC-related services to other servers (in the form of Services Capability Server (SCS)) or the MTC server itself may be an MTC Application Server.

(MTC) application: services (to which MTC is applied) (e.g., remote metering, traffic movement tracking, weather observation sensors, and so on)

(MTC) Application Server: a server on a network in which (MTC) applications are performed MTC feature: a function of a network to support MTC applications. For example, MTC monitoring is a feature intended to prepare for loss of a device in an MTC application such as remote metering, and low mobility is a feature intended for an MTC application with respect to an MTC terminal such as a vending machine.

MTC User (MTC User): The MTC user uses the service provided by the MTC server.

MTC subscriber: an entity having a connection relationship with a network operator and providing services to one or more MTC terminals.

MTC group: an MTC group shares at least one or more MTC features and denotes a group of MTC terminals belonging to MTC subscribers.

Services Capability Server (SCS): an entity being connected to the 3GPP network and used for communicating with an MTC InterWorking Function (MTC-IWF) on a Home PLMN (HPLMN) and an MTC terminal. The SCS provides the capability for use by one or more MTC applications.

External identifier: a globally unique identifier used by an external entity (for example, an SCS or an Application Server) of the 3GPP network to indicate (or identify) an MTC terminal (or a subscriber to which the MTC terminal belongs). An external identifier comprises a domain identifier and a local identifier as described below.

Domain identifier: an identifier used for identifying a domain in the control region of a mobile communication network service provider. A service provider can use a separate domain identifier for each service to provide an access to a different service.

Local identifier: an identifier used for deriving or obtaining an International Mobile Subscriber Identity (IMSI). A local identifier should be unique within an application domain and is managed by a mobile communication network service provider.

Radio Access Network (RAN): a unit including a Node B, a Radio Network Controller (RNC) controlling the Node B, and an eNodeB in the 3GPP network. The RAN is defined at the terminal level and provides a connection to a core network.

Home Location Register (HLR)/Home Subscriber Server (HSS): a database provisioning subscriber information within the 3GPP network. An HSS can perform functions of configuration storage, identity management, user state storage, and so on.

RAN Application Part (RANAP): an interface between the RAN and anode in charge of controlling a core network (in other words, a Mobility Management Entity (MME)/Serving GPRS (General Packet Radio Service) Supporting Node (SGSN)/Mobile Switching Center (MSC)).

Public Land Mobile Network (PLMN): a network formed to provide mobile communication services to individuals. The PLMN may be formed separately for each operator.

Non-Access Stratum (NAS): a functional layer for exchanging signals and traffic messages between a terminal and a core network at the UMTS and EPS protocol stack. The NAS is used primarily for supporting mobility of a terminal and a session management procedure for establishing and maintaining an IP connection between the terminal and a PDN GW.

Service Capability Exposure Function (SCEF): An entity within the 3GPP architecture for service capability exposure that provides a means for securely exposing services and capabilities provided by 3GPP network interfaces.

Mobility Management Entity (MME): a network node in an EPS network which performs mobility management and session management functions.

Packet Data Network Gateway (PDN-GW): a network node in the EPS network which performs UE IP address allocation, packet screening and filtering, and charging data collection functions.

Serving Gateway (GW): a network node in the EPS network which performs functions of mobility anchor, packet routing, idle mode packet buffering, and triggering paging for the UE of MME, etc.

Policy and Charging Rule Function (PCRF): a node in the EPS network which performs policy decision to dynamically apply differentiated QoS and charging policy for each service flow.

Open Mobile Alliance Device Management (OMA DM): a protocol designed to manage mobile devices, such as mobile phones, PDAs, and portable computers, which performs functions of device configuration, firmware upgrade, error report, etc.

Operation Administration and Maintenance (OAM): a group of network management functions that provide network fault indication, performance information, and data and diagnosis functions.

NAS configuration Management Object (MO): a management object (MO) used to configure the UE with parameters related to NAS functionality.

Packet Data Network (PDN): a network in which a server (e.g., MMS server, WAP server, etc.) supporting a specific service is located.

PDN connection: a connection from the UE to the PDN, i.e., the association (connection) between the UE represented by the IP address and the PDN represented by the APN.

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs).

Home Location Register (HLR)/Home Subscriber Server (HSS): a database (DB) that represents subscriber information within the 3GPP network.

Non-Access Stratum (NAS): an upper stratum of the control plane between the UE and the MME. It supports mobility management, session management, IP address maintenance, etc. between the UE and the network.

Access Stratum (AS): it includes a protocol stack between the UE and the radio (or access) network and is responsible for transmitting data and network control signals.

In what follows, the present disclosure will be described based on the terms defined above.

Overview of System to which the Present Disclosure is Applicable

FIG. 1 illustrates an Evolved Packet System (EPS) to which the present disclosure is applicable.

The network structure of FIG. 1 is a simplified diagram restructured from an Evolved Packet System (EPS) including Evolved Packet Core (EPC).

The EPC is a main component of the System Architecture Evolution (SAE) intended for improving performance of the 3GPP technologies. SAE is a research project for determining a network structure supporting mobility between multiple heterogeneous networks. For example, SAE is intended to provide an optimized packet-based system which supports various IP-based wireless access technologies, provides much more improved data transmission capability, and so on.

More specifically, the EPC is the core network of an IP-based mobile communication system for the 3GPP LTE system and capable of supporting packet-based real-time and non-real time services. In the existing mobile communication systems (namely, in the 2nd or 3rd mobile communication system), functions of the core network have been implemented through two separate sub-domains: a Circuit- Switched (CS) sub-domain for voice and a Packet-Switched (PS) sub-domain for data. However, in the 3GPP LTE system, an evolution from the 3rd mobile communication system, the CS and PS sub-domains have been unified into a single IP domain. In other words, in the 3GPP LTE system, connection between UEs having IP capabilities may be established through an IP-based base station (for example, eNodeB), EPC, and application domain (for example, IMS). In other words, the EPC provides the architecture essential for implementing end-to-end IP services.

The EPC comprises various components, where FIG. 1 illustrates part of the EPC components, including a Serving Gateway (SGW or S-GW), Packet Data Network Gateway (PDN GW or PGW or P-GW), Mobility Management Entity (MME), Serving GPRS Supporting Node (SGSN), and enhanced Packet Data Gateway (ePDG).

The SGW operates as a boundary point between the Radio Access Network (RAN) and the core network and maintains a data path between the eNodeB and the PDN GW. Furthermore, in case the UE moves across serving areas by the eNodeB, the SGW acts as an anchor point for local mobility. In other words, packets may be routed through the SGW to ensure mobility within the E-UTRAN (Evolved-UMTS (Universal Mobile Telecommunications System) Terrestrial Radio Access Network defined for the subsequent versions of the 3GPP release 8). Furthermore, the SGW may act as an anchor point for mobility between the E-UTRAN and other 3GPP networks (the RAN defined before the 3GPP release 8, for example, UTRAN or GERAN (GSM (Global System for Mobile Communication)/EDGE (Enhanced Data rates for Global Evolution) Radio Access Network).

The PDN GW corresponds to a termination point of a data interface to a packet data network. The PDN GW can support policy enforcement features, packet filtering, charging support, and so on. Furthermore, the PDN GW can act as an anchor point for mobility management between the 3GPP network and non-3GPP networks (for example, an unreliable network such as the Interworking Wireless Local Area Network (I-WLAN) or reliable networks such as the Code Division Multiple Access (CDMA) network and WiMax).

In the example of a network structure as shown in FIG. 1, the SGW and the PDN GW are treated as separate gateways; however, the two gateways may be implemented according to single gateway configuration option.

The MME performs signaling for the UE's access to the network, supporting allocation, tracking, paging, roaming, handover of network resources, and so on; and control functions. The MME controls control plane functions related to subscribers and session management. The MME manages a plurality of eNodeBs and performs signaling of the conventional gateway's selection for handover to other 2G/3G networks. Furthermore, the MME performs such functions as security procedures, terminal-to-network session handling, idle terminal location management, and so on.

The SGSN deals with all kinds of packet data including the packet data for mobility management and authentication of the user with respect to other 3GPP networks (for example, the GPRS network).

The ePDG acts as a security node with respect to an unreliable, non-3GPP network (for example, I-WLAN, WiFi hotspot, and so on).

As described with respect to FIG. 1, a UE with the IP capability can access the IP service network (for example, the IMS) that a service provider (i.e., an operator) provides, via various components within the EPC based not only on the 3GPP access but also on the non-3GPP access.

Furthermore, FIG. 1 illustrates various reference points (for example, S1-U, S1-MME, and so on). The 3GPP system defines a reference point as a conceptual link which connects two functions defined in disparate functional entities of the E-UTAN and the EPC. Table 1 below summarizes reference points shown in FIG. 1. In addition to the examples of FIG. 1, various other reference points may be defined according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point may be used intra-PLMN or inter-PLMN (e.g. in the case of Inter-PLMN HO). |
| S4 | It provides related control and mobility support between GPRS core and the 3GPP anchor function of Serving GW. In addition, if direct tunnel is not established, it provides the user plane tunneling. |
| S5 | It provides user plane tunneling and tunnel management between Serving GW and PDN GW. It is used for Serving GW relocation due to UE mobility if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra-operator packet data network (e.g., for provision of IMS services). This reference point corresponds to Gi for 3GPP accesses. |

Among the reference points shown in FIG. 1, S2a and S2b corresponds to non-3GPP interfaces. S2a is a reference point which provides reliable, non-3GPP access, related control between PDN GWs, and mobility resources to the user plane. S2b is a reference point which provides related control and mobility resources to the user plane between ePDG and PDN GW.

FIG. 2 illustrates one example of an Evolved Universal Terrestrial Radio Access Network (E-UTRAN) to which the present disclosure is applicable.

The E-UTRAN system is an evolved version of the existing UTRAN system, for example, and is also referred to as 3GPP LTE/LTE-A system. Communication network is widely deployed in order to provide various communication services such as voice (e.g., Voice over Internet Protocol (VoIP)) through IMS and packet data.

Referring to FIG. 2, E-UMTS network includes E-UTRAN, EPC and one or more UEs. The E-UTRAN includes eNBs that provide control plane and user plane protocol, and the eNBs are interconnected with each other by means of the X2 interface.

The X2 user plane interface (X2-U) is defined among the eNBs. The X2-U interface provides non-guaranteed delivery of the user plane Packet Data Unit (PDU). The X2 control plane interface (X2-CP) is defined between two neighboring eNBs. The X2-CP performs the functions of context delivery between eNBs, control of user plane tunnel between a source eNB and a target eNB, delivery of handover-related messages, uplink load management, and so on.

The eNB is connected to the UE through a radio interface and is connected to the Evolved Packet Core (EPC) through the S1 interface.

An S1 user plane interface (S1-U) is defined between the eNB and the Serving Gateway (S-GW). The S1 control plane interface (S1-MME) is defined between the eNB and the Mobility Management Entity (MME). The S1 interface performs the functions of EPS bearer service management, non-access stratum (NAS) signaling transport, network sharing, MME load balancing management, and so on. The S1 interface supports many-to-many-relation between the eNB and the MME/S-GW.

The MME may perform various functions such as NAS signaling security, Access Stratum (AS) security control, Core Network (CN) inter-node signaling for supporting mobility between 3GPP access network, IDLE mode UE reachability (including performing paging retransmission and control), Tracking Area Identity (TAI) management (for UEs in idle and active mode), selecting PDN GW and SGW, selecting MME for handover of which the MME is changed, selecting SGSN for handover to 2G or 3G 3GPP access network, roaming, authentication, bearer management function including dedicated bearer establishment, Public Warning System (PWS) (including Earthquake and Tsunami Warning System (ETWS) and Commercial Mobile Alert System (CMAS), supporting message transmission and so on.

FIG. 3 exemplifies a structure of E-UTRAN and EPC in a wireless communication system to which the present disclosure is applicable.

Referring to FIG. 3, an eNB may perform functions of selecting gateway (e.g., MME), routing to gateway during radio resource control (RRC) is activated, scheduling and transmitting broadcast channel (BCH), dynamic resource allocation to UE in uplink and downlink, mobility control connection in LTE_ACTIVE state. As described above, the gateway in EPC may perform functions of paging origination, LTE_IDLE state management, ciphering of user plane, bearer control of System Architecture Evolution (SAE), ciphering of NAS signaling and integrity protection.

FIG. 4 illustrates a radio interface protocol structure between a UE and an E-UTRAN in a wireless communication system to which the present disclosure is applicable.

FIG. 4(a) illustrates a radio protocol structure for the control plane, and FIG. 4(b) illustrates a radio protocol structure for the user plane.

With reference to FIG. 4, layers of the radio interface protocol between the UE and the E-UTRAN may be divided into a first layer (L1), a second layer (L2), and a third layer (L3) based on the lower three layers of the Open System Interconnection (OSI) model, widely known in the technical field of communication systems. The radio interface protocol between the UE and the E-UTRAN consists of the physical layer, data link layer, and network layer in the horizontal direction, while in the vertical direction, the radio interface protocol consists of the user plane, which is a protocol stack for delivery of data information, and the control plane, which is a protocol stack for delivery of control signals.

The control plane acts as a path through which control messages used for the UE and the network to manage calls are transmitted. The user plane refers to the path through which the data generated in the application layer, for example, voice data, Internet packet data, and so on are transmitted. In what follows, described will be each layer of the control and the user plane of the radio protocol.

The physical layer (PHY), which is the first layer (L1), provides information transfer service to upper layers by using a physical channel. The physical layer is connected to the Medium Access Control (MAC) layer located at the upper level through a transport channel through which data are transmitted between the MAC layer and the physical layer. Transport channels are classified according to how and with which features data are transmitted through the radio interface. And data are transmitted through the physical channel between different physical layers and between the physical layer of a transmitter and the physical layer of a receiver. The physical layer is modulated according to the Orthogonal Frequency Division Multiplexing (OFDM) scheme and employs time and frequency as radio resources.

A few physical control channels are used in the physical layer. The Physical Downlink Control Channel (PDCCH) informs the UE of resource allocation of the Paging Channel (PCH) and the Downlink Shared Channel (DL-SCH); and Hybrid Automatic Repeat reQuest (HARQ) information related to the Uplink Shared Channel (UL-SCH). Furthermore, the PDCCH can carry a UL grant used for informing the UE of resource allocation of uplink transmission. The Physical Control Format Indicator Channel (PCFICH) informs the UE of the number of OFDM symbols used by PDCCHs and is transmitted at each subframe. The Physical HARQ Indicator Channel (PHICH) carries a HARQ ACK (ACKnowledge)/NACK (Non-ACKnowledge) signal in response to uplink transmission. The Physical Uplink Control Channel (PUCCH) carries uplink control information such as HARQ ACK/NACK with respect to downlink transmission, scheduling request, Channel Quality Indicator (CQI), and so on. The Physical Uplink Shared Channel (PUSCH) carries the UL-SCH.

The MAC layer of the second layer (L2) provides a service to the Radio Link Control (RLC) layer, which is an upper layer thereof, through a logical channel. Furthermore, the MAC layer provides a function of mapping between a logical channel and a transport channel; and multiplexing/demultiplexing a MAC Service Data Unit (SDU) belonging to the logical channel to the transport block, which is provided to a physical channel on the transport channel.

The RLC layer of the second layer (L2) supports reliable data transmission. The function of the RLC layer includes concatenation, segmentation, reassembly of the RLC SDU, and so on. To satisfy varying Quality of Service (QoS) requested by a Radio Bearer (RB), the RLC layer provides three operation modes: Transparent Mode (TM), Unacknowledged Mode (UM), and Acknowledge Mode (AM). The AM RLC provides error correction through Automatic Repeat reQuest (ARQ). Meanwhile, in case the MAC layer performs the RLC function, the RLC layer may be incorporated into the MAC layer as a functional block.

The Packet Data Convergence Protocol (PDCP) layer of the second layer (L2) performs the function of delivering, header compression, ciphering of user data in the user plane, and so on. Header compression refers to the function of reducing the size of the Internet Protocol (IP) packet header which is relatively large and contains unnecessary control to efficiently transmit IP packets such as the IPv4 (Internet Protocol version 4) or IPv6 (Internet Protocol version 6) packets through a radio interface with narrow bandwidth. The function of the PDCP layer in the control plane includes delivering control plane data and ciphering/integrity protection.

The Radio Resource Control (RRC) layer in the lowest part of the third layer (L3) is defined only in the control plane. The RRC layer performs the role of controlling radio resources between the UE and the network. To this purpose, the UE and the network exchange RRC messages through the RRC layer. The RRC layer controls a logical channel, transport channel, and physical channel with respect to configuration, re-configuration, and release of radio bearers. A radio bearer refers to a logical path that the second layer (L2) provides for data transmission between the UE and the network. Configuring a radio bearer indicates that characteristics of a radio protocol layer and channel are defined to provide specific services; and each individual parameter and operating methods thereof are determined. Radio bearers may be divided into Signaling Radio Bearers (SRBs) and Data RBs (DRBs). An SRB is used as a path for transmitting an RRC message in the control plane, while a DRB is used as a path for transmitting user data in the user plane.

The Non-Access Stratum (NAS) layer in the upper of the RRC layer performs the function of session management, mobility management, and so on.

A cell constituting the base station is set to one of 1.25, 2.5, 5, 10, and 20 MHz bandwidth, providing downlink or uplink transmission services to a plurality of UEs. Different cells may be set to different bandwidths.

Downlink transport channels transmitting data from a network to a UE include a Broadcast Channel (BCH) transmitting system information, PCH transmitting paging messages, DL-SCH transmitting user traffic or control messages, and so on. Traffic or a control message of a downlink multi-cast or broadcast service may be transmitted through the DL-SCH or through a separate downlink Multicast Channel (MCH). Meanwhile, uplink transport channels transmitting data from a UE to a network include a Random Access Channel (RACH) transmitting the initial control message and a Uplink Shared Channel (UL-SCH) transmitting user traffic or control messages.

Logical channels, which are located above the transport channels and are mapped to the transport channels. The logical channels may be distinguished by control channels for delivering control area information and traffic channels for delivering user area information. The control channels include a Broadcast Control Channel (BCCH), a Paging Control Channel (PCCH), a Common Control Channel (CCCH), a dedicated control channel (DCCH), a Multicast Control Channel (MCCH), and etc. The traffic channels include a dedicated traffic channel (DTCH), and a Multicast Traffic Channel (MTCH), etc. The PCCH is a downlink channel that delivers paging information, and is used when network does not know the cell where a UE belongs. The CCCH is used by a UE that does not have RRC connection with network. The MCCH is a point-to-multipoint downlink channel which is used for delivering Multimedia Broadcast and Multicast Service (MBMS) control information from network to UE. The DCCH is a point-to-point bi-directional channel which is used by a UE that has RRC connection delivering dedicated control information between UE and network. The DTCH is a point-to-point channel which is dedicated to a UE for delivering user information that may be present in uplink and downlink. The MTCH is a point-to-multipoint downlink channel for delivering traffic data from network to UE.

In case of uplink connection between the logical channel and the transport channel, the DCCH may be mapped to UL-SCH, the DTCH may be mapped to UL-SCH, and the CCCH may be mapped to UL-SCH. In case of downlink connection between the logical channel and the transport channel, the BCCH may be mapped to BCH or DL-SCH, the PCCH may be mapped to PCH, the DCCH may be mapped to DL-SCH, the DTCH may be mapped to DL-SCH, the MCCH may be mapped to MCH, and the MTCH may be mapped to MCH.

FIG. 5 illustrates a S1 interface protocol structure in a wireless communication system to which the present disclosure is applicable.

FIG. 5(*a*) illustrates a control plane protocol stack in a S1 interface, and FIG. 5(*b*) illustrates a user plane interface protocol structure in the S1 interface.

Referring to FIG. 5, the S1 control plane interface (S1-MME) is defined between a eNB and a MME. Similar to a user plane, a transport network layer is based on IP transmission. However, for the reliable transmission of message signaling, the transport network layer is added to a stream control transmission protocol (SCTP) layer on top of an IP layer. An application layer signaling protocol is called a S1-application protocol (S1-AP).

A SCTP layer provides guaranteed delivery of application layer messages.

The transport IP layer uses point-to-point transmission for protocol data unit (PDU) signaling transmission.

For each S1-MME interface instance, single SCTP association uses a pair of stream identifiers for an S-MME common procedure. Only some of stream identifier pairs are used for an S1-MME dedicated procedure. An MME communication context identifier is allocated by the MME for the S1-MME dedicated procedure, and an eNB communication context identifier is allocated by the eNB for the S1-MME dedicated procedure. The MME communication context identifier and the eNB communication context identifier are used for identifying a UE-specific S1-MME signaling transmission bearer. The communication context identifier is delivered within each S1-AP message.

If an S1 signaling transport layer notifies an S1AP layer of signaling disconnection, the MME changes a state of the UE, which has used the corresponding signaling connection, to an ECM-IDLE state. And, the eNB releases RRC connection of the corresponding UE.

An S1 user plane interface (S1-U) is defined between the eNB and S-GW. The S1-U interface provides non-guaranteed delivery of a user plane PDU between the eNB and the S-GW. The transport network layer is based on IP transmission, and a GPRS tunneling protocol user plane (GTP-U) layer is used on top of the UDP/IP layer to deliver the user plane PDU between the eNB and the S-GW.

FIG. 6 schematically illustrates a structure of a physical channel in a wireless communication system to which the present disclosure is applicable.

Referring to FIG. 6, a physical channel sends signaling and data over a radio resource consisting of one or more subcarriers in a frequency domain and one or more symbols in a time domain.

A subframe with a length of 1.0 ms consists of a plurality of symbols. A specific symbol(s) of the subframe (e.g., a first symbol of the subframe) may be used for a PDCCH. The PDCCH carries information (e.g., resource block and modulation and coding scheme (MCS), etc.) about dynamically allocated resources.

EMM and ECM States

An EPS mobility management (EMM) state and an EPS connection management (ECM) state are described below.

FIG. 7 illustrates EMM and ECM states in a wireless communication system to which the present disclosure is applicable.

Referring to FIG. 7, in order to manage mobility of the UE in the NAS layer located in the control planes of the UE and the MME, an EMM-REGISTERED state and an EMM-DEREGISTERED state may be defined according to whether the UE has been attached to or detached from the network. The EMM-REGISTERED state and the EMM-DEREGISTERED state may be applied to the UE and the MME.

The UE is initially in the EMM-DEREGISTERED state like when the UE is first powered on, and performs registering with a network through an initial attach procedure in order to attach the UE to the corresponding network. If the attach procedure is performed successfully, the UE and the MME transition to the EMM-REGISTERED state. Further, if the UE is powered off or the UE is in a radio link failure (i.e., if a packet error rate on a radio link exceeds a reference value), the UE is detached from the network and transitions to the EMM-DEREGISTERED state.

In addition, an ECM-CONNECTED state and an ECM-IDLE state may be defined to manage signaling connection between the UE and the network. The ECM-CONNECTED state and the ECM-IDLE state may also be applied to the UE and the MME. The ECM connection consists of RRC connection configured between the UE and the eNB and S1 signaling connection configured between the eNB and the MME. That is, the fact that the ECM connection has been configured/released means that both the RRC connection and the S1 signaling connection have been configured/released.

The RRC state represents whether the RRC layer of the UE is logically connected to the RRC layer of the eNB. In other words, if the RRC layer of the UE is connected to the RRC layer of the eNB, the UE is in the RRC_CONNECTED state. If the RRC layer of the UE is not connected to the RRC layer of the eNB, the UE is in the RRC_IDLE state.

The network can grasp the presence of the UE in the ECM-CONNECTED state on a per cell basis and can efficiently control the UE.

On the other hand, the network cannot grasp the presence of the UE in the ECM-IDLE state, and a core network (CN) manages the UE on the basis of a tracking area unit which is a local unit larger than the cell. When the UE is in the ECM-IDLE state, the UE performs discontinuous reception (DRX) configured by the NAS using an ID solely allocated in the tracking area. That is, the UE may receive a broadcast of system information and paging information by monitoring a paging signal at a specific paging occasion for each UE-specific paging DRX cycle.

When the UE is in the ECM-IDLE state, the network does not carry context information of the UE. Thus, the UE in the ECM-IDLE state may perform a mobility-related procedure based on the UE, such as cell selection or cell reselection, without following a command of the network. If a location of the UE in the ECM-IDLE state differs from a location that the network knows, the UE may inform the network of a location of the corresponding UE through a tracking area update (TAU) procedure.

On the other hand, when the UE is in the ECM-CONNECTED state, mobility of the UE is managed by a command of the network. In the ECM-CONNECTED state, the network knows a cell to which the UE belongs. Thus, the network can transmit and/or receive data to and/or from the UE, control mobility of the UE such as handover, and perform cell measurement with respect to neighboring cells.

As described above, the UE has to transition to the ECM-CONNECTED state in order to receive general mobile communication services such as voice or data. The UE is initially in the ECM-IDLE state in the same manner as the EMM state like when the UE is first powered on, and the UE and the MEE transition to the ECM connection state if the UE successfully registers with the corresponding network through the initial attach procedure. Further, if the UE has registered with the network but is not allocated radio resources because traffic is inactivated, the UE is in the ECM-IDLE state. If new uplink or downlink traffic is generated in the corresponding UE, the UE and the MME transition to the ECM-CONNECTED state through a Service Request procedure.

Random Access Procedure

A random access procedure provided by the LTE/LTE-A system is described below.

The random access procedure is used for a UE to obtain uplink synchronization with an eNB or to have uplink radio resources allocated thereto. After the UE is powered on, the UE obtains downlink synchronization with an initial cell and receives system information. The UE obtains, from the system information, information about a set of available random access preambles and radio resources used to transmit a random access preamble. The radio resources used to transmit the random access preamble may be specified as a combination of at least one subframe index and an index on a frequency domain. The UE transmits a random access preamble randomly selected from a set of random access preambles, and the eNB receiving the random access preamble sends a timing alignment (TA) value for the uplink synchronization to the UE through a random access response. Hence, the UE obtains the uplink synchronization.

The random access procedure is a procedure common to frequency division duplex (FDD) and time division duplex (TDD). The random access procedure is irrelevant to a cell size and is also irrelevant to the number of serving cells if carrier aggregation (CA) is configured.

First, the UE performs the random access procedure:
- if the UE performs initial access in a RRC idle state because it does not have RRC connection with the eNB
- if the UE performs an RRC connection re-establishment procedure
- if the UE first accesses a target cell in a handover process
- if the random access procedure is requested by a command from the eNB
- if data to be transmitted in downlink occurs in an uplink non-synchronized situation in a RRC connection state
- if data to be transmitted in uplink occurs in an uplink non-synchronized situation or in a situation, in which designated radio resources used to request radio resources are not allocated, in the RRC connection state
- if the positioning of the UE is performed in a situation, in which timing advance is necessary, in the RRC connection state
- if a recovery process is performed upon radio link failure or handover failure.

In 3GPP Rel-10, a method for commonly applying a timing advance (TA) value applicable to one specific cell (e.g., P cell) to a plurality of cells in a radio access system supporting carrier aggregation has been considered. The UE may aggregate a plurality of cells belonging to different frequency bands (i.e., greatly spaced apart on frequency) or a plurality of cells having different propagation characteristics. Further, for a specific cell, in order to expand a coverage or remove a coverage hole, if the UE performs communication with an eNB (i.e., macro eNB) through one cell and performs communication with a secondary eNB (SeNB) through other cell in a situation in which a remote radio header (RRH) (i.e., repeater), a small cell such as a femto cell or a pico cell, or the SeNB is disposed in the cell, the plurality of cells may have different propagation delay characteristics. In this case, if the UE performs uplink transmission using the method for commonly applying one TA value to the plurality of cells, the uplink transmission may severely affect the synchronization of an uplink signal transmitted on the plurality of cells. Thus, a plurality of TAs may be used in a CA situation in which the plurality of cells is aggregated. In 3GPP Rel-11, in order to support multiple TAs, the independent allocation of the TA may be considered for each specific cell group. This is called a TA group (TAG). The TAG may include one or more cells, and the same TA may be commonly applied to one or more cells included in a TAG. In order to support the multiple TAs, an MAC TA command control element consists of 2-bit TAG identification (ID) and 6-bit TA command field.

The UE in which carrier aggregation is configured performs a random access procedure if the UE performs the random access procedure described above in relation to the P cell. In case of a TAG (i.e., a primary TAG (pTAG)) to which the P cell belongs, as in an existing technology, TA determined based on the P cell or adjusted through a random access procedure involved in the P cell may be applied to all of cell(s) within the pTAG. On the other hand, in case of a TAG (i.e., secondary TAG (sTAG)) including only an S cell, TA determined based on a specific S cell within the sTAG may be applied to all of cell(s) within the corresponding sTAG. In this instance, the TA may be obtained by a random access procedure initiated by the eNB. More specifically, the S cell is configured as a random access channel (RACH) resource within the sTAG, and the eNB requests RACH access in the S cell in order to determine the TA. That is, the eNB initiates RACH transmission on S cells in response to a PDCCH order transmitted in the P cell. A response message for an S cell preamble is transmitted via a P cell using a random access radio network temporary identifier (RA-RNTI). The UE may apply TA, determined based on an S cell which has successfully completed random access, to all of cell(s) in a corresponding sTAG. As described above, the random access procedure may be performed even on the S cell in order to obtain the timing alignment of the sTAG to which the corresponding S cell belongs.

The LTE/LTE-A system provides both a contention based random access procedure, in which the UE randomly selects one preamble in a specific set and uses it, and a non-contention based random access procedure, which uses a random access preamble the eNB allocates to only a specific UE, in a process of selecting a random access preamble (RACH preamble). However, the non-contention based random access procedure may be used for only the above-described handover process, the case where it is requested by a command from the eNB, the UE positioning, and/or timing advance alignment for the sTAG. After the random access procedure is completed, common uplink/downlink transmission is generated.

A relay node (RN) also supports both the contention based random access procedure and the non-contention based random access procedure. When the relay node performs the random access procedure, it suspends RN subframe configuration at that point of time. That is, it means temporarily discarding the RN subframe configuration. Thereafter, the RN subframe configuration is resumed at time at which the random access procedure is successfully completed.

FIG. 8 illustrates a contention-based random access procedure in a wireless communication system to which the present disclosure is applicable.

(1) First Message (Msg 1, Message 1)

First, a UE randomly selects one random access preamble (RACH preamble) from a set of random access preambles indicated by system information or a handover command, and selects and transmits a physical RACH (PRACH) resource capable of transmitting the random access preamble.

The random access preamble is transmitted in 6 bits in a RACH transport channel. The 6 bits consist of 5-bit random identity for identifying the UE that performs RACH transmission and 1 bit (e.g., indicating the size of a third message Msg3) for representing additional information.

An eNB receiving the random access preamble from the UE decodes the random access preamble and obtains an RA-RNTI. The RA-RNTI related to the PRACH to which the random access preamble is transmitted is determined by time-frequency resource of the random access preamble transmitted by the corresponding UE.

(2) Second Message (Msg 2, Message 2)

The eNB sends, to the UE, a random access response addressed by the RA-RNTI obtained via the preamble on the first message. The random access response may include a random access (RA) preamble index/identifier, uplink (UL) grant informing of uplink radio resources, a temporary cell-RNTI (TC-RNTI), and a time alignment command (TAC). The TAC is information indicating a time alignment command that the eNB sends to the UE in order to maintain uplink time alignment. The UE updates uplink transmission timing using the TAC. When the UE updates time alignment, the UE initiates or restarts a time alignment timer. The UL grant includes an uplink resource allocation and a transmit power command (TPC) that are used to transmit a scheduling message (third message) to be described later. The TPC is used to determine transmission power for a scheduled PUSCH.

After the UE transmits the random access preamble, the UE attempts to receive its own random access response in a random access response window the eNB indicates via system information or a handover command, detects a PDCCH masked with an RA-RNTI corresponding to PRACH, and receives a PDSCH indicated by the detected PDCCH. Information about the random access response may be transmitted in the format of a MAC packet data unit (PDU), and the MAC PDU may be transferred via the PDSCH. The PDCCH may include information about the UE that has to receive the PDSCH, information about frequency and time of radio resources of the PDSCH, and a transmission format of the PDSCH. As described above, once the UE succeeds in detecting the PDCCH transmitted to itself, the UE can properly receive the random access response transmitted to the PDSCH according to information of the PDCCH.

The random access response window means a maximum time interval for which the UE transmitting the preamble waits to receive a random access response message. The random access response window has a length of 'ra-ResponseWindowSize' that starts from a subframe following three subframes from a last subframe in which the preamble is transmitted. That is, the UE waits to receive the random access response during a random access window secured following three subframes from a subframe in which preamble transmission is ended. The UE may obtain a parameter value of a random access window size 'ra-ResponseWindowsize' via the system information, and the random access window size may be determined to be a value between 2 and 10.

If the UE successfully receives a random access response having the same random access preamble index/identifier as the random access preamble that has been transmitted to the eNB, the UE suspends the monitoring of the random access response. On the other hand, if the UE does not receive a random access response message until the random access response window is terminated, or the UE does not receive a valid random access response having the same random access preamble index as the random access preamble that has been transmitted to the eNB, the UE considers the reception of the random access response as a failure and then may perform preamble retransmission.

As described above, a reason why the random access preamble index is necessary for the random access response is to inform which UE is valid for the UL grant, the TC-RNTI, and the TAC because random access response information for one or more UEs may be included in one random access response.

(3) Third Message (Msg 3, Message 3)

If the UE receives a valid random access response for itself, the UE individually processes each of information included in the random access response. That is, the UE applies a TAC and stores a TC-RNTI. Further, the UE transmits data stored in a buffer of the UE or newly generated data to the eNB using the UL grant. In case of a first connection of the UE, an RRC connection request generated in the RRC layer and transferred via a CCCH may be included in the third message and transmitted. In the case of an RRC connection re-establishment procedure, an RRC connection re-establishment request generated in the RRC layer and transferred via a CCCH may be included in the third message and transmitted. Furthermore, the third message may include an NAS access request message.

The third message should include an identifier of the UE. The reason is that the UEs have to be identified for a contention resolution afterwards because the eNB cannot determine which UEs perform the random access procedure in the contention based random access procedure.

There are two methods for including the identifier of the UE. In a first method, if the UE already had a valid cell identifier (C-RNTI) allocated in a corresponding cell prior to the random access procedure, the UE transmits its own cell identifier through an uplink transmission signal corresponding to the UL grant. On the other hand, if a valid cell identifier was not allocated to the UE prior to a random access procedure, the UE includes its own unique identifier (e.g., S(SAE)-TMSI or random number) in an uplink transmission signal and transmits the uplink transmission signal. In general, the unique identifier is longer than a C-RNTI.

In transmission on an UL-SCH, UE-specific scrambling is used. If a C-RNTI was allocated to the UE, the scrambling is performed based on the C-RNTI. However, if the C-RNTI was not yet allocated to the UE, the scrambling cannot be performed based on the C-RNTI, and instead, a TC-RNTI received in a random access response is used. If the UE transmitted data corresponding to the UL grant, it initiates a contention resolution timer.

(4) Fourth Message (Msg 4, Message 4)

If the eNB receives a C-RNTI of the UE from the corresponding UE through the third message, the eNB sends a fourth message to the UE using the received C-RNTI. On the other hand, when the eNB receives a unique identifier (i.e., S-TMSI or random number) from the UE through the third message, the eNB sends the fourth message to the UE using a TC-RNTI allocated to the corresponding UE in a random access response. For example, the fourth message may include a RRC connection setup message.

The UE transmits data including its own identifier through the UL grant included in the random access response, and then waits for an instruction of the eNB for the contention resolution. That is, the UE attempts to receive a PDCCH in order to receive a specific message. There are two methods for receiving the PDCCH. As described above, if the identifier of the UL in the third message transmitted in response to the UL grant is C-RNTI, the UE attempts to receive the PDCCH using its own C-RNTI, and if the identifier of the UL is a unique identifier (i.e., S-TMSI or random number), the UE attempts to receive the PDCCH using a TC-RNTI included in the random access response. Thereafter, in the former case, if the UE received the PDCCH through its own C-RNTI before the contention resolution timer expires, the UE determines that the random access procedure has been normally performed, and terminates the random access procedure. In the latter case, if the UE received the PDCCH through the TC-RNTI before the contention resolution timer expires, the UE checks data to which a PDSCH indicated by the PDCCH is transferred. If the unique identifier of the UE was included in contents of the data, the UE determines that the random access procedure has been normally performed, and terminates the random access procedure. The UE obtains the C-RNTI through the fourth message. Thereafter, the UE and a network send or receive a UE-dedicated message using the C-RNTI.

A method for a contention resolution in random access is described below.

A reason why a contention occurs in performing random access is that the number of random access preambles is basically limited. That is, because the eNB cannot allocate all the UEs a unique random access preamble for each UE, the UE randomly selects one of common random access preambles and sends the selected random access preamble. Hence, there may be a case where two or more UEs select and transmit the same random access preamble via the same radio resource (PRACH resource), but the eNB determines the received random access preamble as one random access preamble transmitted by one UE. Hence, the eNB transmits a random access response to the UE and expects that the random access response will be received by one UE. However, as described above, since the contention may occur, the two or more UEs receive one random access response and thus each perform an operation according to the reception of the one random access response. That is, there is a problem that the two or more UEs transmits different data on the same radio resource using one UL grant included in the random access response. Hence, the transmission of data may all fail, and the eNB may receive only data of a specific UE depending on location or transmission power of the UEs. In the latter case, since all the two or more UEs assume that the transmission of their data was successful, the eNB has to inform the UEs, that have failed in the contention, of information about the failure. That is, informing of information about the failure or success of the contention is called a contention resolution.

There are two methods in the contention resolution. One method is a method of using a contention resolution timer, and the other method is a method of sending an identifier of a UE succeeding in the contention to other UEs. The former method is used when the UE already has a unique C-RNTI prior to a random access process. That is, the UE that has already had the C-RNTI transmits data including its own C-RNTI to the eNB in response to a random access response and runs a contention resolution timer. Further, when PDCCH information indicated by its own C-RNTI is received before the contention resolution timer expires, the UE determines that it succeeds in the contention, and normally terminates the random access. On the contrary, if the UE does not receive a PDCCH indicated by its own C-RNTI before the contention resolution timer expires, the UE determines that it fails in the contention, and may perform again the random access procedure or may inform the upper layer of the failure of the contention. In the latter method of the two contention resolution methods, that is, the method of sending an identifier of a successful UE is used when there is no unique cell identifier in the UE before the random access procedure. That is, if the UE does not have its own cell identifier, the UE includes a higher identifier (S-TMSI or random number) than the cell identifier in data based on UL grant information included in the random access response, transmits the data, and runs the contention resolution timer. If data including its own higher identifier is transmitted on a DL-SCH before the contention resolution timer expires, the UE determines that the random access procedure has succeeded. On the other hand, if the UE does not receive data including its own higher identifier on the DL-SCH before the contention resolution timer expires, the UE determines that the random access process has failed.

Unlike in the contention based random access procedure illustrated in FIG. 11, the operation in the non-contention based random access procedure is terminated by only sending the first message and the second message. However, the UE is allocated a random access preamble from the eNB before sending to the eNB the random access preamble as the first message, sends to the eNB the allocated random access preamble as the first message, and receives a random access response from the eNB, thereby terminating the random connection procedure.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of an existing mobile communication network structure or a clean-state structure.

The 5G system is defined based on a service, and an interaction between network functions (NFs) in architecture for the 5G system can be represented in two ways as follows.

Reference point representation (FIG. 9): depicts an interaction between NF services in NFs described by a point-to-point reference point (e.g., N11) between two NFs (e.g., AMF and SMF).

Service-based representation (FIG. 10): network functions (e.g., AMF) within a control plane (CP) allow other authenticated network functions to access their services. The representation also includes a point-to-point reference point, if necessary.

FIG. 9 illustrates a 5G system architecture using reference point representation.

Referring to FIG. 9, the 5G system architecture may include various components (i.e., network functions (NFs)). FIG. 9 illustrates some of the various components, for example, an Authentication Server Function (AUSF), a (Core) Access and Mobility Management Function (AMF), a Session Management Function (SMF), a Policy Control function (PCF), an Application Function (AF), a Unified Data Management (UDM), a Data network (DN), a User plane Function (UPF), a (Radio) Access Network ((R)AN), and a User Equipment (UE).

The respective NFs support the following functions.

The AUSF stores data for the authentication of the UE.

The AMF provides a function for the connection and mobility management for each UE, and one AMF can be basically connected to one UE.

More specifically, the AMF supports functions of inter-CN node signaling for mobility between 3GPP access networks, termination of RAN CP interface (i.e., N2 interface), termination N1 of NAS signaling, NAS signaling security (NAS ciphering and integrity protection), AS security control, registration management (registration area management), connection management, idle mode UE reachability (including control and execution of paging retransmission), mobility management control (subscription and policy), support of intra-system mobility and inter-system mobility, support of network slicing, SMF selection, lawful intercept (for an interface to AMF event and L1 system), providing the delivery of a session management (SM) message between UE and SMF, transparent proxy for routing the SM message, access authentication, access authorization including roaming authority check, providing the delivery of a short message service (SMS) message between UE and SMS function (SMSF), security anchor function (SEA) and/or security context management (SCM), and the like.

Some or all functions of the AMF can be supported in a single instance of one AMF.

The DN means, for example, operator services, internet access, or 3rd party service. The DN transmits a downlink Protocol Data Unit (PDU) to the UPF or receives the PDU transmitted from the UE from the UPF.

The PCF receives information about packet flow from an application server and provides functions of determining policies such as mobility management and session management. More specifically, the PCF supports functions of supporting a unified policy framework for controlling a network operation, providing a policy rule so that CP function(s) (e.g., AMF, SMF, etc.) can enforce the policy rule, and implementing a front end for accessing related subscription information for policy decision in a user data repository (UDR).

The SMF provides a session management function. If the UE has a plurality of sessions, the sessions can be respectively managed by different SMFs.

More specifically, the SMF supports functions of session management (e.g., session establishment, modification, and release, including tunnel maintenance between the UPF and the AN node), UE IP address allocation and management (including optional authentication), selection and control of UP function, configuring traffic steering at UPF to route traffic to proper destination, termination of interfaces toward policy control functions, enforcement of control part of a policy and QoS, lawful intercept (for an interface to SM event and L1 system), termination of SM part of a NAS message, downlink data notification, an initiator of AN specific SM information (sent to AN via the AMF over N2), SSC mode decision of the session, a roaming function, and the like.

Some or all functions of the SMF can be supported within a single instance of one SMF.

The UDM stores subscription data of user, policy data, etc. The UDM includes two parts, i.e., application front end (FE) and user data repository (UDR).

The FE includes UDM FE taking charge of location management, subscription management, processing of credential, etc. and PCF taking charge of policy control. The UDR stores data required for functions provided by the UDM-FE and a policy profile required by the PCF. Data stored in the UDR includes user subscription data including subscription identifier, security credential, access and mobility related subscription data, and session related subscription data and policy data. The UDM-FE accesses subscription information stored in the UDR and supports functions of Authentication Credential Processing, User Identification Handling, access authentication, registration/mobility management, subscription management, SMS management, and the like.

The UPF transmits the downlink PDU received from the DN to the UE via the (R)AN and transmits the uplink PDU received from the UE to the DN via the (R)AN.

More specifically, the UPF supports functions of anchor point for intra/inter RAT mobility, external PDU session point of interconnect to Data Network (DN), packet routing and forwarding, packet inspection and user plane part of policy rule enforcement, lawful intercept, reporting of traffic usage, uplink classifier to support routing traffic flow to Data Network (DN), branching point to support multi-homed PDU session, QoS handling (e.g., packet filtering, gating, uplink/downlink rate enforcement) for user plane, uplink traffic verification (SDF mapping between service data flow (SDF) and QoS flow), transport level packet marking in the uplink and downlink, downlink packet buffering and downlink data notification triggering, and the like. Some or all of the functions of the UPF can be supported in a single instance of one UPF.

AF interacts with 3GPP core network to provide services (e.g., support functions of an application influence on traffic routing, network capability exposure access, interaction with policy framework for policy control, and the like).

(R)AN collectively refers to a new radio access network supporting both evolved E-UTRA, that is an evolved version of 4G radio access technology, and a New Radio (NR) access technology (e.g., gNB).

In the 5G system, a network node radio, that is responsible for transmitting and receiving radio signals with the UE, is gNB, and serves as the eNB of the EPS.

The gNB supports functions of radio resource management function (i.e., radio bearer control, radio admission control, connection mobility control, dynamic allocation of resources to the UE in uplink/downlink (scheduling)), Internet protocol (IP) header compression, encryption of user data stream and integrity protection, selection of AMF upon attachment of the UE if routing to the AMF is not determined from information provided to the UE, routing of user plane data to UPF(s), routing of control plane information to ANF, connection setup and release, scheduling and transmission of a paging message (generated from the AMF), scheduling and transmission of system broadcast information (generated from the AMF or operating and maintenance (O&M)), measurement and measurement reporting configuration for mobility and scheduling, transport level packet marking in uplink, session management, support of network slicing, QoS flow management and mapping to data radio bearer, support of a UE in an inactive mode, NAS message distribution function, NAS node selection function, radio access network sharing, dual connectivity, tight interworking between NR and E-UTRA, and the like.

The UE means a user equipment. The user equipment may be referred to as a term such as a terminal, a mobile equipment (ME), and a mobile station (MS). The user equipment may be a portable device such as a notebook computer, a cellular phone, a personal digital assistant (PDA), a smart phone, and a multimedia device, or a non-portable device such as a personal computer (PC) and a vehicle-mounted device.

Although unstructured data storage network function (UDSF), structured data storage network function (SDSF), network exposure function (NEF), and NF repository function (NRF) are not shown in this figure for clarity of explanation, all the NFs shown in this figure can perform interaction with the UDSF, the NEF and the NRF, if necessary.

The NEF provides a means to securely expose services and capabilities provided by 3GPP network functions, for example, 3rd party, internal exposure/re-exposure, application function, and edge computing. The NEF receives information from other network function(s) (based on exposed capabilities of other network function(s)). The NEF can store the received information as structured data using a standardized interface to a data storage network function. The stored information can be re-exposed by the NEF to other network functions and other application functions and can be used for other purposes such as analytics.

The NRF supports a service discovery function. The NRF receives NF Discovery Request from NF instance and provides information of the discovered NF instance to the NF instance. The NRF also maintains available NF instances and their supported services.

The SDSF is structured data by any NEF and is a selective function to support a storage and retrieval function of information.

The UDSF is unstructured data by any NF and is a selective function to support a storage and retrieval function of information.

In the 5G system, a node, that is responsible for transmitting and receiving radio signals with the UE, is gNB, and serves as the eNB of the EPS. If the UE is simultaneously connected to 3GPP access and non-3GPP access, the UE receives services via one AMF as illustrated in FIG. 9. FIG. 9 illustrates that the UE is connected to one same UPF when the UE is connected to the non-3GPP access and when the UE is connected to the 3GPP access, but the present disclosure is not limited thereto. For example, the UE may be connected to a plurality of different UPFs.

However, if the UE selects N3IWK (also referred to as 'non-3GPP interworking function (N3IWF)') in HPLMN in a roaming scenario and is connected to the non-3GPP access, the AMF managing the 3GPP access may be located in VPLMN and the AMF managing the non-3GPP access may be located in the HPLMN.

A non-3GPP access network is connected to the 5G core network via N3IWK/N3IWF. The N3IWK/N3IWF interfaces 5G core network control plane function and user plane function via the N2 and N3 interfaces, respectively.

A representative example of the non-3GPP access mentioned in the present disclosure may be WLAN access.

FIG. 9 illustrates a reference model where the UE accesses one DN using one PDU session, for convenience of explanation, but the present disclosure is not limited thereto.

The UE can simultaneously access two (i.e., local and central) data networks using multiple PDU sessions. In this instance, two SMFs may be selected for different PDU sessions. Each SMF may have a capability capable of controlling both local UPF and central UPF within the PDU session. The SMF may be independently activated for each PDU session.

Further, the UE can simultaneously access two (i.e., local and central) data networks provided within a single PDU session.

In the 3GPP system, a conceptual link connecting between the NFs in the 5G system is defined as a reference point. The following illustrates reference points included in the 5G system architecture as represented in this figure.

N1: Reference point between the UE and the AMF
N2: Reference point between the (R)AN and the AMF
N3: Reference point between the (R)AN and the UPF
N4: Reference point between the SMF and the UPF
N5: Reference point between the PCF and the AF
N6: Reference point between the UPF and the data network
N7: Reference point between the SMF and the PCF
N24: Reference point between the PCF in the visited network and the PCF in the home network
N8: Reference point between the UDM and the AMF
N9: Reference point between two core UPFs
N10: Reference point between the UDM and the SMF
N11: Reference point between the AMF and the SMF
N12: Reference point between the AMF and the AUSF
N13: Reference point between UDM and Authentication Server function (AUSF)
N14: Reference point between two AMFs
N15: Reference point between the PCF and the AMF in case of non-roaming scenario, reference point between PCF in the visited network and AMF in case of roaming scenario
N16: Reference point between two SMFs (reference point between the SMF in the visited network and the SMF in the home network in case of roaming scenario)
N17: Reference point between AMF and EIR
N18: Reference point between any NF and UDSF
N19: Reference point between NEF and SDSF FIG. 10 illustrates a 5G system architecture using a service-based representation.

Service-based interfaces illustrated in this figure represent a set of services provided/exposed by a predetermined NF. The service-based interfaces are used in the control plane. The following illustrates the service-based interfaces included in the 5G system architecture as represented in this figure.

Namf: Service-based interface exhibited by the AMF
Nsmf: Service-based interface exhibited by the SMF
Nnef: Service-based interface exhibited by the NEF
Npcf: Service-based interface exhibited by the PCF
Nudm: Service-based interface exhibited by the UDM
Naf: Service-based interface exhibited by the AF
Nnrf: Service-based interface exhibited by the NRF
Nausf: Service-based interface exhibited by the AUSF The NF service is one type of capability exposed by an NF (i.e., NF service producer) to other NF (i.e., NF service consumer) via the service-based interface. The NF can expose one or more NF service(s). The following standard is applied to define the NF service.

The NF services are derived from information flow for explaining an end-to-end function.

Complete end-to-end message flow is explained by a sequence of NF service invocation.

Two operations that the NF(s) provide its services via the service-based interface are as follows:

i) "Request-response": A control plane NF_B (i.e., NF service producer) is requested from another control plane NF_A (i.e., NF service consumer) to provide a certain NF service (including performing an operation and/or providing information). The NF_B responses NF service result based on information provided by the NF_A in the Request.

In order to fulfill the request, the NF_B may in turn consume NF services from other NF(s). In Request-response mechanism, communication is performed one to one between two NFs (i.e., consumer and producer).

ii) "Subscribe-Notify"

A control plane NF_A (i.e., NF service consumer) subscribes to a NF service provided by another control plane NF_B (i.e., NF service producer). Multiple control plane NFs may subscribe to the same control plane NF service. The NF_B notifies a result of this NF service to the interested NFs that are subscribed to this NF service. A subscription request from the consumer may include a notification request for periodic update or notification triggered through specific events (e.g., change of requested information, reaching a certain critical value, etc.). This mechanism also includes the case where the NF(s) (e.g., NF_B) implicitly subscribes to a specific notice without an explicit subscription request (e.g., the case where the NF(s) subscribes through a successful registration procedure).

FIG. 11 illustrates an NG-RAN architecture to which the present disclosure is applicable.

Referring to FIG. 11, a new generation radio access network (NG-RAN) consists of gNB (NR NodeB)(s) and/or eNB (eNodeB)(s) providing a user plane toward a UE and termination of control plane protocol.

The gNB(s) are interconnected using an Xn interface, and the eNB(s) connected to the gNB(s) and 5GC are also interconnected using the Xn interface. The gNB(s) and the eNB(s) are connected to the 5GC using an NG interface. More specifically, the gNB(s) and the eNB(s) are connected to the AMF using an NG-C interface (i.e., N2 reference point) that is a control plane interface between the NG-RAN and the 5GC, and are connected to the UPF using an NG-U interface (i.e., N3 reference point) that is a user plane interface between the NG-RAN and the 5GC.

Radio Protocol Architecture

FIG. 12 illustrates a radio protocol stack to which the present disclosure is applicable. More specifically, FIG. 12(a) illustrates a radio interface user plane protocol stack between a UE and gNB, and FIG. 12(b) illustrates a radio interface control plane protocol stack between the UE and the gNB.

The control plane means a path through which control messages used for a UE and a network to manage calls are sent. The user plane means a path through which data generated in an application layer, for example, voice data or Internet packet data, etc. are transmitted.

Referring to FIG. 12(a), the user plane protocol stack may be divided into Layer 1 (i.e., physical (PHY) layer) and Layer 2.

Referring to FIG. 12(b), the control plane protocol stack may be divided into Layer 1 (i.e., PHY layer), Layer 2, Layer 3 (i.e., radio resource control (RRC) layer), and a non-access stratum (NAS) layer.

The Layer 2 is divided into a medium access control (MAC) sublayer, a radio link control (RLC) sublayer, a packet data convergence protocol (PDC) sublayer, and a service data adaptation protocol (SDAP) sublayer (in case of the user plane).

A radio bearer is classified into two groups: data radio bearer (DRB) for user plane data and signaling radio bearer (SRB) for control plane data.

Each layer of the control plane and the user plane of the radio protocol is described below.

1) The Layer 1, i.e., the PHY layer, provides information transfer service to an upper layer by using a physical channel. The PHY layer is connected to the MAC sublayer located at an upper level through a transport channel, and data are transmitted between the MAC sublayer and the PHY layer through the transport channel. The transport channel is classified according to how and which feature data is transmitted via a radio interface. And, data is transmitted between different PHY layers, between a PHY layer of a transmitter and a PHY layer of a receiver, through a physical channel.

2) The MAC sublayer performs mapping between a logical channel and a transport channel; multiplexing/demultiplexing of MAC service data unit (SDU) belonging to one or different logical channel(s) to/from a transport block (TB) delivered to/from the PHY layer through a transport channel; scheduling information reporting; error correction through hybrid automatic repeat request (HARQ); priority handling between UEs using dynamic scheduling; priority handling between logical channels of one UE using logical channel priority; and padding.

Different kinds of data deliver a service provided by the MAC sublayer. Each logical channel type defines what type of information is delivered.

The logical channel is classified into two groups: a control channel and a traffic channel.

i) The Control Channel is used to deliver only control plane information and is as follows.

Broadcast Control Channel (BCCH): a downlink channel for broadcasting system control information.

Paging Control Channel (PCCH): a downlink channel that delivers paging information and system information change notification.

Common Control Channel (CCCH): a channel for transmitting control information between a UE and a network. This channel is used for UEs having no RRC connection with the network.

Dedicated Control Channel (DCCH): a point-to-point bi-directional channel for transmitting dedicated control information between the UE and the network. This channel is used by the UE having an RRC connection.

ii) The traffic channel is used to use only user plane information.

Dedicated Traffic Channel (DTCH): a point-to-point channel, dedicated to a single UE, for delivering user information. The DTCH may exist in both uplink and downlink.

In the downlink, connection between the logical channel and the transport channel is as follows.

The BCCH may be mapped to BCH. The BCCH may be mapped to DL-SCH. The PCCH may be mapped to PCH. The CCCH may be mapped to the DL-SCH. The DCCH may be mapped to the DL-SCH. The DTCH may be mapped to the DL-SCH.

In the uplink, connection between the logical channel and the transport channel is as follows. The CCCH may be mapped to UL-SCH. The DCCH may be mapped to the UL-SCH. The DTCH may be mapped to the UL-SCH.

3) The RLC sublayer supports three transmission modes: a transparent mode (TM), an unacknowledged mode (UM), and an acknowledged mode (AM).

The RLC configuration may be applied for each logical channel. In case of SRB, the TM or the AM is used. On the other hand, in case of DRB, the UM the AM is used.

The RLC sublayer performs the delivery of the upper layer PDU; sequence numbering independent of PDCP; error correction through automatic repeat request (ARQ); segmentation and re-segmentation; reassembly of SDU; RLC SDU discard; and RLC re-establishment.

4) A PDCP sublayer for the user plane performs sequence numbering; header compression and decompression (robust header compression (RoHC) only); delivery of user data; reordering and duplicate detection (if the delivery to a layer above the PDCP is required); PDCP PDU routing (in case of a split bearer); re-transmission of PDCP SDU; ciphering and deciphering; PDCP SDU discard; PDCP re-establishment and data recovery for RLC AM; and duplication of PDCP PDU.

The PDCP sublayer for the control plane additionally performs Sequence Numbering; ciphering, deciphering and integrity protection; delivery of control plane data; duplicate detection; and duplication of PDCP PDU.

When duplication is configured for a radio bearer by RRC, an additional RLC entity and an additional logical channel are added to the radio bearer to control the duplicated PDCP PDU(s). The duplication at PDCP includes transmitting the same PDCP PDUs twice. Once it is transmitted to the original RLC entity, and a second time it is transmitted to the additional RLC entity. In this instance, the original PDCP PDU and the corresponding duplicate are not transmitted to the same transport block. Two different logical channels may belong to the same MAC entity (in case of CA) or different MAC entities (in case of DC). In the former case, logical channel mapping restriction is used to ensure that the original PDCP PDU and the corresponding duplicate are not transmitted to the same transport block.

5) The SDAP sublayer performs i) mapping between QoS flow and data radio bearer, and ii) QoS flow identification (ID) marking in downlink and uplink packet.

A single protocol entity of SDAP is configured for each individual PDU session, but exceptionally, in case of dual connectivity (DC), two SDAP entities can be configured.

6) A RRC sublayer performs broadcast of system information related to access stratum (AS) and non-access stratum (NAS); paging initiated by 5GC or NG-RAN; establishment, maintenance and release of RRC connection between UE and NG-RAN (additionally including modification and release of carrier aggregation and also additionally including modification and release of dual connectivity between E-UTRAN and NR or in NR); security function including key management; establishment, configuration, maintenance and release of SRB(s) and DRB(s); delivery of handover and context; UE cell selection and re-release and control of cell selection/reselection: mobility function including inter-RAT mobility; QoS management function, UE measurement reporting and control of reporting; detection of radio link failure and recovery from radio link failure; and NAS message delivery from NAS to UE and NAS message delivery from UE to NAS.

Network Slicing

The 5G system has introduced a network slicing technology providing network resources and network functions as individual slices according to each service.

With the introduction of network slicing, isolation, independent management, etc. of a network function and a network resource may be provided per each slice. Hence, the network slicing may select and combine network functions of the 5G system according to services, users, etc., thereby providing independent and more flexible services per the service and the user The network slice refers to a logically combined network of an access network and a core network.

The network slice may include one or more of the following:
- core network control plane and user plane functions
- NG-RAN
- non-3GPP interworking function (N3IWF) of non-3GPP access network Supported function and network function optimization may differ for each network slice. Multiple network slice instances may provide the same function for different groups of UEs.

A single UE may be simultaneously connected to one or more network slice instances via a 5G-AN. The single UE may be served by at most eight network slices at a time. An AMF instance serving the UE may belong to each network slice instance serving the UE. That is, the AMF instance may be common to the network slice instance serving the UE. CN part of the network slice instance(s) serving the UE is selected by the CN.

One PDU session belongs to only one specific network slice instance per PLMN. Different network slice instances do not share the one PDU session.

One PDU session belongs to one specific network slice instance per PLMN. Different slices may have slice-specific PDU sessions using the same DNN, but different network slice instances do not share the one PDU session.

Single network slice selection assistance information (S-NSSAI) identifies a network slice. Each S-NSSAI is assistance information used for a network to select a specific network slice instance. NSSAI is a set of S-NSSAI(s). The S-NSSAI includes the following:
- Slice/service type (SST): SST indicates an expected operation of the network slice in terms of function and service.
- Slice differentiator (SD): SD is optional information that complements SST(s) for selecting a network slice instance from a plurality of potentially network slice instances that complies with all of the indicated SSTs.

1) Network Slice Selection Upon Initial Connection

A UE may be configured with a configured NSSAI per PLMN by home PLMN (HPLMN). The configured NSSAI is PLMN-specific, and the HPLMN indicates PLMN(s) to which each configured NSSAI is applied.

Upon initial connection of the UE, an RAN selects an initial network slice which will send a message using the NSSAI. To this end, in a registration procedure, the UE provides a requested NSSAI to a network. When the UE provides the requested NSSAI to the network, the UE in a predetermined PLMN uses only S-NSSAIs belonging to the configured NSSAI of a corresponding PLMN.

If the UE does not provide the NSSAI to the RAN or the RAN does not select a proper network slice according to the provided NSSAI, the RAN may select a default network slice.

Subscription data include S-NSSAI(s) of network slice(s) to which the UE subscribes. One or more S-NSSAIs may be marked as default S-NSSAI. If the S-NSSAI is marked as default, the network can serve the UE with the related network slice even when the UE does not send any S-NSSAI to the network in a registration request.

If the UE is successfully registered, a CN informs (R)AN by providing whole allowed NSSAI (including one or more S-NSSAIs). Further, when a registration procedure of the UE is successfully completed, the UE may obtain the allowed NSSAI for this PLMN from the AMF.

The allowed NSSAI takes precedence over the configured NSSAI for this PLMN. The UE uses only the S-NSSAI(s) in the allowed NSSAI corresponding to a network slice for a subsequent network slice selection related procedure in the serving PLMN.

For each PLMN, the UE stores the configured NSSAI and the Allowed NSSAI (if any). When the UE receives an Allowed NSSAI for a PLMN, it overrides a previously stored allowed NSSAI for this PLMN.

2) Slice Change

A network can change an already selected network slice instance according to a local policy, UE mobility, change in subscription information, etc. That is, a set of network slices for the UE can be changed at any time while the UE is registered with the network. Further, change in the set of network slices for the UE may be initiated by the network or the UE under specific conditions.

Based on a local policy, change in subscription information, and/or UE mobility, the network may change a set of permitted network slice(s) to which the UE is registered. The network may perform such change during a registration procedure or notify the UE of change in supported network slice(s) using a procedure which can trigger a registration procedure.

Upon the change of the network slice, the Network may provide the UE with a new allowed NSSAI and a tracking area list. The UE includes anew NSSAI in signaling according to a mobility management procedure to transmit it and thus causes reselection of a slice instance. According to the change of the network slice, an AMF supporting this may be changed.

If the UE enters an area where a network slice is no longer available, a core network releases PDU sessions for an S-NSSAI corresponding to a network slice that is no longer available via a PDU session release procedure.

When the PDU sessions corresponding to a slice that is no longer available are released, the UE uses a UE policy to determine whether an existing traffic can be routed over PDU sessions belonging to other slices.

In order to change a set of S-NSSAI(s) being used, the UE initiates a registration procedure.

3) SMF Selection

A PCF provides a network slice selection policy (NSSP) to the UE. The NSSP associates the UE with an S-NSSAI and is used by the UE so as to determine PDU sessions when a traffic is routed.

The NSSP is provided per application of the UE, and it includes a rule capable of mapping the S-NSSAI per UE application. An AMF selects a SMF for PDU session management using subscription information, a local provider policy, etc. together with SM-NSSAI and DNN information delivered by the UE.

When a PDU session for a specific slice instance is established, the CN provides the (R)AN with the S-NSSAI corresponding to the slice instance to which the PDU session belongs so that the RAN can access a specific function of the slice instance.

Session Management

The 5GC supports a PDU connectivity service, i.e., a service that provides exchange of PDU(s) between a UE and a data network (DN) identified by a data network name (DNN) (or access point name (APN)). The PDU connectivity service is supported via PDU sessions that are established upon request from the UE.

Each PDU session supports a single PDU session type. That is, each PDU session supports the exchange of a single type of PDU requested by the UE upon establishment of the PDU session. The following PDU session type is defined: IP version 4 (IPv4), IP version 6 (IPv6), ethernet, and unstructured. Here, the type of PDU exchanged between the UE and the DN is completely transparent to the 5G system.

The PDU sessions are established (upon UE request), modified (upon UE and 5GC request), and released (upon UE and 5GC request) using NAS SM signaling exchanged over N1 between the UE and a SMF. Upon request from an application server, the 5GC can trigger a specific application in the UE. If the UE receives a trigger message, the UE may deliver the corresponding message to an identified application, and the identified application may establish a PDU session to a specific DNN.

The SMF checks whether the UE request is compliant with user subscription information. To this end, the SMF obtains SMF level subscription data from an UDM. Such data may indicate the allowed PDU session type per DNN.

The UE that is registered over multiple accesses selects an access for establishing a PDU session.

The UE may request to move a PDU session between 3GPP and non-3GPP accesses. A decision to move the PDU session between the 3GPP and non-3GPP accesses is made on a per PDU session basis. That is, the UE may have PDU sessions using the 3GPP access while other PDU sessions use the non-3GPP access.

In a PDU session establishment request transmitted from the network, the UE provides a PDU session identity (Id). The UE may also provide a PDU session type, slicing information, DNN, and a service and session continuity (SSC) mode.

The UE may simultaneously establish multiple PDU sessions via the 3GPP access and/or the non-3GPP access with the same DN or different DNs.

The UE may establish multiple PDU sessions with the same DN served by different UPF terminations N6.

The UE having the multiple established PDU sessions may be served by different SMFs.

A user plane path of different PDU sessions (with the same DNN or different DNNs) belonging to the same UE may be completely separated between the UPF interfacing with the DN and the AN.

The 5G system architecture can satisfy various continuity requirements of different applications/services in the UE by supporting session and service continuity (SSC). The 5G system supports different SSC modes. A SSC mode related to a PDU session anchor is not changed while the PDU session is established.

In case of a PDU session to which SSC mode 1 is applied, the network preserves the connectivity service provided to the UE. In case of a PDU session of IP type, an IP address is preserved.

In case of using SSC mode 2, the network may release the connectivity service delivered to the UE and also release the corresponding PDU session. In case of a PDU session of IP type, the network may release IP address(es) that had been allocated to the UE.

In case of using SSC mode 3, changes in the user plane is visible to the UE, while the network ensures that the UE suffers no loss of connectivity. A connection through a new PDU session anchor point is established before the previous connection is terminated, in order to allow for better service continuity. In case of a PDU session of IP type, the IP address is not preserved in this mode during relocation of the anchor.

A SSC mode selection policy is used to determine a type of SSC mode associated with an application (or application group) of the UE. An operator may previously configure the SSC mode selection policy to the UE. This policy includes one or more SSC mode selection policy rules which can be used by the UE to determine a type of SSC mode associated with an application (or application group). This policy may also include a default SSC mode selection policy rule that can be applied to all applications of the UE.

If the UE provide an SSC mode when requesting a new PDU session, the SMF selects either accepting the requested SSC mode or modifying the requested SSC mode based on subscription information and/or local configuration. If the UE does not provide an SSC mode when requesting a new PDU session, the SMF selects a default SSC mode for data network listed in the subscription information or applies local configuration for selecting the SSC mode.

The SMF informs the UE of the selected SSC mode for the PDU session.

Mobility Management

Registration management (RM) is used to register or de-register the UE/user to a network and establish user context in the network.

1) Registration Management

The UE/user needs to register with the network to receive service that requires registration. After the registration is performed once, if applicable, the UE can update its registration to the network to periodically maintain the reachability (i.e., periodic registration update), or update its capability or re-negotiate protocol parameters upon movement (mobility registration update).

An initial registration procedure includes execution of a network access control function (i.e., user authentication and access authentication based on a subscription profile in the UDM). As a result of the registration procedure, identification of a serving AMF is registered in the UDM.

FIG. 13 illustrates a RM state model to which the present disclosure is applicable. More specifically, FIG. 13(a) illustrates a RM state model in the UE, and FIG. 13(a) illustrates a RM state model in the AMF.

Referring to FIG. 13, two RM states of RM-DEREGISTERED and RM-REGISTERED are used in the UE and the AMF to reflect a registration state of the UE in selected PLMN.

In the RM-DEREGISTERED state, the UE is not registered with the network. The UE context in the AMF does not maintain a valid location or routing information for the UE, and thus the UE is not reachable by the AMF. However, for example, some UE context may be still stored in the UE and the AMF to prevent an authentication procedure from being performed during every registration procedure.

In the RM-DEREGISTERED state, if the UE needs to receive service that requires registration, the UE attempts to register with the selected PLMN using the initial registration procedure. Or, if the UE receives Registration Reject at initial registration, the UE remains in the RM-DEREGISTERED state. On the other hand, the UE enters the RM-REGISTERED state when receiving Registration Accept.

In the RM-DEREGISTERED state, when applicable, the AMF accepts the initial registration of the UE by sending Registration Accept to the UE and enters the RM-REGISTERED state. Or, when applicable, the AMF rejects the initial registration of the UE by sending Registration Reject to the UE.

In the RM-REGISTERED state, the UE is registered with the network. In the RM-REGISTERED state, the UE can receive service that requires registration with the network.

In the RM-REGISTERED state, if there is no tracking area identity (TAI) of a current serving cell on a list of the TAI that the UE has received from the network, the UE performs a mobility registration update procedure in order to maintain the registration of the UE and enable the AMF to page the UE. Or, the UE performs a periodic registration update procedure triggered by the expiration of a periodic update timer in order to notify the network that the UE is still in an active state. Or, the UE performs a registration update procedure in order to update its capability information or re-negotiate protocol parameters with the network. Or, when the UE needs to be no longer registered with the PLMN, the UE performs a deregistration procedure and enters the RM-DEREGISTERED state. The UE can decide to deregister from the network at any time. Or, when the UE receives a Registration Reject message or a Deregistration message or when the UE performs a local deregistration procedure without the initiation of any signaling, the UE enters the RM-DEREGISTERED state.

In the RM-REGISTERED state, when the UE needs to be no longer registered with the PLMN, the AMF performs a deregistration procedure and enters the RM-DEREGISTERED state. The AMF can decide to deregister the UE at any time. Or, after an implicit deregistration timer expires, the AMF performs implicit deregistration at any time. The AMF enters the RM-DEREGISTERED state after the implicit deregistration. Or, the AMF performs local deregistration for the UE that have negotiated to perform deregistration at an end of communication. The AMF enters the RM-DEREGISTERED state after the local deregistration. Or, when applicable, the AMF accepts or rejects the registration update from the UE. When the AMF rejects the registration update from the UE, the AMF may reject the UE registration.

Registration area management includes functions of allocating and re-allocating a registration area to the UE. The registration area is managed per the access type (i.e., 3GPP access or non-3GPP access).

When the UE is registered with the network over the 3GPP access, the AMF allocates a set of tracking area(s) (TAs) in a TAI list to the UE. When the AMF allocates the registration area (i.e., the set of the TAs in the TAI list), the AMF may consider various information (for example, mobility pattern, allowed/non-allowed area, etc.). The AMF having whole PLMN (all PLMN) as a serving area may allocate the whole PLMN as the registration area to the UE that is in a MICO mode.

The 5G system supports allocation of a TAI list including different 5G-RAT(s) in a single TAI list.

When the UE is registered with the network over the non-3GPP access, a registration area for the non-3GPP access corresponds to a unique reserved TAI value (i.e., dedicated to the non-3GPP access). Thus, there is a unique TA for the non-3GPP access to 5GC, and this is called N3GPP TAI.

The AMF includes only TAI(s) applicable to an access, to which the TAI list is transmitted, when producing the TAI list.

2) Connection Management

Connection management (CM) is used to establish and release signaling connection between the UE and the AMF. The CM includes functions of establishing and releasing signaling connection between the UE and the AMF over N1. The signaling connection is used to enable NAS signaling exchange between the UE and a core network. The signaling connection includes both AN signaling connection for the UE between the UE and the AN and N2 connection for the UE between the AN and the AMF.

FIG. 14 illustrates a CM state model to which the present disclosure is applicable. More specifically, FIG. 14(a) illustrates CM state transition in the UE, and FIG. 14(a) illustrates CM state transition in the AMF.

Referring to FIG. 14, two CM states of CM-IDLE and CM-CONNECTED are used to reflect NAS signaling connection of the UE with the AMF.

The UE in a CM-IDLE state is in an RM-REGISTERED state and does not have the NAS signaling connection established with the AMF over N1. The UE performs cell selection, cell re-selection, and PLMN selection.

There are no AN signaling connection, N2 connection and N3 connection for the UE in the CM-IDLE state.

In the CM-IDLE state, if the UE is not in a MICO mode, the UE responds to paging (upon the reception) by performing a service request procedure. Or, when the UE has uplink signaling or user data to be transmitted, the UE performs the service request procedure. Or, the UE enter a CM-CONNECTED state whenever the AN signaling connection is established between the UE and the AN. Or, the transmission of an initial NAS message (registration request, service request, or deregistration request) initiates the transition from the CM-IDLE state to the CM-CONNECTED state.

In the CM-IDLE state, when the AMF has signaling or mobile-terminated data to be transmitted to the UE if the UE is not in the MICO mode, the AMF performs a network triggered service request procedure by transmitting a paging request to the corresponding UE. The AMF enter the CM-CONNECTED state whenever the N2 connection is established for the corresponding UE between the AN and the AMF.

The UE in the CM-CONNECTED state has the NAS signaling connection with the AMF over N1.

In the CM-CONNECTED state, the UE enters the CM-IDLE state whenever the AN signaling connection is released.

In the CM-CONNECTED state, the AMF enters the CM-IDLE state whenever N2 signaling connection and N3 signaling connection for the UE are released.

When a NAS signaling procedure is completed, the AMF may decide to release the NAS signaling connection of the UE. When the NAS signaling connection release is completed, the CM state in the UE is changed to the CM-IDLE state. When a N2 context release procedure is completed, the CM state for the UE in the AMF is changed to the CM-IDLE state.

The AMF can keep the UE in the CM-CONNECTED state until the UE de-registers from the core network.

The UE in the CM-CONNECTED state may be in a RRC inactive state. When the UE is in the RRC inactive state, UE reachability is managed by RAN using assistance information from the core network. When the UE is in the RRC inactive state, UE paging is managed by the RAN. When the UE is in the RRC inactive state, the UE monitors the paging using UE's CN and RAN identifier.

The RRC inactive state is applied to the NG-RAN (i.e., applied to NR and E-UTRA connected to 5G CN).

The AMF, based on network configuration, provides assistance information to the NG-RAN in order to assist the NG-RAN's decision about whether the UE transitions to the RRC Inactive state.

The RRC inactive assistance information includes a UE specific discontinuous reception (DRX) value for RAN paging in the RRC inactive state and a registration area provided to the UE.

CN assistance information is provided to a serving NG RAN node during N2 activation (i.e., during registration, service request, and path switching).

The states of the N2 and N3 reference points are not changed by the UE that enters the CM-CONNECTED state with RRC inactive. The UE in the RRC inactive state is aware of a RAN notification area.

When the UE is in the CM-CONNECTED state with the RRC inactive, the UE can resume RRC connection due to uplink data pending, a mobile initiated signaling procedure (i.e., periodic registration update), a response to RAN paging, or notifying the network that the UE has left the RAN notification area.

If the UE resumes the connection at different NG-RAN nodes within the same PLMN, the UE AS context is retrieved from an old NG-RAN node and a procedure is triggered toward the CN.

When the UE is in the CM-CONNECTED state with the RRC inactive, the UE performs cell selection to GERAN/UTRAN/EPS and follows an idle mode procedure.

The UE in the CM-CONNECTED state with the RRC inactive enters a CM-IDLE mode and follows the related NAS procedure:
  if a RRC resume procedure fails,
    if a movement of the UE to the CM-IDLE mode is required in a fail scenario that cannot be solved in the RRC inactive mode.

The NAS signaling connection management includes functions of establishing and releasing the NAS signaling connection.

The NAS signaling connection establishment function is provided by the UE and the AMF to establish the NAS signaling connection of the UE in the CM-IDLE state.

When the UE in the CM-IDLE state needs to send the NAS message, the UE initiates a service request or a registration procedure to establish signaling connection to the AMF.

Based on UE preference, UE subscription information, UE mobility pattern, and network configuration, the AMF can keep the NAS signaling connection until the UE de-registers from the network.

A procedure of the release of the NAS signaling connection is initiated by a 5G (R)AN node or the AMF.

If the UE detects that the AN signaling connection is released, the UE decides that the NAS signaling connection has been released. If the AMF detects that the N2 context has been released, the AMF decides that the NAS signaling connection has been released.

3) UE Mobility Restriction

Mobility restriction restricts the service access or mobility control of the UE in the 5G system. A mobility restriction function is provided by the UE, the RAN, and the core network.

The mobility restriction is applied to only the 3GPP access and is not applied to the non-3GPP access.

The mobility restriction in the CM-IDLE state and the CM-CONNECTED state with the RRC inactive is performed by the UE based on information received from the core network. The mobility restriction in the CM-CONNECTED state is performed by the RAN and the core network.

In the CM-CONNECTED state, the core network provides the RAN with a handover restriction list for the mobility restriction.

The mobility restriction includes RAT restriction, a forbidden area, and service area restriction as follow:
  RAT restriction: RAT restriction is defined as 3GPP RAT(s) to which the access of the UE is not allowed. The UE in the restricted RAT is not allowed to initiate any communication with the network based on subscription information.
  Forbidden area: in a forbidden area under predetermined RAT, the UE is not allowed to initiate any communication with the network based on subscription information.
  Service area restriction: the UE defines an area that can initiate or cannot initiate communication with the network as follows:
  Allowed area: in an allowed area under predetermined RAT, the UE is allowed to initiate communication with the network if allowable by subscription information.
  Non-allowed area: in a non-allowed area under predetermined RAT, the service area of the UE is restricted based on subscription information. The UE and the network are not allowed to initiate session management signaling (in both the CM-IDLE state and the CM-CONNECTED state) acquiring service request or user services. The RM procedure of the UE is the same as that in the allowed area. The UE in the non-allowed area responds to the paging of the core network with service request.

In a predetermined UE, the core network determines the service area restriction based on UE subscription information. Optionally, the allowed area may be fine-tuned by the PCF (based on, for example, UE location, permanent equipment identifier (PEI), network policies, etc.). The service area restriction may be changed due to, for example, changes in the subscription information, the location, the PEI and/or the polices. The service area restriction can be updated during the registration procedure.

If the UE has the RAT restriction, the forbidden area, the allowed area, the non-allowed area, or an overlap area in a combination thereof, the UE proceeds according to the following priority:
  an evaluation of the RAT restriction takes precedence over an evaluation of any other mobility restriction;
  an evaluation of the forbidden area takes precedence over an evaluation of the allowed area and the non-allowed area; and
  an evaluation of the non-allowed area takes precedence over an evaluation of the allowed area.

4) Mobile Initiated Connection Only (MICO) Mode

The UE may indicate a preference of an MICO mode during initial registration or registration update. The AMF determines whether the MICO mode is allowed to the UE based on local configuration, preference indicated by the UE, UE subscription information, network policies, or a combination thereof, and informs the UE of it during a registration procedure.

The UE and the core network re-initiate or exit the MICO mode in the following registration signaling. If the MICO mode is not explicitly indicated in the registration procedure and the registration procedure is successfully completed, the UE and the AMF do not use the MICO mode. Namely, the UE operates as a general UE, and the network also treats the corresponding UE as a general UE.

The AMF allocates the registration area to the UE during the registration procedure. If the AMF indicates the MICO mode to the UE, the registration area is not limited to a size of a paging area. If an AMF serving area is the whole PLMN, the AMF may provide the UE with the "whole PLMN" registration area. In this case, re-registration to the same PLMN due to the mobility does not apply. If the mobility restriction is applied to the UE of the MICO mode, the AMF allocates the allowed area/non-allowed area to the UE.

If the AMF indicates the MICO mode to the UE, the AMF regards the UE as being always unreachable while the UE is in the CM-IDLE state. The AMF rejects any request for downlink data transfer to the corresponding UE that is in the MICO mode and in the CM-IDLE state. The AMF also defers downlink transport such as SMS and location services over NAS. The UE in the MICO mode is reachable for mobile terminated data or signaling only when the UE is in the CM-CONNECTED mode.

When the UE in the MICO mode transitions to the CM-CONNECTED mode, the AMF can provide pending data indication to a RAN node to be able to immediately transfer mobile terminated data and/or signaling. If the RAN node receives this indication, the RAN node considers this information when determining user inactivity.

The UE in the MICO mode does not need to listen to paging while the UE is in the CM-IDLE state. The UE in the MICO mode can stop any AS procedure in the CM-IDLE state due to one of the following reasons until the UE initiates the transition from the CM-IDLE mode to the CM-CONNECTED mode:
  if change in the UE (e.g. change in configuration) requires an update of the registration with the network
  if a periodic registration timer expires
  if mobile originating (MO) data pending
  if MO signaling pending Relay UE Discovery for Bandwidth Limited Remote UE Technical challenges have been discussed to support relay UE discovery by bandwidth limited remote UEs in a framework of a study item on sidelink and UE-to-NW (network) relaying enhancements for wearable and Internet of Things (IoT) use cases (3GPP TR 36.746). As a result, the following agreements have been made as possible discovery enhancements for the relay UE discovery.
  Multi-shoot discovery transmission across a bandwidth of discovery pool(s) for the relay UE
  eNB assistance signalling for allowing/enhancing the relay UE discovery
  Association of discovery transmission and reception resources
  Narrowband definition for discovery operation including 1 physical resource block (PRB) and 6 PRB narrowband
  For bandwidth limited remote UEs, discovery enhancements to aid communication configuration for UE-to-NW relaying are beneficial, The following enhancements need to be further studied:
1) eNB assistance signalling
2) association of discovery and communication resource Some of identified discovery enhancements can be discovery model specific, i.e., applicable to Model A only or Model B discovery only.

Prose (Proximity Service) Direct Discovery Models (Model A and Model B)

The following is contents described in TS 23.303 regarding ProSe direct discovery models. There are Model A and Model B. In case of UE-to-Network relay, it operates as follows.

For the Model A, a relay UE is an announcing UE, and a remote UE is a monitoring UE. If the relay UE broadcasts a discovery message (PC5_discovery message for UE-to-NW relay discovery announcement), the remote UE receives it.

For the Model B, the remote UE is a discoverer UE, and the relay UE is a discoveree UE. If the remote UE broadcasts a discovery message (PC5_discovery message for UE-to-NW relay discovery solicitation), the relay UE suitable for the conditions among the relay UEs receiving the discovery message sends a response message (PC5_discovery message for UE-to-NW relay discovery response) to the corresponding remote UE.

1) Model A ("I am Here")

This model defines two roles for ProSe-enabled UE(s) that are participating in ProSe direct discovery.
  Announcing UE: the UE announces certain information that could be used by UEs in proximity that have permission to discover.
  Monitoring UE: the UE monitors certain information of interest in proximity of announcing UEs.

In this model, the announcing UE broadcasts discovery messages at pre-defined discovery intervals, and the monitoring UE that is interested in these messages read the corresponding message and process them.

In a model A mode, the UE can act as an "announcing UE" only in a carrier frequency signalled by a serving PLMN, but may act as a "monitoring UE" in resources of the serving PLMN and local PLMNs. When inter-PLMN discovery transmission is supported, the carrier frequency may be operated by a PLMN other than the serving PLMN.

Open and restricted discovery types are supported by the Model A.

2) Model B ("Who is There?"/"Are You There?")

This model when a restricted discovery type is used, defines two roles for ProSe-enabled UE(s) that are participating in ProSe direct discovery.
  Discoverer UE: the UE transmits a request containing certain information about what it is interested to discover.
  Discoveree UE: the UE that receives a request message can respond with some information related to the discoverer's request.

It is equivalent to "who is there/are you there" since the discoverer UE sends information about other UEs that would like to receive a response (e.g. it may be information about a ProSe application identity corresponding to a group, and members of the group may respond).

When using Model B discovery, the discoverer UE and the discoveree UE can announce in the carrier frequency signalled by the serving PLMN. If inter-PLMN discovery transmission is supported, the carrier frequency may be operated by a PLMN other than the serving PLMN. The discoverer UE and the discoveree UE are allowed to monitor or announce in the serving PLMN and local PLMNs when authorized.

Only the restricted discovery type is supported by the Model B.

The public safety discovery is considered to be restricted. The monitoring UE/discoverer UE needs to have authorization (through pre-provisioned parameters) to perform discovery of appropriate services.

Prose Direct Discovery Message for UE-to-NW Relay

The following Tables 2 to 4 represent Prose direct discovery messages related to UE-to-network relay.

TABLE 2

| Information Element | Type/Reference | Presence | Length (bits) |
|---|---|---|---|
| Message Type (NOTE) | Message Type 12.2.2.10 | M | 8 |
| Relay Service Code | Binary 12.2.2.51 | M | 24 |
| Announcer Info | Binary 12.2.2.50 | M | 48 |
| ProSe Relay UE ID | Binary 12.2.2.49 | M | 24 |
| Status Indicator | Binary 12.2.2.67 | M | 8 |
| Spare | Binary 12.2.2.56 | M | 80 |
| MIC | Binary 12.2.2.11 | M | 32 |
| UTC-based Counter LSB | Binary 12.2.2.22 | M | 8 |

The Discovery Type is set to "Restricted discovery", the Content Type is set to "UE-to-Network Relay Discovery Announcement or UE-to-Network Relay Discovery Response" and the Discovery Model is set to "Model A".

TABLE 3

| Information Element | Type/Reference | Presence | Length (bits) |
|---|---|---|---|
| Message Type (NOTE 1) | Message Type 12.2.2.10 | M | 8 |
| Relay Service Code | Binary 12.2.2.51 | M | 24 |
| Discoverer Info | Binary 12.2.2.50 | M | 48 |
| URDS Composition | Binary 12.2.2.66 | M | 8 |
| ProSe Relay UE ID | Binary 12.2.2.49 | C (NOTE 2) | 24 |
| Spare | Binary 12.2.2.56 | M | 80 or 104 (NOTE 3) |
| MIC | Binary 12.2.2.11 | M | 32 |
| UTC-based Counter LSB | Binary 12.2.2.22 | M | 8 |

(NOTE 1):
The Discovery Type is set to "Restricted discovery", the Content Type is set to "UE-to-Network Relay Discovery Solicitation" and the Discovery Model is set to "Model B".
(NOTE 2):
Presence of the ProSe Relay UE ID is indicated by the URDS Composition.
(NOTE 3):
If the ProSe Relay UE ID is present, then the length of the Spare is 80 bits. If ProSe Relay UE ID is not included, then the length of the Spare is 104 bits.

TABLE 4

| Information Element | Type/Reference | Presence | Length (bits) |
|---|---|---|---|
| Message Type (NOTE) | Message Type 12.2.2.10 | M | 8 |
| Relay Service Code | Binary 12.2.2.51 | M | 24 |
| Discoveree Info | Binary 12.2.2.50 | M | 48 |
| ProSe Relay UE ID | Binary 12.2.2.49 | M | 24 |
| Status Indicator | Binary 12.2.2.67 | M | 8 |
| Spare | Binary 12.2.2.56 | M | 80 |
| MIC | Binary 12.2.2.11 | M | 32 |
| UTC-based Counter LSB | Binary 12.2.2.22 | M | 8 |

(NOTE):
The Discovery Type is set to "Restricted discovery", the Content Type is set to "UE-to-Network Relay Discovery Announcement or UE-to-Network Relay Discovery Response" and the Discovery Model is set to "Model B".

As described above, a discovery message (Model A: PC5_discovery message for UE-to-Network relay discovery announcement, and Model B: PC5_discovery message for UE-to-Network relay discovery response) sent by the relay UE in the ProSe direct discovery message for UE-to-Network relay includes a status indicator information element (IE). This indicator indicates whether the relay UE has resources to support an additional remote UE.

When the relay UE does not have the resource to support the additional remote UE, if the relay UE represents it in the discovery message, the remote UEs receiving it may exclude the corresponding UE from relay (re)selection even if the relay UE is a relay UE suitable for conditions. The remote UE selects the corresponding relay UE in a situation where the remote UE does not know a status of the relay UE through the indicator. Hence, the remote UE can prevent in advance signalling overhead occurring in a situation where the remote UE requests a direct link connection from the corresponding relay UE, and the relay UE rejects this request (or releases the existing remote UE). For reference, the relay UE should send a discovery message in order to support the relay reselection of the remote UE, to which the existing direct link is established, and to support the measurement of a signalling strength of the direct link.

The above problem occurs because the remote UE, to which the direct link is not established, can receive the discovery message.

Announcing UE Procedure for UE-to-Network Relay Discovery Initiation

The UE is authorized to perform an announcing UE procedure for UE-to-network relay discovery if:

a) the UE is authorized to act as a UE-to-network relay in the PLMN indicated by the serving cell, and
    the UE is served by E-UTRAN and is authorized to perform ProSe direct discovery for public safety use announcing in the PLMN, and the lower layers indicate that discovery operation of a UE-to-network relay is supported; or
    the UE is authorized to perform ProSe direct discovery for public safety use announcing when not served by E-UTRAN and intends to use the provisioned radio resources for UE-to-network relay discovery, b) the UE is configured with a relay service code parameter identifying the connectivity service to be announced and with a user information ID for a UE-to-network relay discovery parameter;

otherwise, the UE is not authorized to perform the announcing UE procedure for UE-to-network relay discovery.

FIG. 15 illustrates an interaction between UEs in an announcing UE procedure for UE-to-network relay discovery.

When the UE is triggered by an upper layer application to announce availability of a connectivity service provided by a UE-to-network relay, if the UE is authorized to perform the announcing UE procedure for UE-to-network relay discovery, then the UE:

a) if the UE is served by E-UTRAN, and the UE in the EMM-IDLE mode needs to request resources for sending PC5_DISCOVERY messages for relay discovery for public safety as specified in 3GPP TS 36.331 [12], may perform a service request procedure or a tracking area update procedure as specified in 3GPP TS 24.301 [11];

b) shall obtain a valid UTC time for the discovery transmission from the lower layers and generate the UTC-based counter corresponding to this UTC time;

c) shall generate a PC5_DISCOVERY message for UE-to-network relay discovery announcement. In the PC5_DISCOVERY message for UE-to-network relay discovery announcement, the UE:

1) shall set the ProSe relay UE ID to a ProSe relay UE ID used for ProSe direct communication for the connectivity service to be announced;

2) shall set the announcer Info parameter to the User Info ID for the UE-to-network relay discovery parameter;

3) shall set the relay service code parameter to the relay service code parameter identifying the connectivity service to be announced;

4) shall set the UTC-based counter least significant bit (LSB) parameter to include eight least significant bits of the UTC-based counter; and 5) shall set the resource status indicator bit of a status indicator parameter to indicate whether or not the UE has resources available to provide a connectivity service for additional ProSe-enabled public safety UEs;

d) shall apply discovery User integrity key (DUIK), discovery User scrambling key (DUSK), or discovery User confidentiality Key (DUCK) with the associated encrypted Bitmask, along with the UTC-based counter to the PC5_DISCOVERY message (e.g. integrity protection, message scrambling or confidentiality protection of one or more above parameters as specified in 3GPP TS 33.303 [6]); and e) shall pass the resulting PC5_DISCOVERY message for the UE-to-network relay discovery announcement to the lower layers for transmission over the PC5 interface with an indication that the message is for relay discovery for public safety use.

The UE shall ensure that it keeps on sending the same PC5_DISCOVERY message and the indication that the message is for relay discovery for public safety use to the lower layers for transmission until the UE is triggered by an upper layer application to stop announcing availability of a connectivity service, or until the UE stops being authorized to perform the announcing UE procedure for UE-to-network relay discovery. This is left up to UE implementation.

Discoveree UE Procedure UE-to-Network Relay Discovery Initiation

The UE is authorized to perform a discoveree UE procedure for UE-to-network relay discovery if:

a) the UE is authorized to act as a UE-to-network relay in the PLMN indicated by the serving cell, and the UE is served by E-UTRAN and is authorized to perform ProSe direct discovery for a public safety use discoveree operation in the PLMN, and the lower layers indicate that discovery operation of a UE-to-network relay is supported; or the UE is authorized to perform ProSe direct discovery for a public safety use discoveree operation when not served by E-UTRAN and intends to use the provisioned radio resources for UE-to-network relay discovery; and b) the UE is configured with a relay service code parameter identifying the connectivity service to be responded to a UE-to-network relay discovery parameter and with a User Info ID for the UE-to-network relay discovery parameter.

Otherwise, the UE is not authorized to perform the discoveree UE procedure for UE-to-network relay discovery.

FIG. 16 illustrates an interaction between UEs in a discoveree UE procedure for UE-to-network relay discovery.

When the UE is triggered by an upper layer application to start responding to solicitation on proximity of a connectivity service provided by the UE-to-network relay, and if the UE is authorized to perform the discoveree UE procedure for UE-to-network relay discovery, then the UE:

a) if the UE is served by E-UTRAN, and the UE in the EMM-IDLE mode needs to request resources for sending PC5_DISCOVERY messages for public safety as specified in 3GPP TS 36.331 [12], shall perform a service request procedure or a tracking area update procedure as specified in 3GPP TS 24.301 [11]; and b) shall instruct the lower layers to start monitoring for PC5_DISCOVERY messages with an indication that the message is for relay discovery for public safety use.

Upon reception of a PC5_DISCOVERY message for UE-to-Network relay discovery solicitation, for the relay service code of the connectivity service which the UE is authorized to respond, the UE shall use the associated DUSK (if configured) and the UTC-based counter obtained during the reception operation to unscramble the PC5_DISCOVERY message. Then, if a DUCK is configured, the UE shall use the DUCK and the UTC-based counter to decrypt a configured message-specific confidentiality-protected portion, as described in 3GPP TS 33.303 [6]. Finally, if a DUIK is configured, the UE shall use the DUIK and the UTC-based counter to verify a MIC field in the unscrambled PC5_DISCOVERY message for UE-to-network relay discovery solicitation.

Then, if the relay service code parameter of the PC5_DISCOVERY message for UE-to-network relay discovery solicitation is the same as the relay service code parameter configured for the connectivity service, and either the ProSe relay UE ID parameter is not included or the included ProSe relay UE ID parameter is the same as the ProSe relay UE ID associated with the relay service code parameter, the UE:

a) shall obtain a valid UTC time for the discovery transmission from the lower layers and generate the UTC-based counter corresponding to this UTC time;

b) shall generate a PC5_DISCOVERY message for UE-to-network relay discovery response. In the PC5_DISCOVERY message for UE-to-network relay discovery response, the UE:

1) shall set the ProSe relay UE ID to a ProSe relay UE ID used for ProSe direct communication for the connectivity service;

2) shall set the discoveree Info parameter to the User Info ID for the UE-to-network relay discovery parameter;

3) shall set the relay service code parameter to the relay service code parameter of the PC5_DISCOVERY message for UE-to-network relay discovery solicitation;

4) shall set the UTC-based counter LSB parameter to include the eight least significant bits of the UTC-based counter; and 5) shall set the resource status indicator bit of the status indicator parameter to indicate whether or not the UE has resources available to provide a connectivity service for additional ProSe-enabled public safety UEs;

c) shall apply the DUIK, DUSK, or DUCK with the associated encrypted Bitmask, along with the UTC-based counter to the PC5_DISCOVERY message (e.g. integrity protection, message scrambling or confidentiality protection of one or more above parameters); and d) shall pass the resulting PC5 DISCOVERY message for the UE-to-network relay discovery response with an indication that the message is for relay discovery for public safety use to the lower layers for transmission over the PC5 interface.

If there exists only one ProSe UE-to-network relay candidate satisfying the above-described conditions, then the corresponding ProSe UE-to-network relay UE is selected. If there exist more than one ProSe UE-to-network relay candidate satisfying the above-described conditions, any relay candidate not satisfying a non-radio related ProSe layer criteria shall be discarded, and out of the remaining relay candidates, the relay candidate with the highest ranking of the lower layer criteria shall be selected. The UE may take a value of the resource status indicator bit of the status indicator parameter of the PC5_DISCOVERY message for UE-to-network relay discovery response into account when deciding which ProSe UE-to-network relay to select. It is up to the UE implementation whether the ProSe layer or the lower layers takes the final selection on which ProSe UE-to-network relay UE to select.

FIG. 17 illustrates status indicator parameters.

A status indicator parameter is used to indicate a status of ProSe UE-to-network relay. As illustrated in FIG. 17, this parameter may be coded. A resource status indicator (RSI) is used to indicate whether or not the UE has resources available to provide a connectivity service for additional ProSe-enabled public safety UEs.

In TS 36.331, clauses 5.10.6 and 5.10.6a specify a discovery message transmission related operation of a transmitter UE, and clause 5.10.5 specifies a discovery message reception related operation of a receiver UE.

The transmitter UE selects a configured pool list (as specified in clause 5.10.6 of TS 36.331) and randomly selects and transmits one pool among the selected pool list (as specified in clause 5.10.6a of TS 36.331). The receiver UE monitors a pool of resources of indicated by a base station or configured (as specified in clause 5.10.5 of TS 36.331).

The transmitter UE/receiver UE are affected by the following conditions upon the selection of the configured pool list/pool:

depending on whether the corresponding UE is a UE capable of non-PS related sidelink discovery or a UE capable of PS related sidelink discovery, depending on whether or not the UE capable of PS related sidelink discovery is non-relay PS related sidelink discovery announcements.

Sidelink Discovery Announcement

A UE capable of non-PS related sidelink discovery that is configured by upper layers to transmit non-PS related sidelink discovery announcements may, for each frequency on which the UE is configured to transmit such announcements (for reference, in case the configured resources are insufficient, it is up to UE implementation to decide which sidelink discovery announcements to transmit):

1> if the frequency used to transmit sidelink discovery announcements concerns a serving frequency (RRC_IDLE) or a primary frequency (RRC_CONNECTED):

2> if the UE's serving cell (RRC_IDLE) or PCell (Primary cell) (RRC_CONNECTED) is suitable as defined in TS 36.304 [4]:

3> if the UE is in the RRC_CONNECTED (i.e., PCell is used for the sidelink discovery announcement):

4> if the UE is configured with 'discTxResources' set to 'scheduled':

5> configure lower layers to transmit the sidelink discovery announcement using the assigned resources indicated by 'scheduled' in 'discTxResources';

4> else if the UE is configured with discTxPoolDedicated (i.e., 'discTxResources' set to 'ue-Selected'):

5> select a specific entry of the list of resource pool entries in discTxPoolDedicated and configure lower layers to use it to transmit the sidelink discovery announcements;

3> else if T300 is not running (i.e., the UE in the RRC_IDLE, announcing via the serving cell):

4> if SystemInformationBlockType19 of the serving cell includes discTxPoolCommon:

5> select a specific entry of the list of resource pool entries in discTxPoolCommon and configure lower layers to use it to transmit the sidelink discovery announcements;

1> else if, for the frequency used to transmit sidelink discovery announcements, the UE is configured with dedicated resources (i.e., with discTxResources-r12, if discTxCarrierFreq is included in discTxInterFreqInfo, or if discTxResources within discTxInterFreqList is included in discTxInterFreqInfo); and the conditions for non-PS related sidelink discovery operation are met:

2> if the UE is configured with 'discTxResources' set to 'scheduled':

3) configure lower layers to transmit the sidelink discovery announcement using the assigned resources indicated by 'scheduled' in discTxResources;

2> else if the UE is configured with 'discTxResources' set to 'ue-Selected':

3> select a specific entry of the list of selected resource pool entries and configure lower layers to use it to transmit the sidelink discovery announcements;

1> else if the frequency used to transmit sidelink discovery announcements is included in discInterFreqList within SystemInformationBlockType19 of the serving cell/PCell, and discTxResourcesInterFreq within discResourcesNonPS in the corresponding entry of discInterFreqList is set to discTxPoolCommon (i.e., the serving cell/PCell broadcasts pool of resources) and the conditions for non-PS related sidelink discovery operation are met; or 1> else if discTxPoolCommon is included in discImagingBlockType19 acquired from a cell selected on the sidelink discovery announcement frequency; and the conditions for non-PS related sidelink discovery operation are met:

2> select a specific entry of the list of resource pool entries in discTxPoolCommon and configure lower layers to use it to transmit the sidelink discovery announcements;

1> if the UE is configured with discTxGapConfig and requires sidelink discovery gaps to transmit sidelink discovery announcements on the concerned frequency;

2> configure lower layers to transmit on the concerned frequency using the sidelink discovery gaps indicated by discTxGapConfig, 1> else:

2> configure lower layers to transmit on the concerned frequency without affecting a normal operation;

A UE capable of PS related sidelink discovery that is configured by upper layers to transmit PS related sidelink discovery announcements may:

1> if out of coverage on the frequency used to transmit PS related sidelink discovery announcements and the conditions for PS-related sidelink discovery operation are met:

2> if configured by upper layers to transmit non-relay PS related sidelink discovery announcements; or 2> if the UE is selecting a sidelink relay UE/has a selected sidelink relay UE:

3> configure lower layers to transmit sidelink discovery announcements using the pool of resources that were preconfigured and in accordance with the following;

4> randomly select, using a uniform distribution, an entry of preconfigDisc in SL-Preconfiguration;

4> using timing of the selected SyncRef UE, or if the UE does not have a selected SyncRef UE, based on the UE's own timing;

1> else if the frequency used to transmit sidelink discovery announcements concerns the serving frequency (RR- C_IDLE) or the primary frequency (RRC_CONNECTED) and the conditions for PS related sidelink discovery operation are met:

2> if configured by upper layers to transmit non-relay PS related sidelink discovery announcements; or 2> if the UE acts as a sidelink relay UE; and if the UE is in the RRC_IDLE; and if sidelink relay UE threshold conditions are met; or 2> if the UE acts as a sidelink relay UE; and if the UE is in the RRC_CONNECTED; or 2> if the UE selects a sidelink relay UE/has a selected sidelink relay UE; and if the sidelink remote UE threshold conditions are met:

3> if the UE is configured with discTxPoolPS-Dedicated; or

3> if the UE is in the RRC_IDLE; and if discTxPoolPS-Common is included in SystemInformationBlockType19:

4> select a specific entry of the list of resource pool entries and configure lower layers to use it to transmit the sidelink discovery announcements;

3> else if the UE is configured with 'discTxResourcesPS' set to 'scheduled':

4> configure lower layers to transmit the sidelink discovery announcement using the assigned resources indicated by 'scheduled' in discTxResourcesPS;

1> else if, for the frequency used to transmit sidelink discovery announcements, the UE is configured with dedicated resources (i.e., with discTxResourcesPS in discTxInterFreqInfo within sl-DiscConfig); and the conditions for PS related sidelink discovery operation are met:

2> if configured by upper layers to transmit non-relay PS related sidelink discovery messages:

3> if the UE is configured with 'discTxResourcesPS' set to 'scheduled':

4> configure lower layers to transmit the sidelink discovery announcement using the assigned resources indicated by 'scheduled' in discTxResourcesPS;

3> else if the UE is configured with discTxResourcesPS set to 'ue-Selected':

4> select a specific entry of the list of resource pool entries in 'ue-Selected' and configure lower layers to use it to transmit the sidelink discovery announcements.

1> else if the frequency used to transmit sidelink discovery announcements is included in discInterFreqList within SystemInformationBlockType19 of the serving cell/PCell, while discTxResourcesInterFreq within discResourcesPS in the corresponding entry of discInterFreqList is set to discTxPoolCommon (i.e., the serving cell/PCell broadcasts pool of resources) and the conditions for PS related sidelink discovery operation are met:

2> if configured by upper layers to transmit non-relay PS related sidelink discovery messages:

3> select a specific entry of the list of resource pool entries in discTxPoolCommon and configure lower layers to use it to transmit the sidelink discovery announcements.

1> else if discTxPoolPS-Common is included in SystemInformationBlockType19 acquired from a cell selected on the sidelink discovery announcement frequency; and the conditions for PS related sidelink discovery operation are met:

2> if configured by upper layers to transmit non-relay PS related sidelink discovery messages:

3> select a specific entry of the list of resource pool entries in discTxPoolPS-Common and configure lower layers to use it to transmit the sidelink discovery announcements;

1> if the UE is configured with discTxGapConfig and requires gaps to transmit sidelink discovery announcements on the concerned frequency;

2> configure lower layers to transmit on the concerned frequency using the gaps indicated by discTxGapConfig, 1> else:

2> configure lower layers to transmit on the concerned frequency without affecting a normal operation;

A UE that is configured with a list of resource pool entries for sidelink discovery announcement transmission (i.e., by SL-DiscTxPoolList) may:

1> if 'poolSelection' is set to 'rsrpBased':

2> select a specific pool from the list of pools with which the UE is configured for the Reference Signal Received Power (RSRP) measurement of the reference cell selected after applying the layer 3 filter defined by 'quantityConfig' (between threshLow and threshHigh);

1> else:

2> randomly select, using a uniform distribution, a pool from the list of pools with which the UE is configured;

1> configure lower layers to transmit the sidelink discovery announcement using the selected pool of resources;

when performing resource pool selection based on RSRP, the UE uses the latest results of the available measurements used for cell reselection evaluation in the RRC_IDLE/for measurement report triggering evaluation in the RRC_CONNECTED, which are performed in accordance with the performance requirements (specified in TS 36.133 [16]).

A UE capable of non-PS related sidelink discovery that is configured by upper layers to monitor non-PS related sidelink discovery announcements shall:

1> for each frequency the UE is configured to monitor non-PS related sidelink discovery announcements, prioritizing the frequencies included in discInterFreqList, if included in SystemInformationBlockType19:

2> if the PCell or the cell, on which the UE is camping, indicates the pool of resources to monitor sidelink discovery announcements by discRxResourcesInterFreq in discResourcesNonPS within discInterFreqList in SystemInformationBlockType19:

3> configure lower layers to monitor sidelink discovery announcements using the pool of resources indicated by discRxResourcesInterFreq in discResourcesNonPS within SystemInformationBlockType19.

2> if the cell used for sidelink discovery monitoring broadcasts SystemInformationBlockType19:

3> configure lower layers to monitor sidelink discovery announcements using the pool of resources indicated by discRxPool in SystemInformationBlockType19.

A UE capable of PS related sidelink discovery that is configured by upper layers to monitor PS related sidelink discovery announcements may:

1> if out of coverage on the frequency, as defined in TS 36.304 [4, 11.4]:

2> configure lower layers to monitor sidelink discovery announcements using the pool of resources that were pre-configured (e.g., indicated by discRxPoolList within preconfigDisc in SL-Preconfiguration).

1> else if configured by upper layers to monitor non-relay PS related discovery announcements; and if the PCell or the cell, on which the UE is camping, indicates a pool of resources to monitor sidelink discovery announcements by discRxResourcesInterFreq in discResourcesPS within discInterFreqList in SystemInformationBlockType19:

2> configure lower layers to monitor sidelink discovery announcements using the pool of resources indicated by discRxResourcesInterFreq in discResourcesPS in SystemInformationBlockType19.

1> if configured by upper layers to monitor PS related sidelink discovery announcements; and if the cell used for sidelink discovery monitoring broadcasts SystemInformationBlockType19:

2> configure lower layers to monitor sidelink discovery announcements using the pool of resources indicated by discRxPoolPS in SystemInformationBlockType19.

1> if the UE is configured with discRxGapConfig and requires sidelink discovery gaps to monitor sidelink discovery announcements on the concerned frequency;

2> configure lower layers to monitor the concerned frequency using the sidelink discovery gaps indicated by discRxGapConfig;

1> else:

2> configure lower layers to monitor the concerned frequency without affecting a normal operation.

The requirement not to affect a normal UE operation also applies for the acquisition of sidelink discovery related system and synchronization information from inter-frequency cells.

The UE is not required to monitor all pools simultaneously.

It is up to UE implementation to decide whether a cell is sufficiently good to be used to monitor sidelink discovery announcements.

If discRxPool, discRxPoolPS or discRxResourcesInterFreq includes one or more entries including rxParameters, the UE may monitor such entries only if the associated SLSSIDs are detected. When monitoring such pool(s), the UE applies the timing of the corresponding SLSS.

Prose (D2D) Discovery Message Transmission

The transmitter UE/receiver UE are affected by the following conditions upon the selection of the configured pool list/pool:

depending on whether the corresponding UE is a UE capable of non-PS related sidelink discovery or a UE capable of PS related sidelink discovery, depending on whether or not the UE capable of PS related sidelink discovery is non-relay PS related sidelink discovery announcements.

The above information is provided from the ProSe layer. This can be found in TS 24.334.

When the UE is triggered by an upper layer application to announce availability of a connectivity service provided by a UE-to-network relay, if the UE is authorized to perform the announcing UE procedure for UE-to-network relay discovery, then the UE:

a) if the UE is served by E-UTRAN, and the UE in the EMM-IDLE mode needs to request resources for sending PC5_DISCOVERY messages for relay discovery for public safety as specified in 3GPP TS 36.331 [12], performs a service request procedure or a tracking area update procedure as specified in 3GPP TS 24.301 [11];

b) . . .

e) shall pass the resulting PC5 DISCOVERY message for UE-to-network relay discovery announcement to the lower layers for transmission over the PC5 interface with an indication that the message is for relay discovery for public safety use.

When the UE is triggered by an upper layer application to monitor proximity of a connectivity service provided by a UE-to-network relay; or when the UE has established a direct link with a ProSe UE-to-network relay UE, and if the UE is authorized to perform the monitoring UE procedure for UE-to-network relay discovery, then the UE shall instruct the lower layers to start monitoring PC5_DISCOVERY messages together with an indication that the message is for relay discovery for public safety use.

When the UE is triggered by an upper layer application to announce availability in a discovery group, if the UE is authorized to perform the announcing UE procedure for group member discovery, then the UE:

a) if the UE is served by E-UTRAN, and the UE in the EMM-IDLE mode needs to request resources for sending PC5_DISCOVERY messages for public safety as specified in 3GPP TS 36.331 [12], shall perform a service request procedure or a tracking area update procedure as specified in 3GPP TS 24.301 [11];

b) . . .

e) shall pass the resulting PC5_DISCOVERY message for group member discovery announcement to the lower layers for transmission over the PC5 interface with an indication that the message is for public safety use.

When the UE is triggered by an upper layer application to monitor proximity of other UEs in a discovery group, and if the UE is authorized to perform the monitoring UE procedure for group member discovery, then the UE shall instruct the lower layers to start monitoring for PC5_DISCOVERY messages with an indication that the message is for public safety use.

Sidelink Discovery Enhancement for Wearable and IoT Use Cases

The following objectives were approved in relation to "Further enhanced Device-to-Device communication for wearable IoT and Relays".

Study of necessary LTE sidelink enhancements:

a. Introduction of additional evaluation assumptions to the sidelink evaluation methodology defined in TR 36.843 focusing on analysis of wearable use cases b. Identification of mechanisms to enable QoS, reliable, and/or low complexity/cost and low energy sidelink c. Study of additional co-existence issues with adjacent carrier frequencies that may arise due to the new mechanisms identified Hereinafter, the present disclosure focuses on discovery design enhancements for wearable and IoT use cases. In addition, performance analysis of various discovery enhancement options is provided, showing significant benefits by introducing discovery enhancements for wearable and IoT use cases.

FIG. 18 illustrates a discovery problem due to a bandwidth limited device.

A physical sidelink discovery channel (PSDCH) was introduced for energy efficient sidelink discovery, assuming that terminals can process the whole system bandwidth. This channel is allocated periodically in time with a long duty cycle that increases UE power efficiency. The FDM of discovery resources enables discovery of multiple transmissions from a single subframe. However, bandwidth limited devices cannot process the whole PSDCH bandwidth, and thus the existing discovery process may take a long time and even may be inefficient due to random resource selection and thus excessive power consumption. Therefore, additional enhancement to a discovery process may be necessary for bandwidth limited wearable/MTC devices. In particular, the discovery of the relay UEs may be time and energy consuming for narrow bandwidth devices, and thus additional enhancements should be considered.

Since Rel. 12 the discovery is not a prerequisite of any D2D communication, and this step may be omitted if a remote UE and a relay UE have the context for establishing communication links. However, for scenarios where the devices are not pre-associated (e.g., MTC scenarios), the relay discovery is an important step in overall operation for wearable and IoT use cases.

FIG. 19 illustrates an incompatible PSDCH physical structure for one PRB bandwidth (BW) limited device.

The R12 single PSDCH transmission occupies two PRBs that exceed a bandwidth of low complexity devices with 1 PRB maximum bandwidth capability. In order to support PSDCH discovery by bandwidth limited UEs, a payload size of single PSDCH transmission (which is currently 232 bits) needs to be reduced in order to fit to 1 PRB allocation. As an alternative, a new PSDCH design may be based on transport block mapping to a pair of two subframes or using higher order modulation for PSDCH transmission.

Accordingly, the present invention proposes to introduce a new physical channel format for the PSDCH to support the discovery by a bandwidth limited device (1 PRB BW).

As described above, especially if wideband PSDCH pools are allocated or multiple discovery pools are configured, a discovery reception process for narrow band devices may be inefficient.

If there are narrowband (NB) and wideband (WB) devices, the following discovery scenarios may be considered:

Scenario 1: A WB device discovers a WB device. This scenario can be supported by a legacy Rel.12/13 procedure designed for UEs which can process the whole system bandwidth. In this instance, there is no motivation to further optimize the discovery efficiency.

Scenario 2: A WB device discovers a NB device. This scenario may be a part of a Model-B relay discovery procedure when a wideband relay UE first needs to detect a relay discovery solicitation message from the remote UE which may be a NB UE. In this case, there is also no issue at the relay UE side to process the whole bandwidth and find a narrowband solicitation. However, during a response phase from the relay UE, there should be alignment in terms of resources utilized by the relay UE (to provide a response) and resources monitored by the remote UE in order to avoid unnecessary power consumption at the remote UE side.

Scenario 3: A NB device discovers a WB device. This scenario includes both Model-A relay discovery through announcements and Model-B discovery response reception. In that case, there is a need to enhance the discovery operation in order to increase the likelihood that the narrowband remote UE monitoring only part of the system bandwidth can efficiently discover the relay UE, which is expected to autonomously select resources for discovery transmission.

Scenario 4: A NB device discovers a NB device. In this scenario, it is assumed that the relay UE is capable to process the whole system bandwidth, and thus in order to enable the relay UE discovery procedure, there is no need to enhance this scenario.

Based on the analysis of the above scenarios from discovery perspective, it is argued that enhancements should focus on the Scenario 3. In general, the Scenario 3 operation should provide a mechanism for the remote UE to discover target relay UEs. There are several mechanisms to achieve this goal. The mechanisms for Model-A and Model-B discovery are separately discussed.

The Model-A discovery emulates "I'm here" behavior, when a relay UE may announce its presence and capability to operate as a relay, while the remote UE can detect the announcement and initiate a communication session. This model is one-step in terms of discovery operation and may not require discovery transmission from the remote UE. In such operation, it is important that the NB remote UE monitors a part of a spectrum used for transmission by relay UEs. In order to achieve this, the following can be used:

Legacy behavior: In case of legacy behavior, the remote UE can be configured with RX resource pools, and one of the UEs can monitor and relay TX pools which are associated with the RX pool of the remote UE. In this case, according to current behavior of pool selection for transmission, the pool is selected either randomly or using a RSRP criterion. It may happen that the relay UE has selected TX pool which is not monitored by the remote UE. This may be resolved by configuration of TDM-ed narrow band resource pools which can be monitored by the NB remote UE one-by-one. However, such configuration is inefficient from discovery performance perspective as well as UE performance perspective, when the UE needs to stay active for a long period of time.

Multi-shot relay UE announcements: FIG. 20 illustrates a multi-shoot discovery announcement by a relay UE according to an embodiment of the present disclosure. This approach assumes a relay UE is configured either with one wideband pool or with multiple narrow-band pools. A relay UE then should be allowed to transmit its announcements multiple times in one pool or across all configured TX pools (see FIG. 20). There is currently a possibility to emulate multi-TTI transmission in one pool using other redundancy version (RVs). However, the number of retransmission is limited to four which is not sufficient to cover whole system bandwidth.

FIG. 21 illustrates association between request transmission and response transmission discovery resources that are applicable to the present disclosure.

The Model-B discovery emulates "Who is here?" behavior. In this case, the remote UE can send a solicitation message. This discovery procedure consists of two-step: a solicitation is sent by a remote UE and a response is sent by a relay UE. The first step in the procedure is performed by the remote UE and fits into the Scenario 2 which is not problematic for a wideband relay UE. The second step is performed by potential relay UEs. The second step may be enhanced similar to the Model A considerations. Additionally, such behavior may allow to link remote UE reception pool and relay UE transmission resources (see FIG. 21). The linkage may be achieved by one-to-one mapping or one-to-many mapping rules. The one-to-one mapping may be advantageous from remote UE perspective since it will need to process only particular discovery resources. However, if there are multiple responses from different relay UEs, a one-to-many mapping is more appropriate in order to reduce potential collisions on the discovery resources.

There is no knowledge of discovery models at a UE access stratum that may prevent introduction of discovery model-specific enhancements. Therefore, transparent enhancements of the discovery model are aligned with a current discovery procedure. On the other hand, given that L2 UE-to-network relaying is being defined by RAN2 WG, it may be considered as an alternative to introduce a L2 discovery procedure which is aware of the used discovery model and specify related enhancements.

An alternative relay discovery model may be introduced where the wearable/MTC devices can announce themselves in discovery resources (i.e., transmit discovery) seeking for a response. As a response, an assisting cellular device (e.g., relay UE) can respond to PSCCH/PSSCH resources (i.e., initiate communication session) which are associated or linked with the discovery resource occupied by the wearable/MTC terminal. The linkage between discovery transmission resource and resource for reception for any sidelink channel can simplify many higher layer procedures when narrow bandwidth sidelink devices are used, and can be provided by the remote UE in a discovery message itself.

Accordingly, the present disclosure proposes to introduce an enhanced discovery function to support efficient relay UE discovery for bandwidth limited low complexity UEs. Both L2 transparent and L2 non-transparent discovery procedures need to be studied.

For the L2 non-transparent discovery procedure, the following enhancements should be considered:
  association between discovery transmission/reception and communication transmission/reception resources
  eNB assistance signalling for an efficient discovery procedure of relay UEs For the L2 transparent discovery procedure, the following enhancements should be considered:
  multi-shot discovery transmissions
  association between discovery and communication pools for transmission/reception Currently, a UE may become a relay UE if its RSRP to eNB is between configured thresholds. However, for activation of relay UE announcements for wearable use cases, the RSRP based relay discovery activation is not necessary, since the wearable remote UE can benefit from relaying operation even if the wearable remote UE has good Uu link quality, given that the relay UE can be made more power efficient at least from remote UE perspective. However, if RSRP thresholds can be configured to +/−infinite values, its usage may be already precluded by current specification.

The remote UE relay discovery association can be triggered if remote UE cellular RSRP is below a configured threshold. In wearable scenarios, there are several considerations besides the Uu link quality that may lead to the Uu link quality, i.e. relative quality of Uu and PC5 links, required service, etc. Therefore, the remote UE activation by Uu RSRP may be inefficient and should be reconsidered. However, if the RSRP thresholds can be configured to +/−infinite values, its usage may be already precluded by current specification.

Currently, the relay is selected by a UE based on PC5 SD-RSRP measurements and higher layer information carried by the discovery messages. The UE selects a relay with the best SD-RSRP if it fulfills the higher layer conditions. The best SD-RSRP criterion may provide better PC5 link quality, but such operation does not consider whether the relay UE Uu link quality is good enough or better than the remote UE Uu link quality and whether the relay operation can provide a better data rate to the remote UE. In Rel. 13, the relay link quality is implicitly controlled by an activation RSRP threshold, but for wearable and MTC use cases, a more explicit knowledge of relay Uu link quality during a relay selection procedure may be needed in order to achieve further enhancement D2D (FeD2D) objectives of optimized energy efficiency.

Accordingly, the present disclosure proposes to consider additional criteria on relay Uu link quality to optimize the power efficiency of relaying for relay UE selection.

Currently, there are two types of discovery: UE-autonomous (Type-1) and eNB-controlled (Type-2B). Both the two types of discovery may be useful for wearable and IoT use cases. The Type-1 communication is beneficial, since it may not require from UE to be connected to eNB, thus saving its power. The Type-2B operation may be beneficial to better control remote and relay UE operations and possibly associate its transmissions and reception resources which is beneficial when one of UEs has a limited bandwidth. The eNB-controlled discovery is described separately below.

FIG. 22 illustrates a discovery problem due to bandwidth limited devices.

The network can increase efficiency of a discovery procedure, if it provides pairing information for wearable/MTC devices and assisting cellular terminals. For example, the network may be aware which resources are being monitored by the wearable/MTC device, and provide this information to the assisting cellular terminal or constantly the cellular terminal may provide the corresponding information to the network. This procedure can help to make the discovery procedure more efficient. In principle, the discovery assistance can be implemented following eNB controlled discovery, where a discovery resource for transmission is granted by the eNB. In a considered scenario, the eNB can also configure a discovery resource to be used for reception. In an extreme case, the eNB may establish connection between two devices even without using a legacy sidelink discovery procedure.

Accordingly, eNB assistance signalling needs to be further studied to efficiently facilitate energy discovery of relay UEs by bandwidth limited remote UEs.

To sum up the above description, for bandwidth limited terminals, the legacy sidelink discovery procedure is not efficient in terms of either a discovery rate or UE power consumption. The discovery procedure may be enhanced with help of eNB assistance (e.g., by providing assistance information about discovery or communication resources to be monitored for reception or used for transmission). The bandwidth limited UEs may perform transmission only, so that their discovery messages are processed by cellular assisting UEs (relay UEs). The latter approach is not consistent with a current UE-to-NW relay discovery procedure, where the best relay UE is discovered by processing the PSDCH channel. In addition, the linkage between discovery and communication resources may be needed in order to efficiently establish communication upon a discovery event. Based on the discussion, the following observations relevant to the discovery procedure for bandwidth limited UEs can be performed.
  The sidelink discovery procedure is not efficient either in terms of the discovery rate or power consumption.
  The eNB assistance can be used to enhance a discovery performance, especially for a relay UE discovery procedure.
  A physical structure of PSDCH channel needs to be reconsidered.
  Linkage between discovery and communication resources may help to simplify initiation of fast connection.

Therefore, based on the presented analysis, the following proposals on discovery enhancements for wearable and IoT use cases can be proposed:
  1) Proposal 1
  Introduce a new physical channel format for PSDCH to support discovery by bandwidth limited devices (1 PRB BW)
  2) Proposal 2
  Introduce discovery enhancements to support efficient relay UE discovery for bandwidth limited low complexity UEs
  Study both L2 transparent and L2 non-transparent discovery procedures For the L2 non-transparent discovery procedure, the following enhancements should be considered: association between discovery transmission/reception and communication transmission/reception resources, and eNB assistance signaling for an efficient discovery procedure of relay UEs For the L2 transparent discovery procedure, the following enhancements should be considered: multi-shot discovery transmissions and association between discovery and communication pools for transmission/reception 3) Proposal 3

For relay UE selection, additional criteria on relay Uu link quality to optimize power efficiency of relaying should be considered 4) Proposal 4

Further study eNB assistance signaling to facilitate energy efficient discovery of relay UEs by bandwidth limited remote UEs Relay UE Discovery for Bandwidth Limited Remote UE As described above, relay UEs have made the following agreements:

Multi-shot discovery transmission across a bandwidth of discovery pool(s) for a relay UE eNB assistance signaling to allow/improve relay UE discovery Association of discovery transmission and reception resources Narrowband definition for a discovery operation including 1 PRB and 6 PRB narrowband According to the above description, the proposals proposed for the purpose of discovery enhancements for relay UE discovery have been described. In ProSe work item description (WID), the use of UE-to-network relay has been restricted to the use in a public safety environment, and the UE has considered a normal UE suitable for the public safety purpose. The related art discovery message transmission method assumes that both the relay UE and the remote UE have a wideband (transmission/reception) capability. So, even if a transmitter selects a specific radio resource (i.e., discovery pool) according to a radio resource (i.e., discovery pool) selection method and sends a discovery message, the corresponding discovery message could be received because a receiver has a wideband reception capability.

However, in F2D2D (REAR) WID, as the UE-to-network relay becomes available for commercial use and IoT use, the remote UE has considered wearable devices or IoT devices. Hence, in RAN1, because the remote UE assumes a UE with a narrowband (transmission/reception) capability unlike a capability of the existing normal UE, if a transmitter selects a specific radio resource (i.e., discovery pool) and sends a discovery message, a search should be performed for each bandwidth (i.e., discovery pool) in order for a receiver with a narrowband (transmission/reception) capability to receive it, causing a delay.

Among the above proposed enhancements,

Multi-shot discovery transmission across a bandwidth of discovery pool(s) for a relay UE This enhancement is a method of sending a discovery message for each bandwidth of all discovery pools when the transmitter sends the discovery message. Hence, a remote UE with a narrowband reception capability can receive the corresponding discovery message. Because the above proposed operation assumes the normal UE capability not the narrowband capability, the transmitter assumes the relaying.

Among the above proposed enhancements,

Association of discovery transmission and reception resources

This enhancement is a method of sharing, with the receiver, information on resources used for discovery message transmission/reception when the transmitter sends the discovery message and using radio resources promised/associated with the discovery message transmission/reception.

[Problem 1]

According to the above description, a UE needs to know discovery model information for model specific enhancement, and there exists a question whether the UE announces this information to upper layers. However, not the discovery model information but another information for a decision on how the corresponding operation is performed is necessary to perform the corresponding operation.

[Problem 1-1]

Multi-shot discovery transmission across a bandwidth of discovery pool(s) for a relay UE For example, if the relay UE performs the above operation, information about whether the above operation is of Model A or Model B is not important, and there is a need for information for determining whether the Model A should perform the legacy behavior or the proposed operation.

Further, according to the related art, the relay UE has assumed a WB device. And, in some cases or according to opponent, the relay UE may have to perform the legacy behavior or multi-shot relay UE announcements. Therefore, there is a need for a mechanism for determining what operation the relay UE should perform.

[Problem 1-2]

Association of discovery transmission and reception resources

If the relay UE performs the above operation, there is a need for a mechanism for determining whether the relay UE should perform the legacy behavior or the proposed operation when sending a response message to the received discovery message.

For reference, the proposed operation may operate as follows without model information:

An alternative relay discovery model may be introduced where the wearable/MTC devices can announce themselves in discovery resources (i.e., transmit discovery) seeking for a response. As a response, an assisting cellular device (e.g. relay UE) can respond in PSCCH/PSSCH resources (i.e., initiate communication session) which are associated/linked with the discovery resource occupied by the wearable/MTC terminal. The linkage between discovery transmission resource and resource for reception for any of sidelink channels can simplify many higher layer procedures when narrow bandwidth sidelink devices are used and can be provided by the remote UE in a discovery message itself.

The following described the alternative relay discovery model, but can be implemented by adding optional features in the existing Model A and Model B without proposing a new discovery model.

[Problem 2]

However, for the following enhancement,

Multi-shot discovery transmission across a bandwidth of discovery pool(s) for a relay UE There is a disadvantage in that the relay UE occupies/uses many radio resources in a given time to send a discovery message. Considering that the discovery message is sent periodically, the use of many radio resources may continuously occur, and rapid exhaustion of radio resources and congestion may occur as the number of relay UEs performing the corresponding operation increases.

Accordingly, the present disclosure is to solve the above problems and propose an efficient operation for supporting transmission and reception of a discovery message of a (remote) UE with a narrowband transmission/reception capability.

In a method of transmitting the discovery message according to the present disclosure, 'Wideband transmission' means a related art method, and in 'Narrowband transmission', 'Multi-shot narrowband transmission' means 'Multi-shot discovery transmission across a bandwidth of discovery pool(s) for a relay UE' and 'Associated narrowband transmission' means 'Association of discovery transmission and reception resources'.

Further, in the present disclosure, the discovery message means 'PC5_discovery message for UE-to-Network relay discovery announcement' sent by the relay UE in Model A and means 'PC5_discovery message for UE-to-Network relay discovery solicitation' sent by the remote UE in Model B. The response message means PC5_discovery message for UE-to-Network relay discovery response sent by the relay UE in Model B.

[Invention Proposal 1] Determine a Discovery Message Transmission Method and Perform a Discovery Message Transmission Considering Application Type/UE Type/UE Capability The [Invention proposal 1] is to provide a solution to the problem described in the [Problem 1-1].

[I. Determining a Discovery Message Transmission Method of UE]

If a transmitter (UE) determines/selects one of 'Wideband transmission' and 'Multi-shot narrowband transmission' upon transmission of a discovery message, the transmitter may determine/select it distinguishing/considering types of application generating/triggering the discovery message and/or a use purpose or a use target of the discovery message.

In the above, the transmitter (UE) is regarded as a relay UE in a relay scenario. A receiver (opponent) is regarded as a remote UE in the relay scenario.

For example, in the following case, the transmitter UE sends the discovery message using the 'Multi-shot narrowband transmission' method:

1. if an application generating/triggering the discovery message is a wearable or IoT related application;
2. if the receiver (opponent) receiving the discovery message is a wearable or IoT device; and/or
3. if the receiver (opponent) receiving the discovery message has a narrowband (transmission/reception) capability.

For example, in the following case, the transmitter UE sends the discovery message using the 'Wideband transmission' method:

1. if an application generating/triggering the discovery message is not a wearable or IoT related application (e.g., public safety application, or non-public safety but not IoT (commercial but not IoT) application);
2. if the receiver (opponent) receiving the discovery message is a normal UE; and/or
3. if the receiver (opponent) receiving the discovery message has a wideband (transmission/reception) capability.

[II. UE Detailed Operation]

To support [Determining a discovery message transmission method of UE], the UE may operate as follows:

If the UE intends to perform a discovery procedure at upper layers, the UE provides lower layers with information described in [Determining a discovery message transmission method of UE]. That is, the following information is provided.

[II-A. Providing Information from Upper Layers to Lower Layers]

The following represents information transmitted from upper layers to lower layers.

I. A type of application generating/triggering a discovery message: wearable or IoT related application, public safety application, and/or non-public safety but not IoT related application A. The above information may be expressed as 'public safety', 'non-public safety but not IoT', and 'wearable or IoT'. In addition to the information described above, various application types of information can be provided.

i. In addition to the information described above, various application types of information can be provided, and this can be utilized for a differentiation operation for each application type.

II. Receiver (opponent) information receiving the discovery message: normal UE, wearable or IoT device A. The above information may be expressed as 'normal' or 'wearable or IoT'.

i. In addition to the information described above, various UE types of information can be provided, and this can be utilized for a differentiation operation for each UE type.

III. Capability of a receiver (opponent) receiving the discovery message: wideband (transmission/reception) capability or narrowband (transmission/reception) capability A. The above information may be expressed as 'narrowband (capability)' or 'Wideband (capability)'.

i. In addition to the information described above, various capability information can be provided, and this can be utilized for a differentiation operation for each UE capability.

IV. If the UE wants 'Multi-shoot narrowband transmission'

A. In the above case, an indication of 'Multi-shoot narrowband transmission' may be sent to the lower layers.

The above II and III may be provided from the upper layers or may be information preconfigured to the UE. In a configured case, an IoT UE may be expressed as 'a UE capable of IoT related sidelink discovery that is configured by upper layers'.

[II-B. Operation of Lower Layers by Provided Information]

If lower layers receive the following information together with a discovery message, the UE sends the discovery message using a 'Multi-shoot narrowband transmission' method.

1. If an application generating/triggering a discovery message is a wearable or IoT related application;
2. If a receiver (opponent) receiving the discovery message is a wearable or IoT device;
3. If the receiver (opponent) receiving the discovery message has a narrowband (transmission/reception) capability; and/or
4. If an indication of 'Multi-shoot narrowband transmission' is received If the lower layers receive the following information together with a discovery message, the UE sends the discovery message using a 'Wideband transmission' method.

1. If an application generating/triggering the discovery message is a public safety related application;
2. If the receiver (opponent) receiving the discovery message is a normal UE; and/or
3. If the receiver (opponent) receiving the discovery message has a wideband (transmission/reception) capability

[II-C. Flow of Provided Information]

In the above, the upper layers may mean a UE-application layer, or a UE-ProSe layer, or both the UE-application layer and the UE-ProSe layer. The lower layers may mean a UE-RRC layer, or a UE-MAC layer, or both the UE-RRC layer and the UE-MAC layer.

For example, information may be provided through the following method:

1. If the UE intends to perform a discovery procedure at the UE-application layer, the UE may transmit, to the UE-ProSe layer, information described in [II-A. Providing information from upper layers to lower layers];

2. The UE-ProSe layer receiving it may transmit, to the UE-RRC layer (or UE-MAC layer), the information together with the discovery message;

3. The UE-RRC layer (or UE-MAC layer) receiving it selects a transmission method (i.e., selects a transmission pool and a transmission resource) according to [II-B. Operation of lower layers by provided information] and sends it according to the selected transmission method.

In the above, the UE-RRC layer (or UE-MAC layer) sends, to the UE-PHY layer, the selected transmission method (or the selected transmission pool and transmission resource) together with the discovery message.

In the above, the operation from Step 2) can be implemented without implementing Step 1).

[Invention Proposal 2] Operation of Relay UE for Performing Association of Discovery Transmission and Reception Resources The [Invention proposal 2] is to provide a solution to the problem described in the [Problem 1-2].

According to the [Problem 1-2], the remote UE directly specifies a discovery resource, which wants a response, to a discovery message. The detailed operation of the UE in this method is as follows.

[UE operation] The UE in Model B operates as follows.

1. A remote UE includes resource information, which wants a response, in a discovery message. In this instance, an indication that a narrowband sidelink device is used may be added.

2. If a relay UE receiving the discovery message sends a response message, the relay UE sends the response message to a resource included in the discovery message.

A. If the response message is sent only to the remote UE sending the discovery message in Step 1), the response message is sent only to the corresponding resource.

B. Otherwise (if the response message needs to be sent to another remote UE), the discovery message is sent to another resource (or bandwidth) together with the corresponding resource.

The detailed operation of the relay UE in the [UE operation] is as follows.

[Detailed Operation of Relay UE]

1. If upper layers of a relay UE receiving a discovery message containing resource information, which wants a response, send a response message, the relay UE provides the following information to lower layers.

A. If the relay UE sends a response message only to a remote UE sending the discovery message, the relay UE sends resource information provided by the remote UE together with the discovery message.

B. If the relay UE sends the response message to other remote UEs as well as the remote UE sending the discovery message, the relay UE operates as one of the followings:

I. the relay UE transmits reception resource information of the other remote UE together.

a. The above may have the following purpose: if the other remote UE is in a state in which PC5 direct link is established with the relay UE (i.e., a linked state), the relay UE may send the response message to the linked remote UE for the measurement of a signalling strength of the established direct link. For the corresponding operation, upper layers of the relay UE should remember a bandwidth and/or resource associated with the linked remote UE.

II. The relay UE sends an indication that 'Multi-shot narrowband transmission' is required (the indication refers to [Invention proposal 1]), a. The above may have the following purpose: in order to trigger a discovery of other not-linked remote UEs b. In this case, the relay UE may not transmit resource information described in Step A) or Step B-I). For the accurate transmission to the corresponding remote UE, the resource information described in Step A) or Step B-I) can be transmitted together.

C. A method of representing/indicating the resource information may directly represent/indicate the corresponding bandwidth/resource, or may be represented/indicated as (number) indication/index information capable of representing/indicating the corresponding bandwidth/resource. For the (number) indication/index, the lower layers should store the bandwidth and mapping information of the (number) indication/index.

2. The lower layers operate as follows according to Cases A and B described in Step 1):

A. In steps 1-A) and 1-B-I), the relay UE sends to a resource to corresponding to resource information transmitted together with the response message.

B. In step 1-B-II), the relay UE sends the response message using 'Multi-shot narrowband transmission'.

In the above, the upper layers may mean a UE-application layer, a UE-ProSe layer, or both the UE-application layer and the UE-ProSe layer. The lower layers may mean a UE-RRC layer, a UE-MAC layer, or both the UE-RRC layer and the UE-MAC layer. In the present embodiment, an operation of sending an indication from the UE-ProSe layer to the lower layer should be at least implemented.

The above assumed and described the method in which the remote UE directly specifies a discovery resource, which wants a response, to a discovery message. However, not the method of specifying resources to the discovery message as described above, if each UE stores/has a mapping rule for remote UE reception pool and relay UE transmission resources, the relay UE should perform the following operation in a preceding step of [Detailed operation of relay UE]:

0. If the lower layers of the relay UE receive the discovery message, understand link of remote UE reception pool and relay UE transmission resources, and identifies a resource that should send the response message according to the mapping rule, the relay UE indicates the corresponding resource information to the upper layers.

The two methods are commonly a method in which if (the upper layers of) the relay UE receives the discovery message requiring transmission of 'Association of discovery transmission and reception resources', when the relay UE remembers it and then sends the response message, the relay UE should send the corresponding response message to bandwidth and/or resource in which the corresponding association exists.

[Invention Proposal 3] Determine a Discovery Message Transmission Method and Perform a Discovery Message Transmission Considering a Status of a Relay UE Sending a Discovery Message The [Invention proposal 3] is to provide a solution to the problem described in the [Problem 2].

Even if the [Invention proposal 1] satisfies conditions selecting the 'Wideband transmission' method, when the UE sends a discovery message/response message only for the purpose of measuring a signalling strength of the remote UE to which PC5 direct link is established, the UE does not perform the operation described in the [Invention proposal 1] and sends the discovery message/response message only to reception resources of the remote UE to which PC5 direct link is established. Such a determination is achieved at the upper layers (application layer or ProSe layer).

1. The above case in which 'the UE sends a discovery message/response message only for the purpose of measuring a signalling strength of the remote UE to which PC5 direct link is established' is considered as a case in which the relay UE does not have resource to support an additional remote UE. This information can utilize the following information in a related art status indicator.

A. The UE does not have resources available to provide a connectivity service for additional ProSe-enabled public safety UEs.

I. The related art information was defined for public safety UEs, but should be defined for IoT UEs. Therefore, the related art information needs to be changed as follows.

a. The UE does not have resources available to provide a connectivity service for additional ProSe-enabled UEs.

[Example of Detailed Operation of UE]

If a relay UE-ProSe layer receives, from a relay UE-application layer, information triggering the transmission of 'Wideband transmission' method (e.g., see IoT use [Invention proposal 1]), and its status is in 'Case in which there is no resource support to additional remote UE', it determines the transmission only to reception resources of the remote UE, to which PC5 direct link is established, and sends information about reception resources of the corresponding remote UE to the lower layers.

RRC Connection Request Procedure

When an evolved remote (eRemote)-UE is connected to an evolved relay (eRelay)-UE, the eRemote-UE may attempt to make an enhanced multimedia priority service (eMPS) or an emergency call toward the network. This requires a priority and eMPS subscription handling. This key issue is to study how priority is to be handled in an end-2-end fashion with the eRemote-UE, the eRelay-UE, and EPC.

In the related art, a detailed operation method/procedure is not established/defined, when the eRemote UE performs a RRC connection request procedure through the eRelay UE, if a RRC connection request procedure of the eRelay UE should be performed simultaneously, or if the RRC connection of the eRelay UE has been barred, or if an extended wait timer is running. Therefore, the present disclosure proposes the detailed operation method/procedure thereof.

In the present disclosure, the eRelay UE may be referred to as 'Relay UE' or 'Relay', and the eRemote UE may be referred to as 'Remote UE' or 'Remote'.

[Invention Proposal 1]

When the eRemote UE performs a RRC connection request procedure through the eRelay UE, if a RRC connection request procedure of the eRelay UE should be performed simultaneously (e.g., at a time at which the eRelay UE is in an idle state/mode or at a time at which the eRelay UE performs the RRC connection, if the eRemote UE performs the RRC connection with the network via the eRelay UE), the eRelay UE may operate as follows:

1. Upon performing a first RRC connection request procedure (i.e., RRC connection request procedure of the relay UE), a RRC establishment cause provided by the relay UE (this is a value which a NAS layer of the relay UE provides to an AS layer or a value generated in the AS layer of the relay UE) may be used. More specifically, the relay UE may include the RRC establishment cause of the relay UE (a cause why the relay UE requests RRC connection/establishment) in a RRC connection request message and send it to the eNB.

However, this operation may be performed if a RRC establishment cause of the eRemote UE is not a high priority access or an emergency call. If the RRC establishment cause of the eRemote UE is a high priority access or an emergency call, the RRC establishment cause of the remote UE may be included and sent in the RRC connection request message, instead of performing the above operation.

2. If the first RRC connection request procedure fails in the Step 1 (e.g., if the eRelay UE receives a RRC connection reject message from the eNB), the eRelay UE may re-perform/resume the RRC connection request procedure using the RRC establishment cause receiving from the eRemote UE.

The Step 2 may be i) always performed, ii) performed if a priority of the RRC establishment cause of the eRemote UE is considered to be higher than a priority of the RRC establishment cause of the eRelay UE, and/or iii) performed if the RRC establishment cause of the eRemote UE is one of a high priority access, an emergency call, and mobile originating (MO) exception data.

The invention proposal 1 is described in more detail below with reference to FIG. 23.

FIG. 23 is a flow chart illustrating a RRC connection request procedure according to Invention proposal 1.

0. When the eRelay-UE has pending data or signalling to send, the eRelay-UE can initiate RACH and a RRC connection request procedure.

1. When the eRemote-UE has pending data or signalling to send, the eRemote-UE sends PC5-S: Connection Activation (message) to the eRelay-UE. The eRemote-UE includes a RRC establishment cause (Remote_establishment cause), which will use for RRC connection request, in the PC5-S: Connection Activation.

If the eRelay-UE is in an ECM-IDLE state, Steps 2 to 6 are performed.

2. When Step 0) and Step 1) happen at the same time (i.e., when a RRC connection request by an eRelay UE internal behaviour from the eRelay-UE itself and a RRC connection request by the connection activation from the eRemote-UE are triggered simultaneously (or within a pre-set time)), the eRelay-UE may initiate the RRC connection request to the eNB by including a RRC establishment cause (Relay_establishment cause) firstly received from the eRelay-UE itself (in the RRC connection request).

Then, if the RRC connection of the eRelay-UE is successfully established (if the eRelay-UE-RRC receives a RRC connection setup message at Step 5), Step 4 may be skipped and the eRelay-UE may perform from Step 6.

3-4. Otherwise (i.e., if the RRC connection of the eRelay-UE fails), the eRelay-UE may receive the RRC connection reject message which includes an extended wait timer. In this case, the eRelay-UE may send the RRC connection request to the eNB by including the RRC establishment cause (Remote_establishment cause) received from the eRemote-UE secondly in the RRC connection request to the eNB. That is, even if the extended wait timer is running, the eRelay-UE shall perform a second RRC connection request procedure for the eRemote-UE. In this instance, a new field may be defined in the RRC connection request to include the RRC establishment cause sent by the eRemote-UE.

5-8. The RRC connection for the eRelay-UE may be approved by the eNB, and the service request procedure may be completed (the service request procedure may follow a pre-defined service request procedure). In this instance, the eRelay-UE may receive the RRC connection setup (message) from the eNB and send, to the eNB, a RRC connection setup complete (message) as a response to it. The eNB receiving the RRC connection setup complete (message) may send a NAS service request to an eRelay MME and complete a service request procedure for the eRelay-UE.

9. The eRelay-UE may send PC5-S: Connection Activation acknowledge (ACK) to the eRemote-UE to confirm whether a connection to the network is active.

10-12. The eRemote-UE may perform a service request procedure (the service request procedure may follow a pre-defined service request procedure).

Although not shown, in the present disclosure, the eRelay-UE can determine the RRC establishment cause, that intends to be included in the first RRC connection request, considering priorities between the RRC establishment cause (Relay_establishment cause) of the eRelay-UE and the RRC establishment cause (Remote_establishment cause) of the eRemote-UE. For example, basically, the eRelay-UE sends the RRC connection request by preferentially including the RRC establishment cause of the eRelay-UE. Exceptionally, if a priority of the RRC establishment cause of the eRemote-UE is higher, the eRelay-UE may send the RRC connection request by preferentially including the RRC establishment cause of the eRemote-UE.

[Invention Proposal 2]

When the eRemote UE performs a RRC connection request procedure through the eRelay UE, if a timer (e.g., barring timer/extended wait timer) is running due to several causes, such as barring/rejection of a RRC connection of the eRelay UE, the eRelay UE can perform a RRC connection request procedure for the eRemote UE irrespective of the timer operation.

Here, a situation in which a barring timer or an extended wait timer is running means a situation according to a rejection/failure of the RRC connection request procedure of the eRelay UE.

For the above operation, the eRelay UE should remember/recognize for which UE the barring timer or the extended wait timer is running, and should apply the timer only to the corresponding UE.

On the contrary, if the barring timer or the extended wait timer is running due to the RRC connection request procedure of the eRemote UE, the RRC connection request procedure of the eRelay UE should be performed irrespective of/independently of/separate from this.

Even if an (E)MM back-off timer (T3346) is running, the present embodiment may be applied. That is, even if the (E)MM back-off timer (T3346) of the eRelay UE is running, the eRelay UE may perform an (E)MM procedure (e.g., service request procedure, TAU procedure, Attach procedure) triggered by the eRemote UE. In a contrast case (i.e., if the (E)MM back-off timer (T3346) of the eRemote UE is running), the eRelay UE performs the (E)MM procedure (e.g., service request procedure, TAU procedure, Attach procedure) triggered by the eRelay UE itself.

The invention proposal 2 is described in more detail below with reference to FIG. 24.

FIG. 24 is a flow chart illustrating a RRC connection request procedure according to Invention proposal 2.

0. The RRC connection of the eRelay-UE may be barred/fail or the back-off timer (e.g., extended wait timer) for the RRC connection request may be running.

1. When the eRemote-UE has pending data or signalling to send, the eRemote-UE may send PC5-S: Connection Activation to the eRelay-UE. In this instance, the eRemote-UE may include and send the RRC establishment cause (Remote_establishment cause), which will use for RRC connection request, in the PC5-S: Connection Activation.

If the eRelay-UE is in the ECM-IDLE state, Steps 2 to 6 may be performed.

2. When Step 0) and Step 1) happen at the same time (i.e., when a RRC connection request by an eRelay UE internal behaviour from the eRelay-UE itself and a RRC connection request by the connection activation from the eRemote-UE are triggered simultaneously (or within a pre-set time)), the eRelay-UE may perform the RRC connection request based on whether the RRC connection requests of the eRelay-UE and the eRemote UE are available. More specifically, if the RRC connection request of the eRelay-UE is currently impossible, but the RRC connection request of the eRemote UE is available, the eRelay-UE may perform the RRC connection request. For example, if the RRC connection of the eRelay UE has been barred/has failed or an extended wait timer for the eRelay UE is running, and the RRC connection of the eRemote UE has not been barred/has not failed or the extended wait timer for the eRemote UE is not running, the eRelay-UE shall perform the RRC connection request procedure triggered by the eRemote UE. If the RRC connection request procedure for the eRemote UE is performed, the eRelay UE may send the RRC connection request to the eNB by including a RRC establishment cause (Remote_establishment cause) received from the eRemote-UE in the RRC connection request to the eNB. In this instance, a new field may be defined in the RRC connection request to include the RRC establishment cause (Remote_establishment cause) sent by the eRemote-UE.

3-6. The RRC connection for the eRelay-UE may be approved by the eNB, and the service request procedure may be completed (the service request procedure may follow a pre-defined service request procedure). In this instance, the eRelay-UE may receive a RRC connection setup (message) from the eNB and send, to the eNB, a RRC connection setup complete (message) as a response to it. The eNB receiving the RRC connection setup complete (message) may send a NAS service request to an eRelay MME and complete a service request procedure for the eRelay-UE.

7. The eRelay-UE may send PC5-S: Connection Activation acknowledge (ACK) to the eRemote-UE to confirm whether a connection to the network is active.

8-12. The eRemote-UE may perform a service request procedure (the service request procedure may follow a pre-defined service request procedure).

That is, according to the above-described embodiments, even if the RRC connection request of the eRelay-UE is rejected/barred (or is being rejected/barred), the eRelay-UE may re-perform the RRC connection request based on a RRC establishment cause (Remote_establishment cause) of the eRemote-UE and perform the RRC connection (i.e., the eRelay-UE can perform the RRC connection based on a RRC establishment cause of other UE not the RRC establishment cause of the eRelay-UE itself). To this end, the eRelay-UE should recognize/store which UE the RRC connection rejected from the eNB is a rejection for (particularly, which UE the barring/extended wait timer, which is currently running, is running for).

The embodiments have an effect capable of preventing the problem that the RRC connection of the eRemote-UE is always rejected/barred together according to the rejection/barring of the RRC connection of the eRelay-UE. Such an effect can be more effective if a priority of the RRC establishment cause of the eRemote-UE is higher than a priority of the RRC establishment cause of the eRelay-UE.

The embodiments described that the eRelay-UE includes and sends the RRC establishment cause (Remote_establishment cause) receiving from the eRemote-UE in the RRC connection request, but are not limited thereto. For example, the embodiments can receive a 'RRC connection request (including the RRC establishment cause) (message)' itself from the eRemote-UE, include it in the RRC connection request at it is (instead of the RRC establishment cause), and send it to the eNB.

FIG. 25 is a flow chart illustrating a method of performing a RRC connection procedure of a relay UE according to an embodiment of the present disclosure. The above-described embodiments/descriptions can be equally/similarly applied to this flow chart, and a duplicated description thereof is omitted.

First, if a RRC connection procedure of a remote UE associated with a relay UE is triggered, the relay UE may receive, from the remote UE, a first RRC establishment cause for a RRC connection of the remote UE in S2510. In this instance, the first RRC establishment cause may be received to the relay UE through a PC5-S: Connection Activation message.

Next, if a RRC connection request of the relay UE is not allowed, the relay UE may send, to a base station, a first RRC connection request including the first RRC establishment cause of the remote UE.

Here, the case in which the RRC connection request of the relay UE is not allowed may correspond to a case in which a second RRC connection request including a second RRC establishment cause for a RRC connection of the relay UE is rejected by the base station after a RRC connection procedure of the relay UE is triggered together with the RRC connection procedure of the remote UE. In this case, the second RRC connection request may be transmitted prior to the first RRC connection request. Alternatively, a transmission order of the first and second RRC connection requests may be determined based on a priority of the first and second RRC establishment causes. If a priority of the first RRC establishment cause is higher than a priority of the second RRC establishment cause, the first RRC connection request may be transmitted prior to the second RRC connection request. If the priority of the second RRC establishment cause is higher than the priority of the first RRC establishment cause, the second RRC connection request may be transmitted prior to the first RRC connection request.

And/or, the case in which the RRC connection request of the relay UE is not allowed may correspond to a case in which the RRC connection of the relay UE has been barred/rejected, and/or a case in which a timer that is set to a RRC connection re-request waiting time or a back-off time of the relay UE is running.

If the first RRC connection request is allowed by the base station, the relay UE may configure a RRC connection between the relay UE and the base station, perform a service request procedure for the relay UE, and perform a service request procedure for the remote UE. As performing the service request procedure is completed, EPS connection management (ECM) states of the relay UE and the remote UE may transition from an ECM-idle state to an ECM-CONNECTED state.

Overview of Device to which the Present Disclosure is Applicable

FIG. 26 illustrates a block configuration diagram of a communication device according to an embodiment of the present disclosure.

Referring to FIG. 26, a wireless communication system includes a network node 2610 and a plurality of UEs 2620.

The network node 2610 includes a processor 2611, a memory 2612, and a communication module 2613. The processor 2611 implements functions, processes, and/or methods proposed above. Layers of wired/wireless interface protocol may be implemented by the processor 2611. The memory 2612 is connected to the processor 2611 and stores various types of information for driving the processor 2611. The communication module 2613 is connected to the processor 2611 and transmits and/or receives wired/wireless signals. An example of the network node 2610 may correspond to a base station, MME, HSS, SGW, PGW, an application server, or the like. In particular, if the network node 2610 is the base station, the communication module 2613 may include a radio frequency (RF) unit for transmitting/receiving a radio signal.

The UE 2620 includes a processor 2621, a memory 2622, and a communication module (or RF unit) 2623. The processor 2621 implements functions, processes, and/or methods proposed above. Layers of a radio interface protocol may be implemented by the processor 2621. The memory 2622 is connected to the processor 2621 and stores various types of information for driving the processor 2621. The communication module 2623 is connected to the processor 2621 and transmits and/or receives a radio signal.

The memories 2612 and 2622 may be inside or outside the processors 2611 and 2621 and may be connected to the processors 2611 and 2621 through various well-known means. Further, the network node 2610 (in case of the base station) and/or the UE 2620 may have a single antenna or multiple antennas.

FIG. 27 illustrates a block configuration diagram of a communication device according to an embodiment of the present disclosure.

In particular, FIG. 27 illustrates in more detail the UE illustrated in FIG. 26.

Referring to FIG. 27, the UE may include a processor (or digital signal processor (DSP)) 2710, an RF module (or RF unit) 2735, a power management module 2705, an antenna 2740, a battery 2755, a display 2715, a keypad 2720, a memory 2730, a subscriber identification module (SIM) card 2725 (which is optional), a speaker 2745, and a microphone 2750. The UE may also include a single antenna or multiple antennas.

The processor 2710 implements functions, processes, and/or methods proposed above. Layers of a radio interface protocol may be implemented by the processor 2710.

The memory 2730 is connected to the processor 2710 and stores information related to operations of the processor 2710. The memory 2730 may be inside or outside the processor 2710 and may be connected to the processors 2710 through various well-known means.

A user inputs instructional information, such as a telephone number, for example, by pushing (or touching) buttons of the keypad 2720 or by voice activation using the microphone 2750. The processor 2710 receives and processes the instructional information to perform an appropriate function, such as to dial the telephone number. Operational data may be extracted from the SIM card 2725 or the memory 2730. Further, the processor 2710 may display instructional information or operational information on the display 2715 for the user's reference and convenience.

The RF module 2735 is connected to the processor 2710 and transmits and/or receives an RF signal. The processor 2710 forwards instructional information to the RF module 2735 in order to initiate communication, for example, transmit a radio signal configuring voice communication data. The RF module 2735 includes a receiver and a transmitter to receive and transmit the radio signal. The antenna 2740 functions to transmit and receive the radio signal. Upon reception of the radio signal, the RF module 2735 may transfer a signal to be processed by the processor 2710 and convert the signal into a baseband. The processed signal may be converted into audible or readable information output via the speaker 2745.

The embodiments described above are implemented by combinations of components and features of the present disclosure in predetermined forms. Each component or feature should be considered selectively unless specified separately. Each component or feature can be carried out without being combined with another component or feature. Moreover, some components and/or features are combined with each other and can implement embodiments of the present disclosure. The order of operations described in embodiments of the present disclosure can be changed. Some components or features of one embodiment may be included in another embodiment, or may be replaced by corresponding components or features of another embodiment. It is obvious that some claims referring to specific claims may be combined with other claims referring to claims other than the specific claims to constitute an embodiment or add new claims by means of amendment after the application is filed.

Embodiments of the present disclosure can be implemented by various means, for example, hardware, firmware, software, or combinations thereof. When embodiments are implemented by hardware, one embodiment of the present disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure can be implemented by modules, procedures, functions, etc. performing functions or operations described above. Software code can be stored in a memory and can be run by a processor. The memory is provided inside or outside the processor and can exchange data with the processor by various well-known means.

In the present disclosure, 'A and/or B' may mean at least one of A and/or B.

It is obvious to a person skilled in the art that the present disclosure can be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

Although the present disclosure has been described focusing on examples applying to the 3GPP LTE/LTE-A/NR (5G) system, it can be applied to various wireless communication systems other than the 3GPP LTE/LTE-A/NR (5G) system.

The invention claimed is:

1. A method of performing a radio resource control (RRC) connection procedure of a relay user equipment (UE) in a wireless communication system, the method comprising:

based on a RRC connection procedure of a remote UE associated with the relay UE being triggered, receiving, from the remote UE, a first RRC establishment cause for a RRC connection of the remote UE; and based on a case in which a RRC connection request of the relay UE is not allowed, transmitting, to a base station, a first RRC connection request including the first RRC establishment cause of the remote UE; and based on the first RRC connection request being allowed by the base station:
configuring a RRC connection between the relay UE and the base station;
performing a service request procedure for the relay UE; and
performing a service request procedure for the remote UE; and, wherein the case in which the RRC connection request of the relay UE is not allowed comprises a second RRC connection request including a second RRC establishment cause for a RRC connection of the relay UE being rejected by the base station after a RRC connection procedure of the relay UE is triggered together with the RRC connection procedure of the remote UE.

2. The method of claim 1, wherein as performing the service request procedure is completed, EPS connection management (ECM) states of the relay UE and the remote UE transition from an ECM-idle state to an ECM-CONNECTED state.

3. The method of claim 1, wherein the first RRC establishment cause is received to the relay UE through a connection activation message.

4. The method of claim 1, wherein the second RRC connection request is transmitted prior to the first RRC connection request.

5. The method of claim 4, wherein a transmission order of the first and second RRC connection requests is determined based on a priority of the first and second RRC establishment causes.

6. The method of claim 5,
wherein based on a priority of the first RRC establishment cause being higher than a priority of the second RRC establishment cause, the first RRC connection request is transmitted prior to the second RRC connection request,
wherein based on the priority of the second RRC establishment cause being higher than the priority of the first RRC establishment cause, the second RRC connection request is transmitted prior to the first RRC connection request.

7. The method of claim 1, wherein the case in which the RRC connection request of the relay UE is not allowed further includes at least one of a case in which the RRC connection of the relay UE has been barred, or a case in which a timer that is set to a RRC connection re-request waiting time or a back-off time of the relay UE is running.

8. A relay user equipment (UE) configured to perform a radio resource control (RRC) connection procedure in a wireless communication system, the relay UE comprising:
a transceiver configured to transmit and receive a signal; and
at least one processor configured to control the transceiver,
wherein the at least one processor is configured to:
based on a RRC connection procedure of a remote UE associated with the relay UE being triggered, receive, from the remote UE, a first RRC establishment cause for a RRC connection of the remote UE; and based on a case in which a RRC connection request of the relay UE is not allowed, transmit, to a base station, a first RRC connection request including the first RRC establishment cause of the remote UE; and based on the first RRC connection request being allowed by the base station:
- configuring a RRC connection between the relay UE and the base station;
- performing a service request procedure for the relay UE; and
- performing a service request procedure for the remote UE; and, wherein the case in which the RRC connection request of the relay UE is not allowed comprises a second RRC connection request including a second RRC establishment cause for a RRC connection of the relay UE being rejected by the base station after a RRC connection procedure of the relay UE is triggered together with the RRC connection procedure of the remote UE.

9. The relay UE of claim 8, wherein as performing the service request procedure is completed, EPS connection management (ECM) states of the relay UE and the remote UE transition from an ECM-idle state to an ECM-CONNECTED state.

10. The relay UE of claim 8, wherein the second RRC connection request is transmitted prior to the first RRC connection request.

11. The relay UE of claim 8, wherein the case in which the RRC connection request of the relay UE is not allowed corresponds to at least one of a case in which the RRC connection of the relay UE has been barred, or a case in which a timer that is set to a RRC connection re-request waiting time or a back-off time of the relay UE is running.

* * * * *